United States Patent
Liu et al.

(10) Patent No.: US 6,714,592 B1
(45) Date of Patent: Mar. 30, 2004

(54) PICTURE INFORMATION CONVERSION METHOD AND APPARATUS

(75) Inventors: Yu Liu, Tokyo (JP); Naofumi Yanagihara, Tokyo (JP); Kazushi Sato, Kanagawa (JP); Takeshi Kubozono, Kanagawa (JP); Shintaro Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 09/711,331

(22) Filed: Nov. 13, 2000

(30) Foreign Application Priority Data

Nov. 18, 1999 (JP) .......................................... 11-328776

(51) Int. Cl.[7] ................................................ H04N 7/12
(52) U.S. Cl. .......................... 375/240.13; 375/240.05; 375/240.12
(58) Field of Search ................... 375/240.05, 240.12, 375/240.13; 382/235, 236, 238

(56) References Cited

U.S. PATENT DOCUMENTS 6,307,886 B1 * 10/2001 Westermann .......... 375/240.09
6,347,117 B1 * 2/2002 Kato et al. ............. 375/240.05
6,415,057 B1 * 7/2002 Suzuki et al. ............... 382/239

* cited by examiner

Primary Examiner—Chris Kelley
Assistant Examiner—George A Bugg, Jr.
(74) Attorney, Agent, or Firm—Sonnenschein, Nath & Rosenthal LLP

(57) ABSTRACT

A picture information conversion method and apparatus in which, if the compressed picture information with a variable or non-recognized information volume is input, optimum compression processing on the compressed picture information is performed to prevent underflow and/or overflow to suppress deterioration of the picture quality. A compressed information analysis device 3 analyzes the structure of the picture type of the GOP of the compressed picture information input to the FF buffer 2. A bit allocation device 5 generates a pseudo GOP of the input compressed picture information, based on N frames stored in the FF buffer 2 and on the analysis result information stored in the information buffer 4, and allocates a pre-set code volume to respective pictures of the generated GOP so that the output compressed picture information will be at a second bitrate.

8 Claims, 48 Drawing Sheets

```
struct {
        int     avg_q_scale;
        int     total_bits;
        int     header_bits;
        int     picture_coding_type;
        int     act_max, act_min;
} InfoBuffer[max_length_InfoBuffer] ;
```

FIG.4

$$\text{header\_data\_compressor} \Rightarrow \begin{cases} \text{not compressed} & \text{if } \alpha \leq 0 \\ \text{partially compressed} & \text{if } 0 < \alpha < 1 \\ \text{all compressed} & \text{if } \alpha \geq 1 \end{cases}$$

PICTURE INFORMATION CONVERSION METHOD AND APPARATUS

BACKGROUND OF THE INVENTION

1. Field of the Invention

This invention relates to a picture information conversion method and apparatus for converting the bit rate of the compressed picture information.

2. Description of Related Art

Recently, such an apparatus is in widespread use in which the picture information is handled as digital data, which digital data is compressed by orthogonal transform and motion compensation exploiting redundancy inherent in the picture information to effectuate or transmission to a network media, such as satellite broadcast or cable television, or recording on a storage medium, such as a magnetic disc. In such apparatus, the MPEG-2 (Moving Picture Experts Group-2) employing the discrete cosine transform is used in general as the picture compression system.

Recently, normalization of the digital television broadcasting, employing this picture compression system, exemplified by MPEG-2, is underway. Among the standards of the digital television broadcasting, there are a standard associated with a picture of standard resolution, such as a picture having 576 effective lines in the vertical direction, and a standard associated with a picture of high resolution, such as a picture having 1152 effective lines in the horizontal direction.

Meanwhile, the picture information of the high resolution picture is voluminous, such that, even on compression by the encoding system, such as MPEG-2, an extremely large amount of codes (bit rate) is required in order to achieve a sufficient picture quality. For example, in the case of interlaced scanning at 30 Hz for a picture frame of 1920 by 1080 pixels, the bit rate is of the order of 18 to 22 Mbps or higher.

So, if this high resolution picture is to be transmitted by satellite broadcast or over a network media such as cable television, the bit rate needs to be diminished further in meeting with the bandwidth of the transmission channel. Similarly, in recording this high resolution picture on a storage media, such as an optical disc or a magneto-optical disc, the bit rate needs to be diminished further in meeting with the recording capacity of the storage media. The necessity of diminishing the bit rate is thought to arise not only for a high resolution picture but also for a standard resolution picture, such as a picture obtained on interlaced scanning at 30 Hz for a picture frame of 720 by 480 pixels.

Among the means for combatting this problem, there are hierarchical encoding (scalability) or picture information conversion (transcoding). In MPEG-2, SNR scalability is normalized for the former. Using this, the picture compression information (bitstream) of high SNR and the picture compression information (bitstream) of high SNR are hierarchically encoded. However, even though a pre-set value such as bandwidth or recording capacity needs to be known at the time point of encoding in order to effect the hierarchical encoding, this value is not known in many cases in the actual system.

Referring to the drawings, a conventional picture information conversion device 100 is explained. This conventional picture information conversion device 100 is shown in FIG. 1.

The conventional picture information conversion device 100 includes a picture information decoding device 101 and a picture information encoding device 102, as shown in FIG. 1. This conventional picture information conversion device 100 is generally a device for reducing the bitrate of the compressed picture information (bitstream) and is adapted for supplying the picture information from the picture information decoding device 101 to the picture information encoding device 102.

First, the picture information decoding device 101 of the picture information conversion device 100 is fed with the high bitrate compressed picture information. The picture information decoding device 101 once decodes the high bitrate compressed picture information completely to output baseband video data.

The picture information encoding device 102 is fed at the outset with a target bitrate lower than the code volume (high bitrate) of the input compressed picture information, and executes the encoding based on this target bitrate. That is, the picture information encoding device 102 re-encodes the baseband video data, obtained as an output of the picture information decoding device 101, to output the compressed low bitrate picture information.

Recently, in this conventional picture information conversion device 100, researches towards simplifying the hardware architecture and improving the image quality are underway. In particular, the development of an algorithm is going on briskly in connection with optimisation of re-quantization and controlling of the bitrate.

In the conventional picture information conversion device 100, the large number of the algorithms, developed for optimum quantization and optimum bitrate control, are not exploited effectively. These algorithms improve the SNR (average picture quality) of the conventional picture information conversion device 100 merely to a limited extent.

On the other hand, bit allocation to each picture in the conventional picture information conversion device 100 is based on the Test Model 5 (ISO/IEC JTC1/SC29/WG11 No.400), referred to below as TM5. In this TM5, the target bitrate allocated to each residual picture allocated to each residual picture is calculated using a calculated value of the complexity of each residual picture.

FIG. 7 shows transition of the frame-based complexity obtained on calculating the complexity of each of the 60 frames by a picture sequence sprinkler. In this picture sequence sprinkler, each GOP is made up of 15 pictures of I, B, B, P, B, B, P, B, B, P, B, B, P, B, B.

Moreover, in the conventional picture information conversion device 100, the bitrate of the input compressed picture information (bitstream) is used as the target bitrate.

Assume that the i'th picture in the GOP, made up e.g., of 15 pictures, is being processed. If the conventional picture information conversion device 100 is not exploiting the feed-forward technique, this conventional picture information conversion device 100 is unable to recognize a calculated value of the complexity of the residual picture extracted from the i'th residual picture in the GOP. In the TM5 in such case, the conventional picture information conversion device 100 uses calculated value of the complexity generated from the latest encoded picture. Meanwhile, the feed-forward technique herein means the technique of determining an manipulated variable based on the command value of a manipulated variable of a controlled object or on the information such as disturbance.

The complexity value of a picture for each frame is increased rightwards up monotonously from a frame 1 to a frame 61, as shown in FIG. 7. However, in actuality, a target bitrate smaller than a command bitrate to be allocated is allocated to each residual picture. If, in the conventional picture information conversion device 100, such inappropriate bit allocation is used, underflow occurs readily to deteriorate the picture quality, because the bitrate cannot be curtailed in case the command bitrate to be allocated to each residual picture is insufficient.

Moreover, if, in the conventional picture information conversion device 100, the compressed picture information (bitstream) is VBP, it is not possible to allocate proper command bitrate to each picture because bitrate variations from GOP to GOP leads to inappropriate bit allocation.

Also, in the conventional picture information conversion device 100, there is employed an FF buffer for encoding a GOP at the outset in order to calculate the complexity of each GOP picture. So, if the GOP is made up of a large number of pictures, the recording capacity needs to be increased correspondingly, thus elevating the FF buffer cost. In addition, in the conventional picture information conversion device 100, since the structure of the high bitrate compressed picture information, actually input from outside, cannot be recognized until it is entered actually, the optimum recording capacity of the FF buffer is difficult to set. It is also necessary with the conventional picture information conversion device 100 to use the FF buffer if the input compressed picture information (bitstream) is a VBR.

In addition, in the conventional picture information conversion device 100, underflow occurs extremely readily. It is noted that header data including the motion vector (MV) and the control information is encapsulated into the compressed picture information (bitstream) input to this conventional picture information conversion device 100. For these header data, the compressed picture information (bitstream) initially input to the conventional picture information conversion device 100, referred to below as the original compressed picture information (bitstream), is not so crucial because this original compressed picture information (bitstream) is a high bitrate encoded version of the DCT data which is generally more crucial to the header data.

However, if, in the conventional picture information conversion device 100, the compressed picture information (bitstream) is to be compressed further, the DCT data in the compressed picture information (bitstream) is diminished in a larger quantity because in general the header data contents include the control information and hence are not to be changed.

On the other hand, if the compressed picture information (bitstream) output by the conventional picture information conversion device 100 is of the low bitrate, underflow is likely to occur repeatedly s a result of failure in the header data compressing operation. Should underflow occur in the conventional picture information conversion device 100, a pre-set portion of a group of pictures or a sole picture is skipped (dropped). However, the processing of skipping or dropping a pre-set portion of a group of pictures or a sole picture deteriorates the picture quality.

Moreover, in the conventional picture information conversion device 100, the algorithm of the TM5 cannot be immediately applied for detecting the quantization scale because the difference in the pixel intensity region needs to be computed in the TM5.

In the conventional picture information conversion algorithm, calculations of the difference in the intensity region are not taken into consideration. So, with the conventional picture information conversion device 100 employing the conventional picture information conversion algorithm, the cost of the overall device is increased. On the other hand, calculations of the difference in the intensity region are carried out only for I-pictures in the DCT region. If these calculations need to be carried out, the B and P pictures need to be converted into I-pictures. In addition, in certain picture information conversion algorithms, the quantization scale, encoded previously, is used in place of calculating the activity.

Also assume that the conventional picture information conversion device 100 includes a VBV buffer fed with the high bitrate compressed picture information (bitstream). In this case, since the conventional picture information conversion device 100 is unable to comprehend the structure of the GOP included in the high bitrate compressed picture information (bitstream) until the compressed picture information (bitstream) is actually input, it is not known what should be the recording capacity the VBV buffer which is to be in use.

If the VBV buffer of a large capacity is used, the overall cost of the conventional picture information conversion device 100 is increased. Also, if the VBV buffer is unable to cope with the bit allocation processing, the conventional picture information conversion device 100 is readily in trouble due to variations in the input VBR bitstream or in the bitrate.

SUMMARY OF THE INVENTION

It is therefore an object of the present invention to provide a method and apparatus for converting the picture information in which, even if the compressed picture information with the variable information volume or with the unidentified information volume is input, the compression processing for the compressed picture information, such as allocating a proper command bitrate to each picture of the compressed picture information, is performed to prevent underflow and/or overflow to suppress deterioration of the picture quality.

In one aspect, the present invention provides a picture information conversion device which is fed with the first compressed picture information of CBR (constant bitrate) or VBR (variable bitrate) as a first bitrate and which outputs the second compressed picture information at CBR as a second bitrate, the first compressed picture information being picture signals compression-coded in terms of a GOP (group of pictures) made up of at least one picture, as a unit, wherein the picture information conversion device includes first storage means for storing N frames of the input first compressed picture information, compressed picture information analysis means for analyzing the structure of the picture type of the GOP of the first compressed picture information input to the first storage means, second storage means for storing the analysis result information as the result of analysis by the compressed picture information analysis means, supplied by the compressed picture information analysis means, pseudo GOP generating means for generating a pseudo GOP, based on the N frames stored in the first storage means and on the analysis result information stored in the second storage means, and code volume allocation means for allocating a pre-set code volume to each picture of the pseudo GOP generated by the pseudo GOP generating means so that the output second compressed picture information will be at the second bitrate. The pseudo GOP predicts the picture type of the entire GOP including the N frames of the first compressed picture information, In this picture information conversion device, the pseudo GOP generating means generates a pseudo GOP, predicting the structure of the picture types of the overall GOP including N frames of the first compressed picture information, based on the N frames stored in the first storage means and on the analysis result information stored in the second storage means. The code volume allocating means allocates a pre-set code volume to each picture of the pseudo GOP, generated by the pseudo GOP generating means, so that the output second compressed picture information will e at a second bitrate.

In another aspect, the present invention provides a picture information conversion device which is fed with the first compressed picture information of a CBR (constant bitrate) or a VBR (variable bit rate), as a first bitrate, and which outputs the second compressed picture information of a CBR, as a second bitrate, with the first compressed picture information being picture signals compression-coded in terms of a picture as a unit, wherein the picture information conversion device includes compressed picture information analysis means for analyzing the first compressed picture information input, complexity calculating means for calculating the complexity of respective pictures of the first compressed picture information input, based on the analysis result information representing the result of analysis by the compressed picture information analysis means, command code volume calculating means for calculating the command code volume allocated to respective picturers of the input first compressed picture information, based on the complexity of the respective pictures calculated by the complexity calculating means and command code volume allocating means for allocating the command code volume calculated by the command code volume calculating means to the respective pictures of the input first compressed picture information.

In this picture information conversion device, the complexity calculating means calculates the complexity of respective pictures of the input first compressed picture information, while the command code volume calculating means calculates the command code volume allocated to the respective pictures of the input first compressed picture information, based on the complexity of the respective pictures as calculated by the complexity calculating means. The command code volume allocating means allocates the command code volume, calculated by the command code volume calculating means, to the respective pictures of the input first compressed picture information.

In still another aspect, the present invention provides a picture information conversion device which is fed with the first compressed picture information of a CBR (constant bitrate) or a VBR (variable bit rate) as a first bitrate and which outputs the second compressed picture information of a CBR as a second bitrate, with the first compressed picture information being picture signals compression-coded in terms of a picture as a unit, wherein the picture information conversion device includes data separating means for decoding the variable length code of the input first compressed picture information to separate DCT (discrete cosine transform) data and header data from each other, compressed picture information analysis means for analyzing the input first compressed picture information, and header data compressing means for compressing header data separated by the data separating means if, based on the information pertinent to the command code volume allocated to the respective pictures of the input first compressed picture information, the command code volume allocated to the respective pictures is smaller than the command code volume of the header data allocated to the respective pictures.

In this picture information conversion device, the data separating means decodes the variable length codes of the input first compressed picture information and separates the information into DCT (discrete cosine transform) data and header data. The header data compressing means compresses the header data separated by the data separating means, based on the information pertinent to the command code volume allocated to the respective pictures of the input first compressed picture information, in case the command code volume allocated o the respective pictures is smaller than the command code volume of the header data allocated to the respective pictures.

In still another aspect, the present invention provides a picture information conversion device which is fed with the first compressed picture information of a CBR (constant bitrate) or a VBR (variable bit rate) as a first bitrate and which outputs the second compressed picture information at a CBR as a second bitrate, with the first compressed picture information being picture signals compression-coded in terms of a picture as a unit, wherein the picture information conversion device includes compressed picture information analysis means for analyzing the input first compressed picture information, complexity calculating means for calculating the complexity of respective pictures of the input first compressed picture information, based on the analysis result information representing the result of analysis by the compressed picture information analysis means, command code volume calculating means for calculating the command code volume allocated to respective pictures of the input first compressed picture information, based on the complexity of the respective pictures calculated by the complexity calculating means, reference quantization scale generating means for generating the reference quantization scale based on the information pertinent to the command code volume calculated by the command code volume calculating means and on the information pertinent to the code volume of the second compressed picture information to be output, activity calculating means for calculating the activity of the input first compressed picture information, quantization scale generating means for generating the quantization scale based on the reference quantization scale generated by the reference quantization scale generating means and on the activity calculated by the activity calculating means, dequantization means for dequantizing orthogonal transform coefficients of the input first compressed picture information and quantizing means for requantizing the orthogonal transform coefficients of the first compressed picture information dequantized by the dequantization means, based on the quantization scale generated by the quantization scale generating means.

In this picture information conversion device, the reference quantization scale generating means generates the reference quantization scale based on the information pertinent to the command code volume calculated by the command code volume calculating means and on the information pertinent to the code volume of the output second compressed picture information. The activity calculating means calculates the activity of the input first compressed picture information, while the quantization scale generating means generates the quantization scale based on the reference quantization scale generated by the reference quantization scale generating means and on the activity generated by the activity calculating means.

In still another aspect, the present invention provides a picture information conversion device which is fed with the first compressed picture information of CBR (constant bitrate) or VBR (variable bitrate) as a first bitrate and which outputs the second compressed picture information at CBR as a second bitrate, the first compressed picture information being picture signals compression-coded in terms of a GOP (group of pictures) made up of at least one picture, as a unit, wherein the picture information conversion device includes first storage means for storing N frames of the input first compressed picture information, compressed picture information analysis means for analyzing the structure of the picture type of the GOP of the first compressed picture information input to the first storage means, second storage means for storing the analysis result information as the result of analysis by the compressed picture information analysis means, supplied by the compressed picture information analysis means, pseudo GOP generating means for generating a pseudo GOP, based on the N frames stored in the first storage means and on the analysis result information stored in the second storage means, the pseudo GOP predicting the picture type of the entire GOP including the N frames of the first compressed picture information, complexity calculating means for calculating the complexity of respective pictures of the input first compressed picture information, based on the analysis result information representing the result of analysis by the compressed picture information analysis means, command code volume calculating means for calculating the command code volume allocated to respective pictures of the pseudo GOP generated by the pseudo GOP generating means, based on the complexity of the respective pictures calculated by the complexity calculating means, command code volume allocating means for allocating the command code volume calculated by the command code volume calculating means to respective pictures of the pseudo GOP, data separating means for decoding the variable codes of the input first compressed picture information for separating the information into DCT (discrete cosine transform) data and header data, header data compressing means for compressing header data separated by the data separating means if, based on the information pertinent to the command code volume allocated to the respective pictures of the pseudo GOP, the command code volume allocated to the respective pictures is smaller than the command code volume of the header data allocated to the respective pictures, reference quantization scale generating means for generating the reference quantization scale based on the information pertinent to the command code volume calculated by the command code volume calculating means and on the information pertinent to the code volume of the second compressed picture information to be output, activity calculating means for calculating the activity of the input first compressed picture information, quantization scale generating means for generating the quantization scale based on the reference quantization scale generated by the reference quantization scale generating means and on the activity calculated by the activity calculating means, dequantization means for dequantizing orthogonal transform coefficients of the input first compressed picture information, and quantizing means for re-quantizing the orthogonal transform coefficients of the first compressed picture information dequantized by the dequantization means based on the quantization scale generated by the quantization scale generating means.

In this picture information conversion device, the pseudo GOP generating means generates a pseudo GOP based on N frames stored in the first storage means and on the analysis result information stored in the second storage means. The command code volume allocating means allocates the command code volume, calculated by the command code volume calculating means, to the respective pictures of the pseudo GOP. The header data compressing means compresses the header data separated by the data separating means if, based on the information pertinent to the command code volume allocated to the respective pictures of the pseudo GOP, the command code volume allocated to the respective pictures of the pseudo GOP is smaller than the command code volume of the header data allocated to the respective pictures. The quantization scale generating means then generates the quantization scale based on the reference quantization scale and the activity. Finally, the quantization means re-quantizes the orthogonal transform coefficients of the first compressed picture information dequantized by the dequantizing means, based on the quantization scale.

In still another aspect, the present invention provides a picture information conversion method in which the first compressed picture information of CBR (constant bitrate) or VBR (variable bitrate) as a first bitrate is input and in which the second compressed picture information at CBR as a second bitrate is output, the first compressed picture information being picture signals compression-coded in terms of a GOP (group of pictures) made up of at least one picture, as a unit, wherein the picture information conversion method including the steps of storing N frames of the input first compressed picture information, analyzing the structure of the picture type of the GOP of the first compressed picture information, storing the analysis result information as the result of analysis, generating a pseudo GOP, based on the N frames stored and on the analysis result information stored, the pseudo GOP predicting the picture type of the entire GOP including the N frames of the first compressed picture information and allocating a pre-set code volume to each picture of the pseudo GOP generated so that the output second compressed picture information will be at the second bitrate.

In this picture information conversion method, a pseudo GOP predicting the structure of the picture type of the entire GOP including N frames of the first compressed picture information is generated, based on the stored N frames and on the analysis result information, and a pre-set code volume is allocated to the respective pictures of the generated pseudo GOP so that the output second compressed picture information will be at a second bitrate.

In still another aspect, the present invention provides a picture information conversion method in which the first compressed picture information a CBR (constant bitrate) or a VBR (variable bit rate) as a first bitrate is input and in which the second compressed picture information of a CBR as a second bitrate is output, the first compressed picture information being picture signals compression-coded in terms of a picture as a unit, wherein the method includes the steps of analyzing the first compressed picture information input, calculating the complexity of respective pictures of the first compressed picture information input, based on the analysis result information representing the result of analysis, calculating the command code volume allocated to respective pictures of the input first compressed picture information, based on the calculated complexity of the respective pictures and allocating the calculated command code volume to the respective pictures of the input first compressed picture information.

In this picture information conversion method, the complexity of the respective pictures of the input first compressed picture information is calculated, based on the analysis result information, while the command code volume allocated to the respective pictures of the input first compressed picture information, based on the calculated picture complexity. The command code volume, so calculated, is allocated to the respective pictures of the input first compressed picture information.

In still another aspect, the present invention provides a picture information conversion method in which the first compressed picture information of a CBR (constant bitrate) or a VBR (variable bit rate) as a first bitrate is input and in which the second compressed picture information of a CBR, as a second bitrate, is output, the first compressed picture information being picture signals compression-coded in terms of a picture as a unit, wherein the picture information conversion method includes the steps of decoding the variable length code of the input first compressed picture information to separate DCT (discrete cosine transform) data and header data from each other, analyzing the input first compressed picture information and compressing the header data separated by the data separating step if, based on the information pertinent to the command code volume allocated to the respective pictures of the input first compressed picture information, the command code volume allocated to the respective pictures is smaller than the command code volume of the header data allocated to the respective pictures.

In this picture information conversion method, the variable length codes of the input first compressed picture information are decoded and separated into DCT (discrete cosine transform) data and header data, and the separated header data is compressed if, based on the information pertinent to the command code volume allocated to the respective pictures of the input first compressed picture information, the command code volume allocated to the respective pictures is smaller than the command code volume of the header data allocated to the respective pictures.

In still another aspect, the present invention provides a picture information conversion method which is fed with the first compressed picture information of a CBR (constant bitrate) or a VBR (variable bit rate) as a first bitrate and which outputs the second compressed picture information at a CBR as a second bitrate, the first compressed picture information being picture signals compression-coded in terms of a picture as a unit, wherein the picture information conversion method includes the steps of analyzing the input first compressed picture information, calculating the complexity of respective pictures of the input first compressed picture information, based on the analysis result information representing the result of analysis, calculating the command code volume allocated to respective pictures of the input first compressed picture information, based on the calculated complexity of the respective pictures, generating the reference quantization scale based on the information pertinent to the calculated command code volume and on the information pertinent to the code volume of the second compressed picture information to be output, calculating the activity of the input first compressed picture information, generating the quantization scale based on the reference quantization scale generated and on the activity calculated, dequantizing orthogonal transform coefficients of the input first compressed picture information, and re-quantizing the dequantized orthogonal transform coefficients of the first compressed picture information, based on the generated quantization scale.

In the present picture information conversion method, the reference quantization scale is generated, based on the information pertinent to the command code volume and to the information pertinent to the code volume of the output second compressed picture information, to calculate the activity of the input first compressed picture information. The quantization scale is generated, based on the generated quantization scale and on the calculated activity. The orthogonal transform coefficients of the dequantized first compressed picture information are re-quantized based on the generated quantization scale.

In yet another aspect, the present invention provides a picture information conversion method in which the first compressed picture information of CBR (constant bitrate) or VBR (variable bitrate) as a first bitrate is input and the second compressed picture information at CBR as a second bitrate is output, the first compressed picture information being picture signals compression-coded in terms of a GOP (group of pictures) made up of at least one picture, as a unit, wherein the picture information conversion method includes the steps of storing N frames of the input first compressed picture information, analyzing the structure of the picture type of the GOP of the input first compressed picture information, storing the analysis result information as the result of analysis, generating a pseudo GOP, based on the stored N frames and on the stored analysis result information, with the pseudo GOP predicting the picture type of the entire GOP including the N frames of the first compressed picture information, calculating the complexity of respective pictures of the input first compressed picture information, based on the analysis result information representing the result of analysis, calculating the command code volume allocated to the respective pictures, based on the complexity of the respective pictures calculated by the complexity calculating step, allocating the calculated command code volume to respective pictures of the pseudo GOP, decoding the variable codes of the input first compressed picture information for separating the information into DCT (discrete cosine transform) data and header data, compressing separated header data if, based on the information pertinent to the command code volume allocated to the respective pictures of the pseudo GOP, the command code volume allocated to the respective pictures is smaller than the command code volume of the header data allocated to the respective pictures, generating the reference quantization scale based on the information pertinent to the command code volume calculated and on the information pertinent to the code volume of the second compressed picture information to be output, calculating the activity of the input first compressed picture information, generating the quantization scale based on the generated reference quantization scale and on the activity calculated, dequantizing orthogonal transform coefficients of the input first compressed picture information and re-quantizing the dequantized orthogonal transform coefficients of the first compressed picture information based on the generated quantization scale.

In the present picture information conversion method, the pseudo GOP is generated, based on the stored N frames and on the analysis result information, and allocates the calculated command code volume to the respective pictures of the pseudo GOP. If, based on the information pertinent to the command code volume allocated to the respective pictures, the command code volume allocated to the respective pictures is smaller than the command code volume of the header data allocated to the respective pictures, the separated header data is compressed. The reference quantization scale is generated, based on the information pertinent to the calculated command code volume and on the output second compressed picture information, and the activity of the input first compressed picture information is calculated. The quantization scale is generated based on the so-generated reference quantization scale and on the calculated activity. Finally, the orthogonal transform coefficients of the dequantized first compressed picture information is re-quantized. With the picture information conversion method and device according to the present invention, if the compressed picture information with a variable or non-recognized information volume is input, optimum compression processing on the compressed picture information, such as allocation of an optimum command code volume to respective pictures of the compressed picture information, is performed to prevent underflow and/or overflow to suppress deterioration of the picture quality.

BRIEF DESCRIPTION OF THE DRAWINGS

FIG. 4 shows a program for an information portion of an information buffer 4 to store the information on the result of analysis.

FIG. 5 shows the proportion of head data compression which varies depending onte value of α.

DESCRIPTION OF THE PREFERRED EMBODIMENTS

Figure 1:
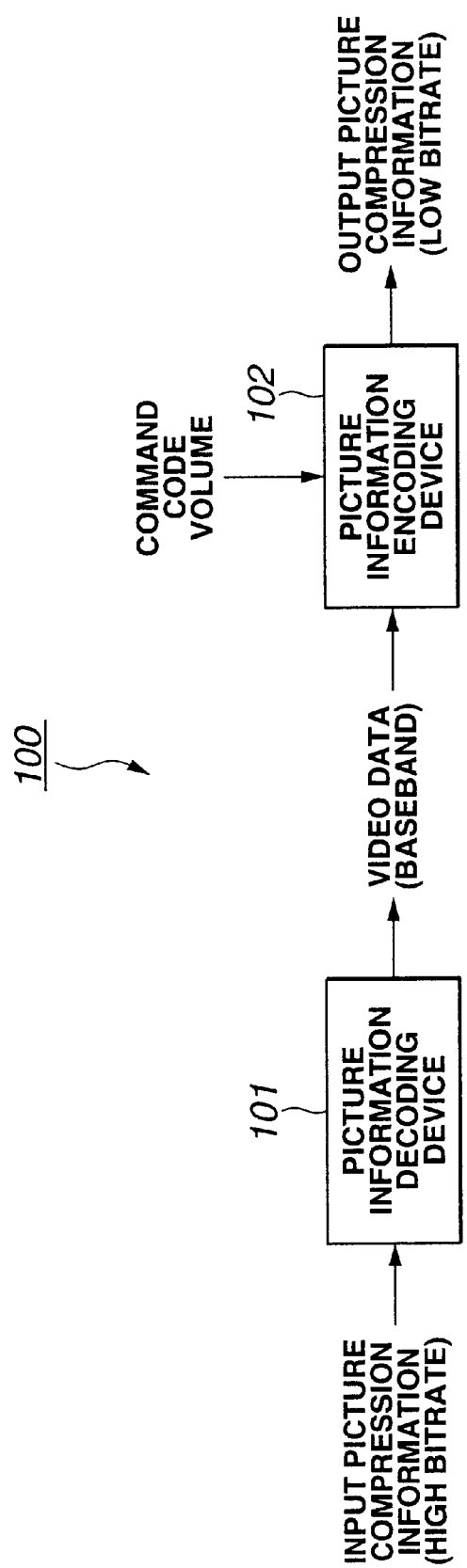
FIG. 1 is a block diagram of a conventional picture information conversion device.

Referring to the drawings, preferred embodiments of the present invention will be explained in detail.

Figure 2:
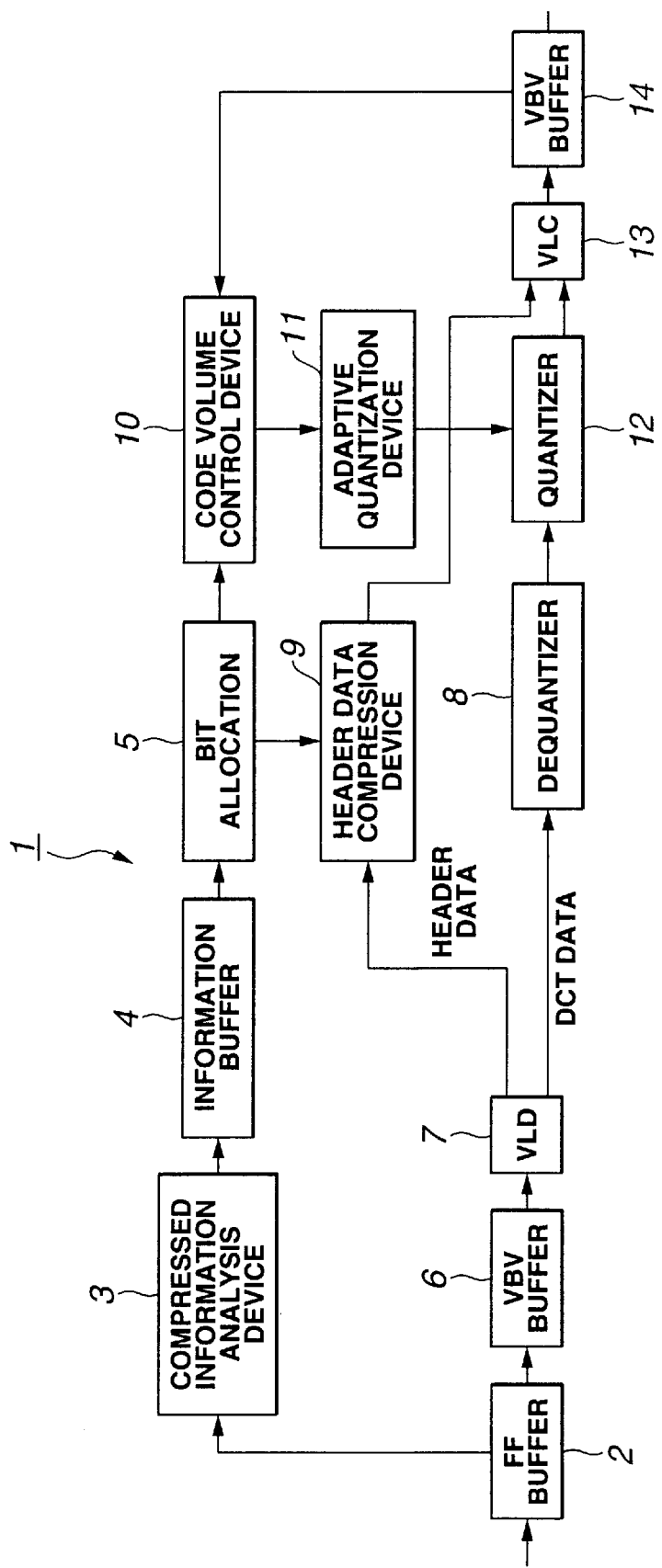
FIG. 2 is a block diagram of a picture information conversion device embodying the present invention.

A picture information conversion apparatus, embodying the present invention is a device for diminishing the code volume (bitrate) of the compressed picture information (bitstream) encoded in accordance with e.g., the MPEG-2 (Moving Picture Experts Group phase 2) system to output the low bitrate compressed picture information (bitstream). A picture information conversion device, similarly embodying the present invention, is fed with the compressed picture information (bitstream) of the CBR (Constant Bit Rate) or the VBR (Variable Bit Rate) to output the compressed picture information (bitstream) of the CBR. FIG. 2 shows a picture information conversion device embodying the present invention. Meanwhile, the MPEG-2 is the picture information compression system adapted for coping with both the interlaced and progressive pictures and for both the standard and high resolution pictures.

Referring to FIG. 2, the picture information conversion device 1 includes an FF buffer 2, a compressed information analysis device 3, an information buffer 4, a VBV (Video Buffer Verifier) buffer 6, a variable length decoder 7, a dequantizer 8, a header data compression device 9, a code volume control device 10, an adaptive quantizer 11, a quantizer 12, a variable length coder 13 and a VBV buffer 14.

The FF buffer 2 has a small recording capacity and transiently stores encoded pictures of N frames in a GOP (group of pictures) of the compressed picture information (bitstream) of the high bitrate (larege code volume) input from outside. For example, the FF buffer 2 transiently stores six frames of the encoded pictures of the high bitrate compressed picture information (bitstream) input from outside.

For example, if the compressed picture information (bitstream), encoded at 18 Mbps, is input, the minimum recording capacity of 450 KB is required for storing the compressed picture information (bitstream) for six frames, as indicated by the following computational processing:

$$18 \text{ Mbps} \times 6 \text{ frames} \div 30 \text{ frames/s} = 3.6 \text{ Mb} = 450 \text{ KB}.$$

In the picture information conversion device 1 according to the present invention, the high bitrate compressed picture information (bitstream), actually input from outside, is termed a real GOP, abbreviated herein to r-GOP, as being a GOP of the compressed picture information (bitstream) actually input to the picture information conversion device 1. The recording capacity of the FF buffer 2 is set to a value capable of storing the GOPs of plural sorts previously recognized by the picture information conversion device 1.

The FF buffer 2 furnishes this stored compressed picture information (bitstream) to the VBV buffer 6.

Based on the syntax prescribed in the MPEG-2, the compressed information analysis device 3 extracts the information necessary for respective processing operations, as later explained, from the compressed picture information (bitstream) input to the FF buffer 2, to furnish the extracted information, referred to below as the analysis result information, to the information buffer 4. The analysis result information includes, for example, an average quantization scale (av_q_scale), total bits of a picture (total_bits), number of bits of the header data (header_bits), picture encoding type information (picture_coding_type), maximum and minimum values of activity (act_max, act_min) and the quantization scale information (q_scale) as the information pertinent to the macroblock-based quantized value.

Moreover, based on the compressed picture information (bitstream) input to the FF buffer 2, the compressed information analysis device 3 calculates the activity actj of e.g., a macro-block j, using one of computational equations shown in Table 1:

TABLE 1

| Method | $act_j$ |
|---|---|
| Q | $Quantization\_scale_j$ |
| QQ | $Quantization\_scale_j^2$ |
| QB | $Quantization\_scale_j \times number\_of\_bits\_in\_MB_j$ |
| QQB | $(Quantization\_scale)^2 \times number\_of\_bits\_in\_MB_j$ |
| QQBB | $(Quantization\_scale)^2 \times (number\_of\_bits\_in\_MB_j)^2$ |

It is noted that the quantization scale Quantization_scale$_j$ of a macro-blockj and the number of bits of the macro-blockj number_of_bits_in_MBj are the information contained in the analysis result information. The compressed information analysis device 3 then calculates, using the calculated $act_j$, the $act_{max}$ and $act_{min}$, as the maximum and minimum values of $act_j$, and $act_{avg}$, as an average value of the $act_j$. Based on the calculated $act_{max}$, $act_{min}$ and $act_{avg}$, $\theta_{max}$ and $\theta_{min}$, as set based on a request for extension, and on the following equation (3) derived from the following equations (1) and (2) as the equations of the principle:

$$\theta_{\max} = \frac{\beta \times act_{\max} + act_{avg}}{\gamma \times act_{avg} + act_{\max}} \quad act_{\max} = \max_j\{act_j\} \quad (1)$$

$$\theta_{\min} = \frac{\beta \times act_{\min} + act_{avg}}{\gamma \times act_{avg} + act_{\min}} \quad act_{\min} = \min_j\{act_j\} \quad (2)$$

$$\beta = \frac{\theta_{\max}\theta_{\min}(act_{\max} - act_{\min}) + \theta_{\max} - \theta_{\min}}{act_{\max}\theta_{\max} - act_{\min}\theta_{\min}} \quad (3)$$

$$\gamma = \frac{act_{\max} - act_{\min} + act_{\max}act_{\min}(\theta_{\max} - \theta_{\min})}{act_{\max}\theta_{\max} - act_{\min}\theta_{\min}}$$

coefficients $\beta$ and $\gamma$ used for calculating the quantization scale.

The compressed information analysis device 3 then furnishes the calculated coefficients $\beta$ and $\gamma$, along with the analysis result information, to the information buffer 4.

Meanwhile, the values of $\theta_{max}$ and $\theta_{min}$ generally are 1.8 and 0.4, respectively.

Figure 3:
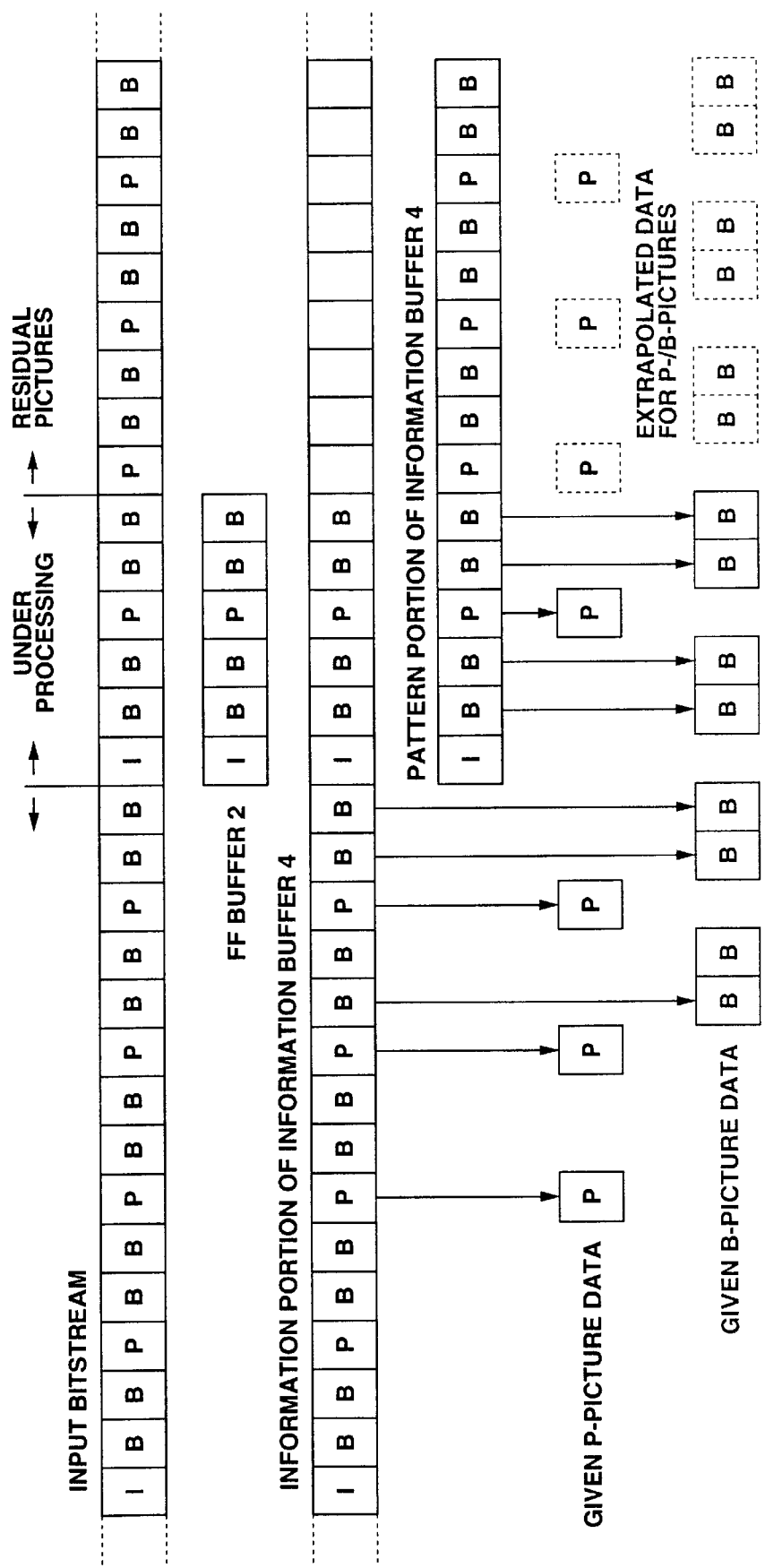
FIG. 3 shows the state in which the picture encoding type information of the compressed picture information (bitstream) is being stored in an FF buffer and in an information buffer.

The information buffer 4 includes an information portion and a pattern portionfor storing e.g., the picture coding type (picture_coding_type), as shown in FIG. 3. On the other hand, the information buffer 4 stores the coefficients $\beta$ and $\gamma$ furnished from the compressed information analysis device 3.

The information portion of the information buffer 4 is made up of a cyclic buffer for storage of the analysis result information furnished from the compressed information analysis device 3. Specifically, the information portion of the information buffer 4 stores the picture coding type information (picture_coding_type) of the compressed picture information (bitstream) input up to now to the FF buffer 2. The picture coding type information (picture coding type) is used for constituting the pseudo-GOP, abbreviated below to p-GOP. This p-GOP means a GOP generated on prediction of the picture the structure of the overall GOP comprising N franes of the compressed picture information (bitstream) based on the N frames of the compressed picture information (bitstream) stored in the FF buffer 2 and on the above-mentioned analysis result information. Moreover, the information portion of the information buffer 4 holds a maximum number of memeory elements represented by max_length_InfoBuffer. The number of memory elements denotes the length of the p-GOP, that is the numberof pictures making up the p-GOP, and is computed as an index (Index) from the fil equation (4):

Index=frame_counter%max_length_infoBuffer    (4)

Specifically, the information portion of the information buffer 4 has a storage capacity sufficient to store 256 picture coding type information (picture_coding_type) which is equal to the maximum number of frames that can be contained in one GOP prescribed in MPEG. Also, when the information portion of the information buffer 4 has stored the information to its full memory capacity, it deletes its contents beginning from past data stored longest therein.

FIG. 4 shows a program indicating that the analysis result information, such as average quantization scale (avg_scale), number of bits of a picture (total_bits), number of bits of the header data (header_bits), picture coding type information (picture_coding_type) or maximum and minimum values of activity (act_max, act_min), is stored in a memory constituted by the maximum number of memory elements represented as max_length_InfoBuffer.

The pattern portion of the information buffer 4 records the information constituting the p-GOP, referred to below as the p-GOP constituting information. Specifically, the pattern portion of the information buffer 4 has recorded therein the information pertinent to the structure of the picture type of plural sorts of the GOP recognized at the outset in the picture information conversion device 1 or the information pertinent to the structure of the picture type of the GOP of the input picture coding type information (picture_coding_type) of the compressed picture information (bitstream) input up to now to the FF buffer 2, as the p-GOP constituting information. Since the pattern portion of the information buffer 4 deals with the case wherein the structure of the picturte type of the GOP of the input compressed picture information (bitstream) is variable, it continually updates the p-GOP constituting information, such as the picture encoding type information, in keeping with the input compressed picture information (bitstream), during the time of processing each picture of the p-GOP, so that the structure of the picture type of the p-GOP will be equal or approximate to the structurte of the picture type of the GOP of the compressed picture information (bitstream) currently input to the FF buffer 2. Moreover, if the extrapolation is performed for bit allocation, the picture type of the residual picture of the p-GOP is determined based on the analysis result information, such as the picture coding type information, recorded in the pattern portion of the information buffer 4.

So, the information buffer 4 sends to a bit allocation device 5 the p-GOP constituting information which is based on the structure of the picture type of the GOP of the compressed picture information (bitstream) cyrrently input to the FF buffer 2.

The bit allocation device 5 is fed from the information buffer 4 witht the p-GOP constituting information which is continually updated in order to cope with the pcib currently input to the FF buffer 2. Based on this furnished p-GOP constituting information, the bit allocation device 5 constitutes the p-GOP corresponding to the compressed picture information (bitstream) currently input to the FF buffer 2. Based on the so-constituted p-GOP and on a value of the complexoty of each picture of the p-GOP, as calculated using the p-GOP constituting information, the bit allocation device 5 calculates the command code volume allocated to the respective pictures of the p-GOP, and allocates the calculated command code volume to each picture of the p-GOP.

However, if extrapolation is required, the bit allocation device 5 extrapolates the remaining pictures, predicted to be residual pictures of the GOP inclusive of the N frames of the compressed picture information (bitstream) stored in the FF buffer 2, based on the p-GOP constituting information supplied from the information buffer 4 and on the above-mentioned N frames, to constitute the p-GOP corresponding to the compressed picture information (bitstream) currently input to the FF buffer 2. Based on the so-constructed p-GOP and on the complexity value of each picture of the p-GOP, including the residual pictures calculated using the p-GOP constituting information, the bit allocation device 5 calculates the command code volume allocated to each picture of the p-COP to allocate the so-calculated command code volume to each picture of the p-COP.

For optimum bit allocation to the respective pictures, the bit allocation device 5 allocates a smaller number of bits and a larger number of bits to leading and trailing side pictures of the p-GOP, respectively.

The bit allocation device 5 furnishes the so-calculated information, pertinent to the command code volume to be allocated to each picture of the p-COP, to the header data compression device 9 and to the code volume control device 10. The information pertinent to the command code volume to be allocated to each picture of the p-COP is referred to below as the command code volume allocation information.

The VBV buffer 6 is a buffer used for a decoder and transiently stores the compressed picture information (bitstream) furnished from the FF buffer 2 to route the stored compressed picture information (bitstream) to the variable length decoder 7. Since it is the compressed picture information (bitstream), encoded to meet the constraint condition for the VBV as prescribed in MPEG-2, that is stored in the VBV buffer 6, there is no risk of overflow and/or underflow occurring in the VBV buffer 6.

The variable length decoder 7 decodes the variable length codes of the compressed picture information (bitstream) funished from the VBV buffer 6 to separate the bitstream into header data and DCT data. The variable length decoder 7 routes the so-separated header data to the header data compression device 9, while routing the DCT data to the dequantizer 8.

The dequantizer 8 dequantizes two-dimensionally arrayed and quantized DCT coefficients, included in the DCT data furnished from the variable length decoder 7, and routes the dequantized DCT coefficients to the quantizer 12.

For preventing the underflow, the header data compression device 9 is in operation in case bit allocation to each picture of the p-GOP is not performed, in such a manner as to satisfy the bitrate requirements that there should be limitation to the number of bits allocated to each picture of the p-GOP. That is, the header data compression device 9 is in operation if, based on the command code volume allocation information calculated by and furnished from the bit allocation device 5, the command code volume to each picture of the p-GOP is lower than the number of bits for header data of each picture. Specifically, the header data compression device 9 compresses the header data furnished from the variable length decoder 7 to supply the compressed header data to the variable length coder 13 if, based on the command code volume allocation information furnished from the bit allocation device 5, the command code volume to each picture of the p-GOP is lower than the number of bits for header data of each picture.

On the other hand, if the command code volume to each picture of the p-GOP is higher than the number of bits for header data of each picture, the header data compression device 9 does not proceed to compression of the header data. Specifically, if the command code volume to each picture of the p-GOP is higher than the number of bits for header data of each picture, header data compression device 9 does not proceed to compression of the header data supplied from the variable length decoder 7 but routes the non-compressed header data to the variable length coder 13.

On the other hand, the header data compression device 9 converts all or part of the motion vector (MV) from the bidirectional MV to the unidirectional MV, that is from the MV of the dual direction to the MV of the forward or reverse direction, using a parameter a derived from the rate of the command code volume to the header data of each picture, by way of compressing the header data. Specifically, the header data compression device 9 operates under the condition shown in FIG. 5 not to compress the header data, to compress part of the header data and to compress all of the headerdata if a represented by the following equation (5):

$$\alpha = 2 \times \left(1 - \frac{t \arg et\_number\_of\_bits}{header\_data}\right) \quad (5)$$

is such that $\alpha \leq 0$, $0 < \alpha < 1$ and $\alpha \geq 1$, respectively.

If the compressed picture information (bitstream) of the VBR is input to the FF buffer 2, the length of the p-GOP constituted by the bit allocation device 5 becomes variable. So, the header data compression device 9 verifies, based on the updated command code volume allocation information supplied from the bit allocation device 5, whether or not the header data supplied from the variable length decoder 7 is to be compressed. If the header data compression device 9 has verified that the header data is to be compressed, the header data compression device 9 proceeds to compression of header data to send the compressed header data to the variable length coder 13.

The code volume control device 10 recognizes the code volume of the compressed picture information (bitstream) supplied to the VBV buffer 14 to control the code volume (number of bits) generated by the quantization device 12 to generate a reference quantization scale (reference_q_scale) with the use of the feedback control designed for controlling the code volume supplied by the VBV buffer 14. Based on the command code volume allocation information, supplied from the bit allocation device 5, and on the information pertinent to the code volume of the low bitrate compressed picture information (bitstream) supplied from the VBV buffer 14 and which is output by the VBV buffer 14 to outside, the code volume control device 10 generates the reference quantization scale in order that the low bitrate compressed picture information (bitstream), variable length encoded by the variable length coder 13, will not produce overflow and/or underflow in the VBV buffer 14. The code volume control device 10 sends the generated reference quantization scale to the adaptive quantizer 11.

The adaptive quantizer 11 generates the quantization scale Quantization_scale$_j$ based on the reference quantization scale and the normalized activity (normalized_act$_j$). The adaptive quantizer 11 supplies the generated quantization scale to the quantizer 12. The adaptive quantizer 11, furnishing the quantization scale to the quantizer 12, controls the quantization width of the matrix for quantization used by the quantizer 12.

Based on the quantization scale, supplied from the adaptive quantizer 11, the quantizer 12 quantizes the DCT coefficients, supplied from the dequantizer 8, so that the output bitrate will be constant (CBR). The quantizer 12 sends the quantized DCT coefficients to the variable length coder 13.

The quantization scale for the macroblock is based on the calculated value of the activity allocated to the macroblock $\alpha$ and to the parameter $\beta$.

The variable length coder 13 variable-length encodes the quantized DCT coefficients supplied from the quantizer 12 and the header data supplied from the header data compression device 9. The variable length coder 13 sends the variable-length coded DCT coefficients and the header data as the low bitrate compressed picture information (bitstream) to the code buffer 14.

The VBV buffer 14 is used for controlling the code volume so that the information volume of the compressed picture information (bitstream) of the low bitrate to be output will be made uniform. The VBV buffer 14 is fed from the variable length coder 13 with the variable length encoded low bitrate compressed picture information (bitstream) to store the supplied the low bitrate compressed picture information (bitstream).

Since the compressed picture information (bitstream), encoded to satisfy the VBV constraint condition prescribed in the MPEG-2, is stored in the VBV buffer 14, there is no risk of the overflow and/or the underflow occurring in the VBV buffer 14. The VBV buffer 14 outputs the compressed picture information (bitstream) stored therein, while sending the information pertinent to the number of bits of the compressed picture information (bitstream) to be output, generated on quantization by the quantizer 12, to the code volume control device 10.

In the above-described picture information conversion device 1, the bit allocation device 5 constructs the p-GOP, corresponding to the compressed picture information (bitstream) currently input to the FF buffer 2, based on the p-GOP constituting information furnished from the information buffer 4. Based on the so-constructed p-GOP and the complexity value of each picture of the GOP, calculated using the p-GOP constituting information, the bit allocation device 5 calculates the command code volume to be allocated to each picture of the p-GOP to allocate the calculated command code volume to each picture of the p-GOP. The bit allocation device 5 sends the command code volume allocation information to the header data compression device 9 and to the code volume control device 10.

If the command code volume to each picture of the p-GOP is lower than the number of bits for header data supplied from the bit allocation device 5, the header data compression device 9 compresses the header data furnished from the variable length decoder 7, based on the command code volume allocation information sent from the bit allocation device 5, to route the compressed header data to the variable length coder 13. If, on the other hand, the command code volume to each picture of the p-GOP is higher than the number of bits forhte header data of each picture, the header data compression device 9 does not proceed to compression of the header data supplied from the variable length decoder 7 but routes the non-compressed header data to the variable length coder 13.

Based on the reference quantization scale, supplied from the code volume control device 10, and on the normalized activity (normalized_$act_j$), the adaptive quantizer 11 generates the quantization scale (q_scale). The adaptive quantizer 11 sends this generated quantization scale to the quantizer 12. The adaptive quantizer 11, thus furnishing the quantization scale to the quantizer 12, controls the quantization width of the matrix for quantization used in the quantizer 12.

Based on the reference quantization scale, supplied from the code volume control device 10, and on the normalized activity (normalized_$act_j$), the adaptive quantizer 11 generates the quantization scale (q scale). The adaptive quantizer 11 sends the generated quantization scale to the quantizer 12. The adaptive quantizer 11, thus sending the quantization scale to the quantizer 12, controls the quantization width of the matrix for quantization used in the quantizer 12.

The p-GOP, used in the picture information conversion device 1, is explained in detail.

First, the p-GOP is composed of a set of one or more pictures necessarily comprising only one I-picture in each GOP. The number of pictures making up the p-GOP, that is the length of the p-GOP, is variable. The reason is that the number of pictures depends on the manner in which the I-picture included in the p-GOP is stored in the FF buffer 2 and detected by the picture information conversion device 1.

For specifically expaining the p-GOP, assume that the FF buffer 2 stores a set of pictures "I, B1, B2, P1, B3, B4, P2, ..., PK, Bm-1, Bm", where I, B and P denote I-, B- and P-pictures, respectively. Since the picture Bm is followed by an I-picture, the FF buffer 2 ceases to store the respective pictures after storing the picture Bm.

The GOP, made up of plural pictures, is termed a p-GOP. Specifically, the p-GOP is made up of a one frame of an I-picture, K frames of P pictures, where $K \leq 0$, and M frames of the B-pictures, where $M \geq 0$. That is, the total numberof pictures of the p-GOP is Lgop=1+K+M. For example, if M=0, the p-GOP is made up of "I, P1, P2, ..., PK", whereas, if K=M=0, the p-GOP is made up of consecutive I-pictures, such as "I1, I2, I3, ...".

On the other hand, if the structure of the picture type of the GOP of the compressed picture information (bitstream) input to the picture information conversion device 1 is not recognized, plural such p-GOPs are generated.

The processing on the compressed picture information (bitstream), input to the FF buffer 2, is explained in detail.

Assume that the FF buffer 2 has stored the compressed picture information (bitstream) of six frames of pictures, and that the r-GOP is made up of 15 pictures, of which only one is an I-picture. In the above explanation on the p-GOP, the picture information conversion device 1 uses the picture coding type information input in the past to the FF buffer 2 to recognize the structure of the currently processed p-GOP.

If the compressed picture information (bitstream), input to the FF buffer 2, is not the variable GOP, the GOP of the compressed picture information (bitstream) is the r-GOP and is made up of 15 pictures. In this case, the r-GOP is processed in three separate portions. That is, the first two portions of the r-GOP are processed in terms of six pictures, whilst its last portion of three pictures is processed consecutively.

The residual pictures of the r-GOP need to be extrapolated before the command code volume is allocated to the pictures of the first two portions of the r-GOP. The reason is that, although these residual pictures are required for bit allocation to the currently processed pictures, it is as yet not known to the picture information conversion device 1 what sorts of pictures are these residual pictures.

In the FF buffer 2, there arise two selective cases, namely a case where the FF buffer 2 is completely filled with at least one frame of a picture comprising only one frame of an I-picture and a case where the FF buffer 2 is not completely filled with pictures but contains an I-picture.

The former case indicates that the FF buffer 2 has stored part or all of the pictures making up the p-GOP, whilst the latter case indicates that the FF buffer 2 has stored all of the pictures making up the p-GOP.

For calculating the complexity of the respective pictures making up the p-GOP, it is necessary in the former case to perform extrapolation for constituting residual pictures belonging to the currently processed p-GOP but which are as yet not stored in the FF buffer 2. However, in the latter case, no extrapolation is required because the totality of the pictures making up the p-GOP have been stored in the FF buffer 2.

For processing; respective portions of the p-GOP, it is necessary to analyze the structure of the p-GOP and to update the p-GOP constituting information.

In the following, three cases in which the processing of analyzing the structure of the p-GOP and the processing of updating the p-GOP constituting information are performed, are explained.

The first case is such a case in which the pattern portion of the information buffer 4 has completed storage of the p-GOP constituting information pertinent to the currently processed p-GOP when as yet the number of pictures of the currently processed p-GOP predicted based on the last supplied p-GOP constituting information has not reached the number of pictures scheduled to be stored. That is, in this first case, the length of the currently processed p-GOP is shorter than the length of the last processed p-GOP.

Let the difference between the number of pictures of the currently processed p-GOP and that of the last processed p-GOP and the remainder of the command code volume allocated to the currently processed p-GOP be Nshort and R, respectively. This R is represented by the following equation (6):

$$R = R_o - \sum_{\omega \in \theta} \text{number\_of\_generated\_bits}(\omega) \qquad (6)$$

In the processing of the first case, R and the lenth Lpgop of the p-GOP are updated using the following equation (7):

$$R := R - \frac{\text{output\_bit\_rate}}{\text{frame\_rate}} \times N_{\text{short}} \qquad (7)$$

$$L_{pgop} := L_{pgop} - N_{\text{short}}$$

During this time, the pattern portion of the information buffer 4 deletes the redundant p-GOP constituting information unnecessary for processing.

The second case is such a one in which the pattern portion of the information buffer 4 continues storing the p-GOP constituting information pertinent to the currently processed p-GOP even after the number of pictures of the currently processed p-GOP predicted as described above has reached the number of pictures scheduled to be stored. That is, the second case is such a case in which the length of the currently processed p-GOP is longer than that of the last processed p-GOP.

Let the difference between the number of pictures of the currently processed p-GOP and that of the last processed p-GOP and the remainder of the command code volume allocated to the currently processed p-GOP be Nlong and R, respectively.

In the processing of this second case, this R and the length Lpgop of the p-GOP are updated using the following equation (8):

$$R := R + \frac{\text{output\_bit\_rate}}{\text{frame\_rate}} \times N_{\text{long}} \qquad (8)$$

$$L_{pgop} := L_{pgop} + N_{\text{long}}$$

During this time, the pattern portion of the information buffer 4 stores the p-GOP constituting information required for processing.

The third case is such a case where the picture coding type information of the analysis result information with which the pattern portion of the information buffer 4 is fed for storage therein differs from the picture coding type information of the p-GOP constituting information stored in the pattern portion of the information buffer 4. That is, in this third case, the picture pattern of the r-GOP is changed.

In the processing of this third case, the pattern portion of the information buffer 4 continually updates the picture coding type information newly furnished from the compressed information analysis device 3.

The residual picture is able to hold variable different picture coding type information. However, this variable different picture coding type information is not recognized by the pattern portion of the information buffer 4. So, in this case, simply the extrapolation for bit allocation to the respective frames is performed by employing the past picture coding type information stored in the information buffer 4.

Before bit allocation to the respective frames, the complexity of the respective pictures of the currently processed p-GOP is represented by the following equation (9):

$$X = K \times \text{number\_of\_generated\_bits} \times \text{average\_quantization\_scale} \qquad (9)$$

Since only the picture coding type information for N frames, stored in the FF buffer 2, can be used, the complexity values of the other pictures need to be extrapolated. It is noted that, as mentioned above, extrapolation is necessary only for the initial processing.

Figure 6:
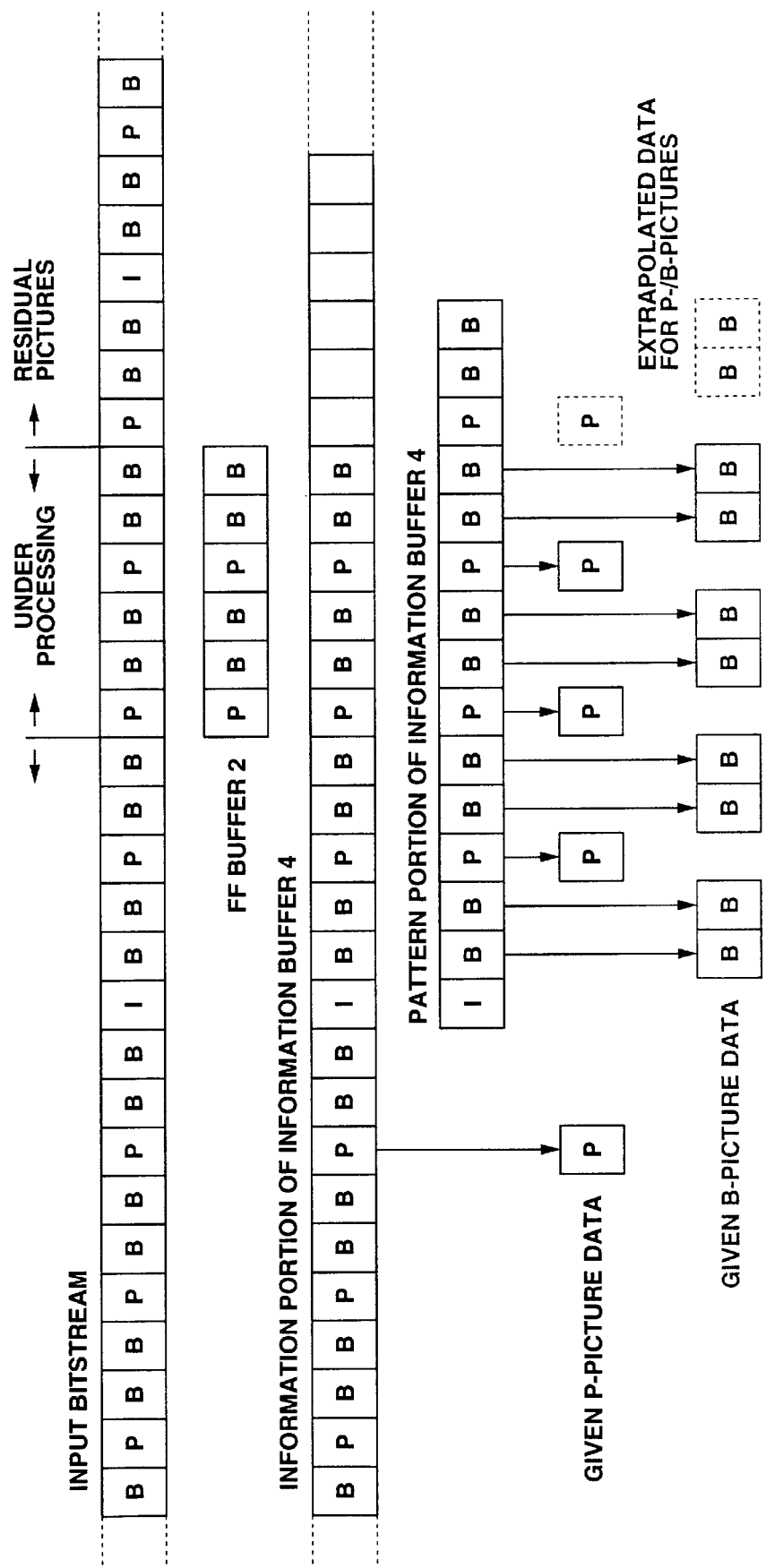
FIG. 6 shows the state in which the picture encoding type information of the compressed picture information (bitstream) is being stored in the FF buffer and in the information buffer.

The case where the structure of the r-GOP furnished to the information buffer 4 is "I, B, B, P, B, B, P, B, B, P, B, B, P, B, B" and where the information portion of the information buffer 4 is able to store the picture coding type information for six frames, is shown in FIGS. 3 and 6, showing the case where there is one frame of the I-picture in the FF buffer 2 and the case where there is no I-picture whatsoever in the FF buffer 2, respectively.

The complexity of each residual picture in the p-GOP is extrapolated using the complexities of the past and current pictures.

It is noted that Xi denotes the picture complexity of a picture i represented by the following equation (10):

$$X(i) = \mu \times i + \nu \qquad (10)$$

In this equation (10), which is an alternative representation of the equation (5), i is the number of residual pictures, whilst $\mu$ and $\nu$ denote coefficients determined using the minimum MSE as indicated by the following equation (11):

$$\mu = \frac{E[(X(i) - \overline{X})(i - \overline{i})]}{E[(i - \overline{i})^2]}, i \in \{1, \ldots, M\} \qquad (11)$$

$$\nu = \overline{X} - a \times \overline{i}$$

where E[ ] denotes an average operation, X and i are average values of the complexity X and M denotes the number of pictures used for calculations. Meanwhile, M is in general 4 and 8 for a P-picture and a B-picture, respectively.

The calculations of the complexity of each picture and the allocation of the command code volume to each picture with the aid of the calculated picture complexity (bit allocation) are hereinafter explained in detail.

In the picture information conversion device 1, the picture complexity values are used for calculatihng the command code volume (number of bits) allocated to the respective pictures. The picture complexity X indicating this picture complexity is represented by the following equation (9):31.

$$X = K \times \text{number\_of\_generated\_bits} \times \text{average\_quantization\_scale} \qquad (9)$$

This equation represents the theory on the bitrate distortion which states that the number of generated bits is reflected in the bitrate and the average quantization scale is reflected in the distortion. The coefficient K in the equation (9) is an adjustable variable which is based on the picture type. This coefficient K is in general 1.4 for I- and P-pictures and 1.0 for a B-picture and is crucial for both the picture quality and bit allocation.

In the picture information conversion device 1, the value of the coefficient K is adjusted to prevent the underflow. If, for example, the information volume of the header data to each picture is larger than the command code volume to each picture of the p-GOP, the value of the coefficient K for the I- and P-pictures in the p-GOP need to be low.

Moreover, the values of the picture complexity X are in reality variable and stable relatively. Therefore, in the picture information conversion device 1, the picturee complexity X is used to calculate the number of bits allocated to the respective pictures.

Figure 7:
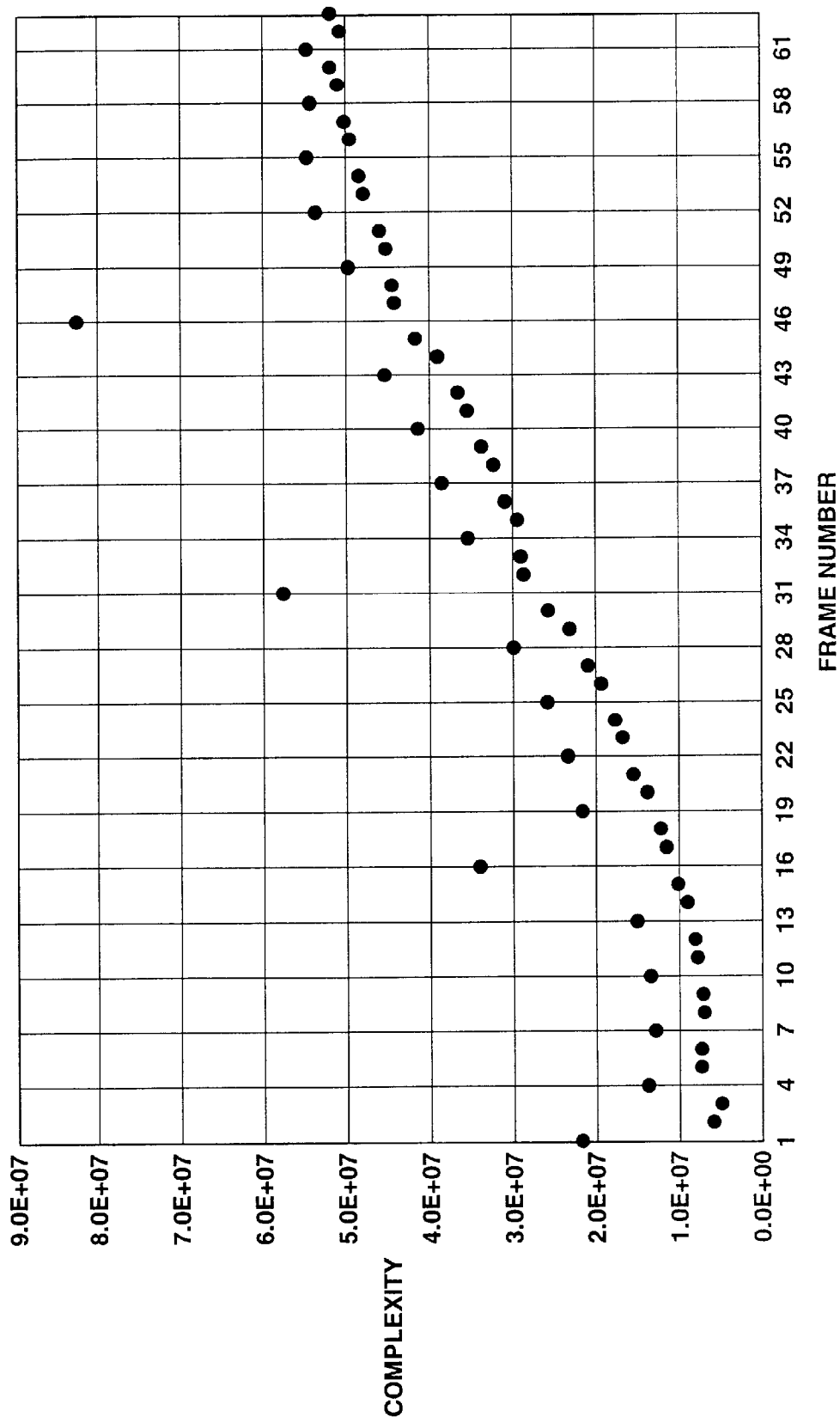
FIG. 7 shows the relation between each frame and complexity relevant to each frame.

Referring to FIG. 7, more bits are allocated to a picture of higher complexity, while less bits are allocated to a picture of lower complexity. If, for example, R denotes the numberr of bits allocated to the currently processed p-GOP and Xj is the complexity of a picture j, the number of bits allocated to the picture j is represented by the following equation (12):

$$\text{number\_of\_bits} = \frac{X_i}{\sum_j X_j} R \tag{12}$$

Meanwhile, since the equation (12) simply shows the principle, the number of bits in actuality is calculated using the equation (6) and the equations (18) to (21) which will be explained subsequently.

If j is the frame number of the picture to be now extrapolated and $\mu$ and v denote values calculated using the linear regression, the complexity $X_j$ of the picture j is represented by the following equation (13):

$$X_j = \mu \times j + v \tag{13}$$

That is, the equation (13) is the equation of extrapolation indicating the complexity of the residual picture j to be extrapolated. Meanwhile, $X_j$ of the residual picture is calculated using $X_j$ of the picture j stored in the FF buffer 2, linear extrapolation and the following equation (14):

$$\min_{j \in \Omega} \{(\mu \times j + v)^2\} \tag{14}$$

Next, three experiments used in each processing as later explained are now explained.

In these three experiments, a picture sequence sprinkler is used. the characteristics of the sequence is as shown in Table 2:

TABLE 2

Figure 47:
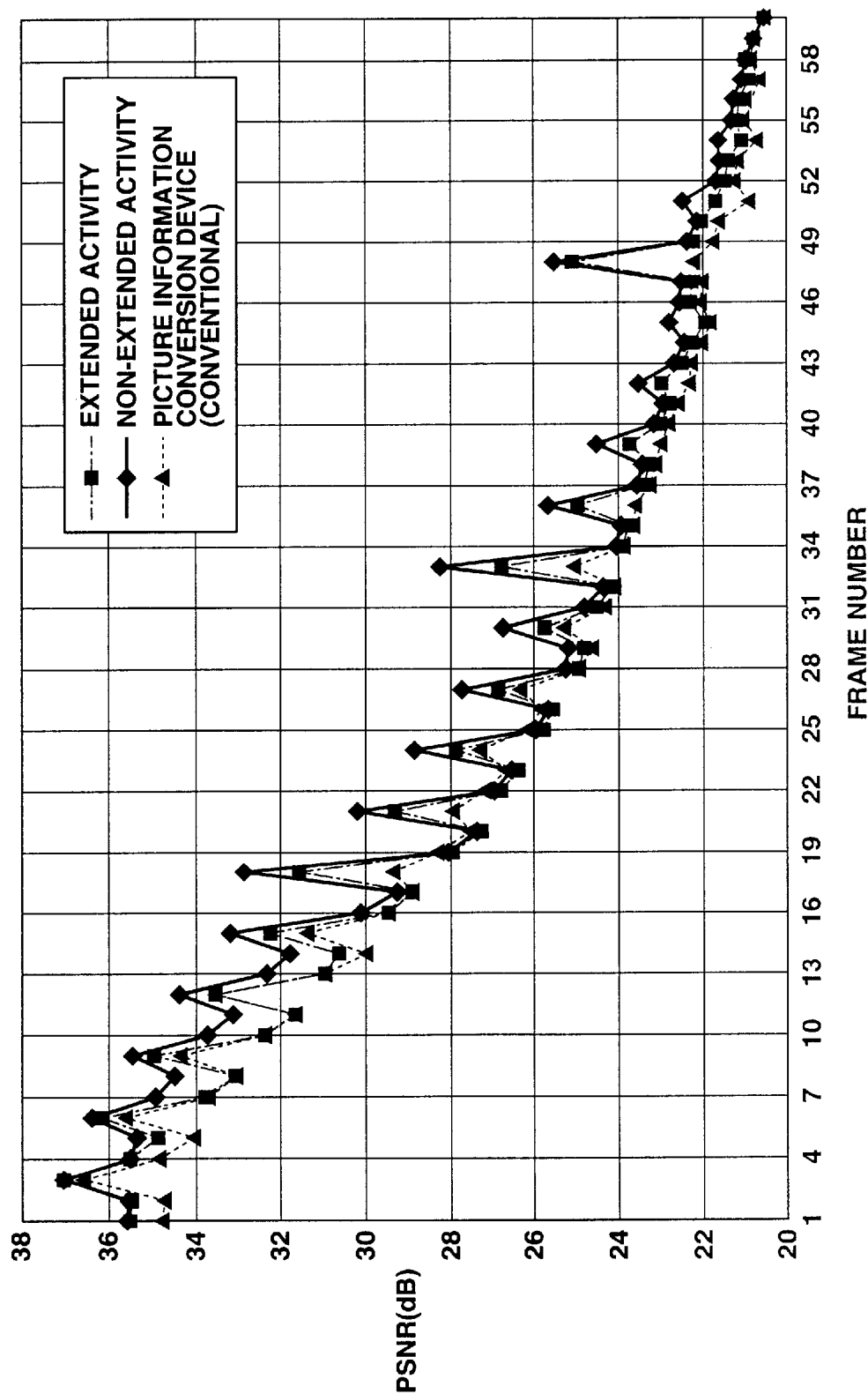
FIG. 47 shows the transition of the PSNR in each frame in the picture information compression device according to the present invention and that in the conventional picture information compression device.
Figure 48A:
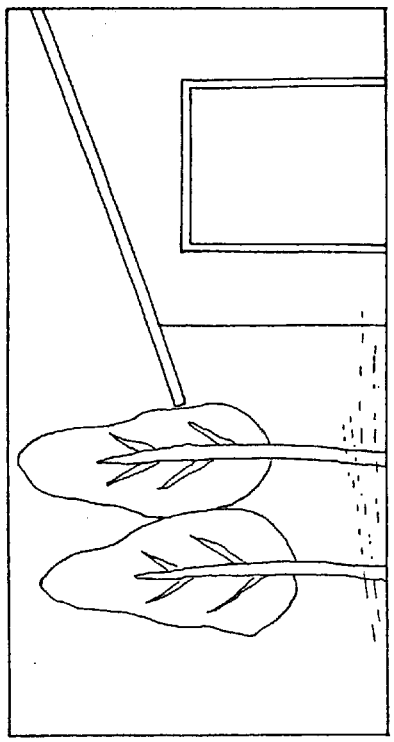
FIGS. 48A to D show pictures actually demonstrated on a display in each frame employing a picture sequence sprinkler.
Figure 48B:
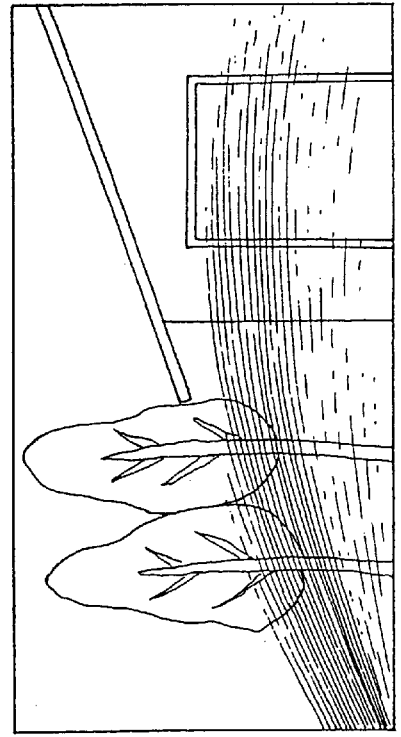
Figure 48C:
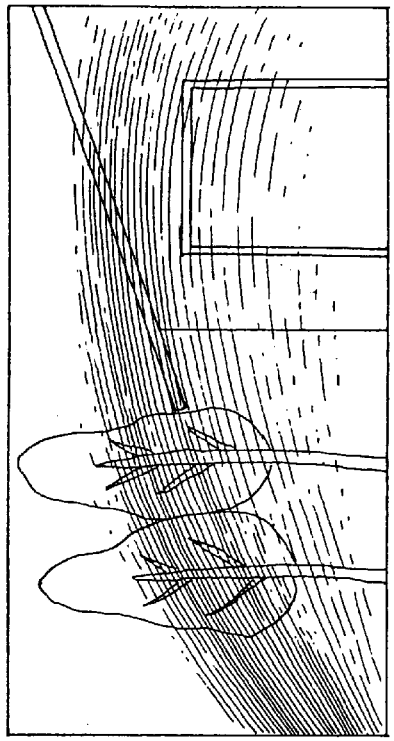
Figure 48D:
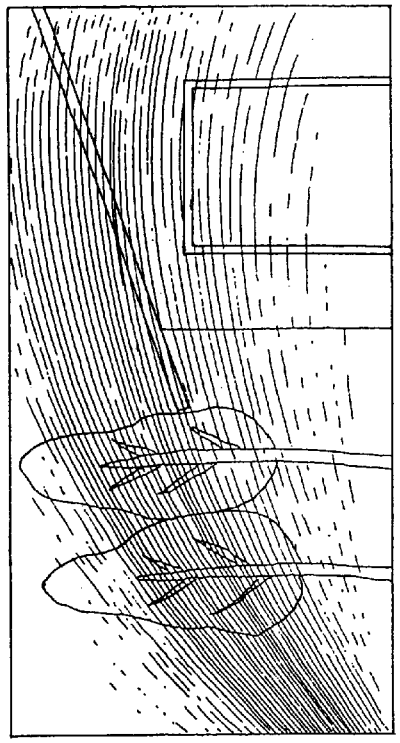

| | property | note |
|---|---|---|
| resolution | 1920 × 1080 | high definition |
| format | 4:2:0 | Y/U/V |
| GOP structure | IBBPBBPBBPBBPBB BBIBBPBBPBBPBBP | coding order display order |
| number of frames | 60 | see FIG. 47 |

The bitrate of the input compressed picture information (bitstream) and the bitrate of the output compressed picture information (bitstream), in each of the three experiments, are shown in Table 3.

TABLE 3

| | input bitrate | output bitrate |
|---|---|---|
| experiment 1 | CBR = 24 Mbps | CBR = 18 Mbps |
| experiment 2 | CBR = 18 Mbps | CBR = 12 Mbps |
| experiment 3 | VBR = 16 Mbps, 18 Mbps, 12 Mbps, 24 Mbps | CBR = 12 Mbps |

The relation between respective items corresponding to respective processing operations of bit allocation, header data compression and adaptive quantization on one hand and respective equations used in the picture information conversion device 1 and the picture information conversion device 20 in association with these items, as verified in each of the three experiments, on the other hand, is shown in Table 4.

TABLE 4

| | items | reference |
|---|---|---|
| bit allocation | complexity | equations (9), (12) |
| | coefficient K | equation (9) |
| | extrapolation | equations (11), (13) and (14) |
| header data compression | coefficient α | equation (5) and FIG. 4 |
| adaptive quantization | activity | equations (1), (2), (3) and (17) |

The relation of correspondence among the command code volume, the number of bits generated, PSNR and the recording capacity of the VBV buffer, usable actually in the conventional picture information conversion device 100 and in the picture information conversion device 1 according to the present invention, is shown in Table 5.

TABLE 5

| | conventional picture information conversion device | inventive picture information conversion device | |
|---|---|---|---|
| | | FF buffer 2 = 15 frames (no extrapolation) | FF buffer 2 = 6 frames (with extrapolation) |
| command code volume | ○ | ○ | ○ |
| number of bits generated | ○ | ○ | ○ |
| PSNR (dB) | ○ | ○ | ○ |
| capacity of VBV buffer | ○ | ○ | ○ |

Specifically, in the experiment 1, the compressed picture information (bitstream) is input at a high bitrate and encoded at a low bitrate. However, the experiment is conducted under a condition in which the bitrate limit has as yet not been reached. On the other hand, the experiment is conducted under a condition in which the compressed picture information (bitstream) is input in the vicinity of the bitrate limit. The main objective of the experiment 2 is to verify to which extent compression processing is performed on the header data by employing the equation (5) and also by employing FIG. 5 showing different cases dependent on the values of a calculated using the equation (5). The experiment 3 is also conducted under a condition in which the compressed picture information (bitstream) is input in VBR. The main objective of the experiment 3 is to verify the function of handling the variations in the bitrate and the compressed picture information (bitstream) in VBR.

By way of comparison, the conventional picture information conversion device 100, shown in FIG. 1, is used in all of the following experiments. This conventional picture information conversion device 100 is in need of all information for constituting a GOP which is based on the picture type. Moreover, in the conventional picture information conversion device 100, the totality of motion vectors (MV) generated in the decoding device are directly transferred to the encoding device. That is, in the conventional picture information conversion device 100, operation evaluation is not executed whatsoever.

In the experiment 1, the recording capacity of the FF buffer 2 is set for two cases, that is for a case without extrapolation and for a case with extrapolation, as shown in Table 5. In the absence of the extrapolation, the FF buffer 2 is of a large recording capacity, such that it can hold 15 frames of the compressed picture information (bitstream), whereas, in the presence of the extrapolation, the recording capacity of the FF buffer 2 is small such that it can store only six frames of the compressed picture information (bitstream). The result of the latter case can be verified on comparison thereof to the result of the former case.

Moreover, the picture skip function is provided for each of the picture information conversion device 1 and the conventional picture information conversion device 100. The picture skip function prevents the underflow with the aid of the number of residual bits R calculated using the equation (6) as later explained. For example, if the number of residual bits R is less than 0 and the absolute value R of this number of residual bits R is larger than one half the command code volume allocated to the currently processed p-GOP, the current picture is skipped.

The result of the experiment conducted in connection with the difference in the efficiency between the processing without extrapolation and that with extrapolation and the above-described bit allocation is hereinafter explained. In the present experiment, compression processing for header data is not performed and hence the underflow and/or picture skip (picture omission) is likely to be produced.

First, the case in which extrapolation is not used under the condition in the experiment 1 is explained.

Figure 8:
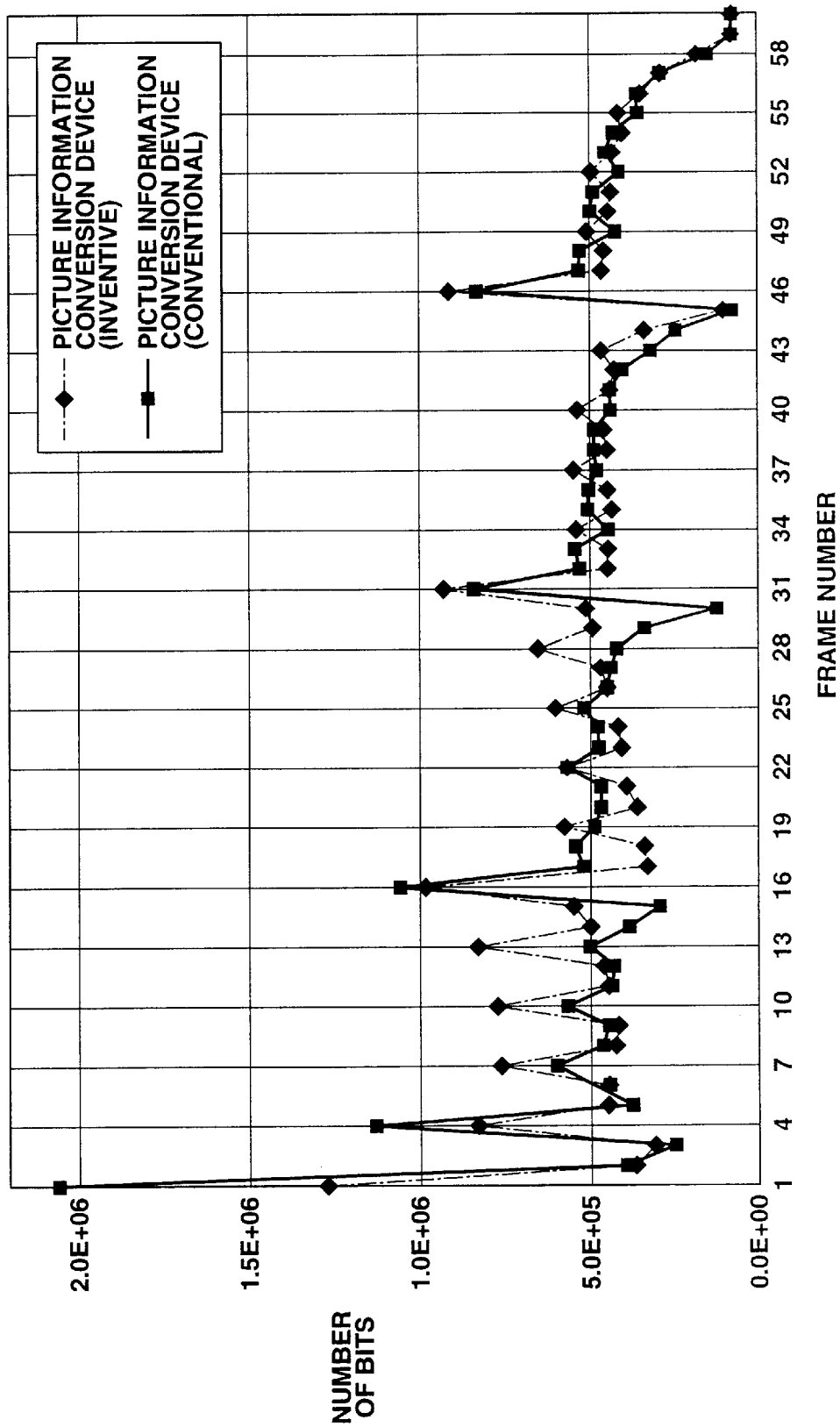
FIG. 8 shows the transition of the command code volume (number of bits) in each frame in case the picture information conversion device of the present invention is used and that in case the conventional picture information conversion device is used.

The transition of the command code volume in each frame in case of using the picture information conversion device 1 of the present invention and that in case of using the conventional picture information conversion device 100 are shown in FIG. 8, from which it is seen that, in the conventionally picture information conversion device 100, the command code volume is abruptly lowered in the vicinity of the trailing end of the second GOP. The reason is that the previous frame excessively uses the bits usable by the second GOP. Moreover, in the conventional picture information conversion device 100, dropout of the compressed picture information (bitstream) occurs at the trailing ends of the third and fourth GOPS. In the picture information conversion device 1 of the present invention, this deficiency is remedied.

Figure 9:
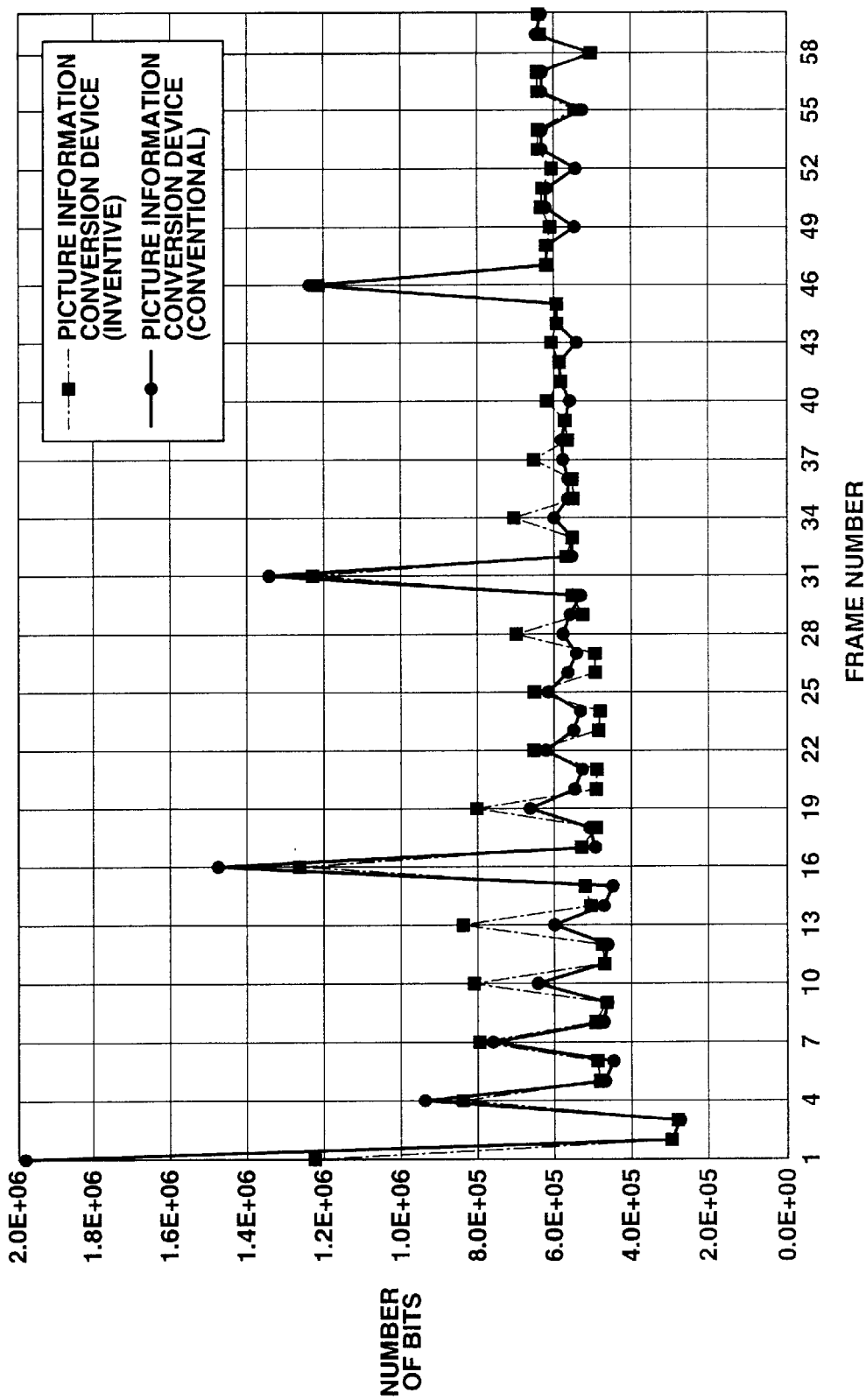
FIG. 9 shows the transition of the number of bits in each frame in case the picture information conversion device of the present invention is used and that in case the conventional picture information conversion device is used.

The transition of the number of bits generated in the respective frames in case of using the picture information conversion device 1 of the present invention and that in case of using the conventional picture information conversion device 100 are shown in FIG. 9, from which it is seen that, in the picture information conversion device 1 according to the present invention, the command code volume is distributed substantially equally to the respective I-pictures in the GOP. Meanwhile, in distributing the command code volume to the respective pictures, attention should be excercised so that possible changes of the initial state by the subsequent scenes will be taken into account. So, in the picture information conversion device 1 according to the present invention, the command code volume can be optimally allocated to the respective pictures even if the initial state and subsequent scenes are changed.

Figure 10:
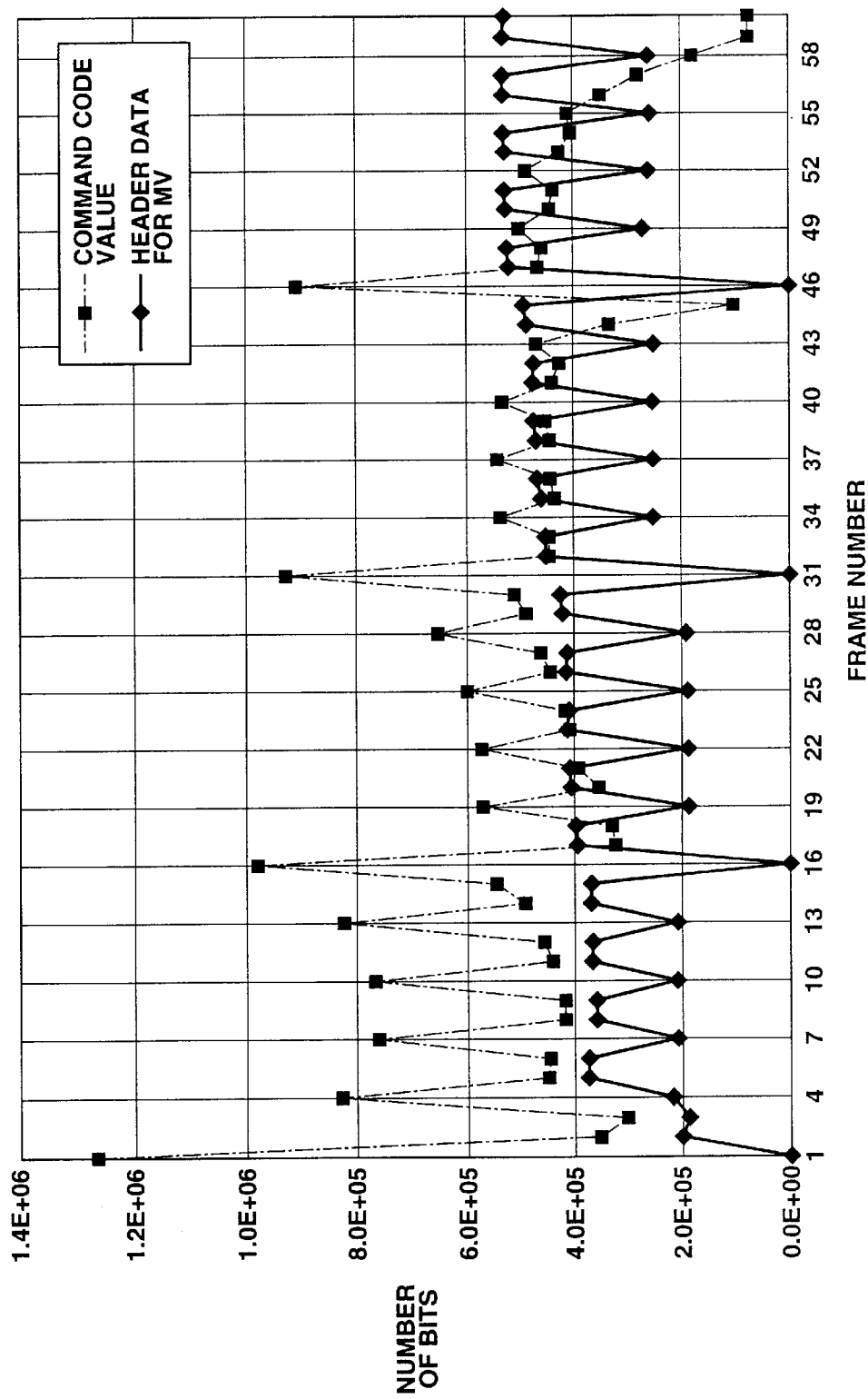
FIG. 10 shows the transition of the head data for MV and the transition of the command code volume in each frame of the picture information conversion device of the present invention.

Moreover, in case of the larger information volume, there occurs abrupt dropout in the command code volume. The transition in the command code volume and the header data for the motion vector (MV) in each frame of the picture information conversion device 1 according to the present invention is shown in FIG. 10, from which it is seen that the information volume in the header data in the entire B-pictures as from the third GOP exceeds the command code volume, as shown in FIG. 10. In such case, the value of the coefficient K in the equation (9) needs to be adjusted because it is only in the I- and P-pictures that more DCT data can be compressed if compression is to be performed. On the other hand, if smaller numbers of bits are allocated to the I- and P-pictures, complexity in the I- and P-pictures is lowered.

Figure 11:
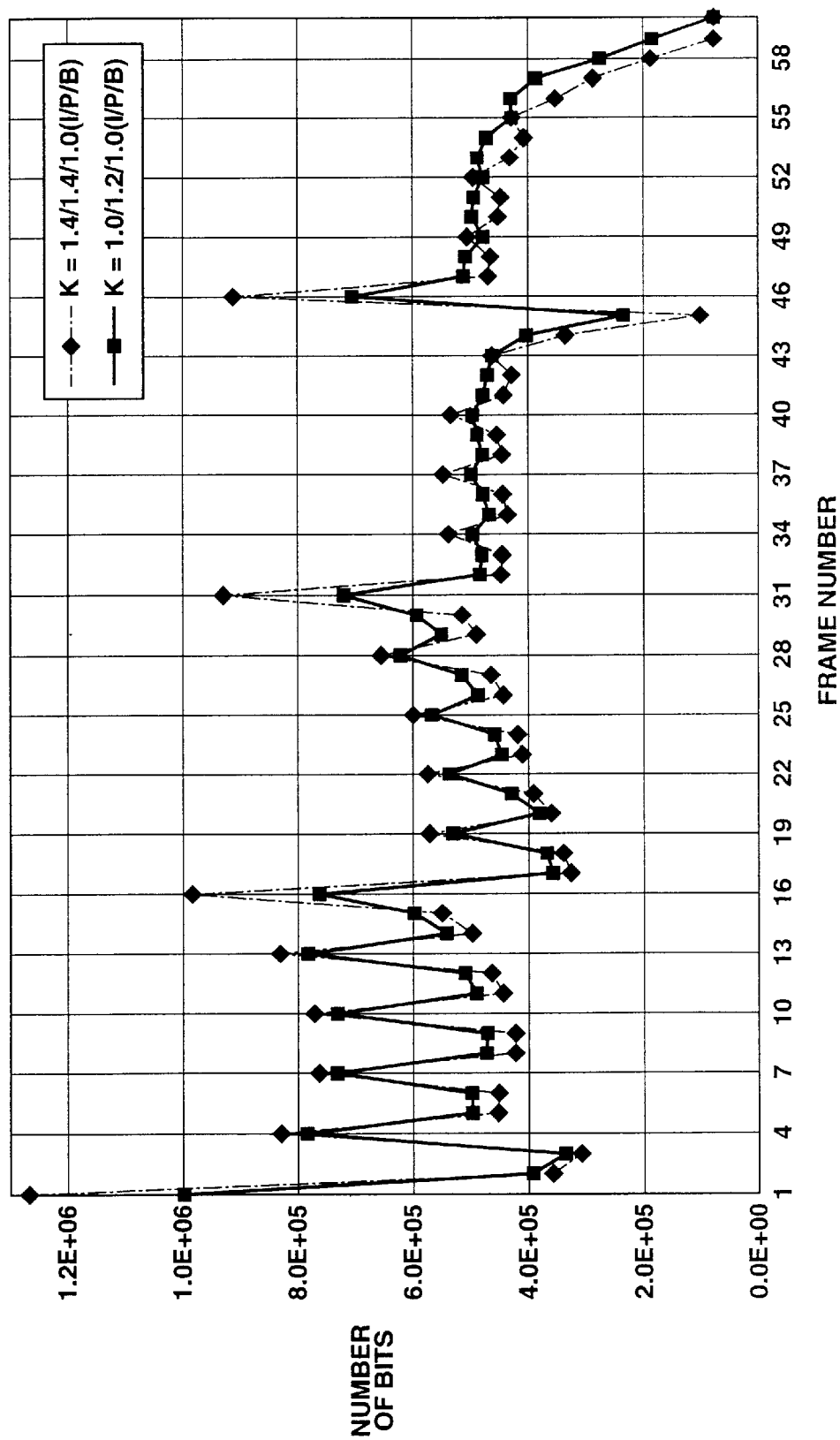
FIG. 11 shows the transition of allocation of the command code volume to each frame in case the value of the coefficient K is adjusted twice.

The transition of allocation of the command code volume to each frame due to performing the adjustment of the value of the coefficient K twice, is shown in FIG. 11, in which a case where the coefficient values of I-, P- and B-pictures are 1.0, 1.2 and 1.0, respectively, and a case where these values are 1.4, 1.4 and 1.0, respectively, are shown. By adjusting these coefficient values, abrupt dropout is postponed, even though the dropout of the compressed picture information (bitstream) persists.

Figure 12:
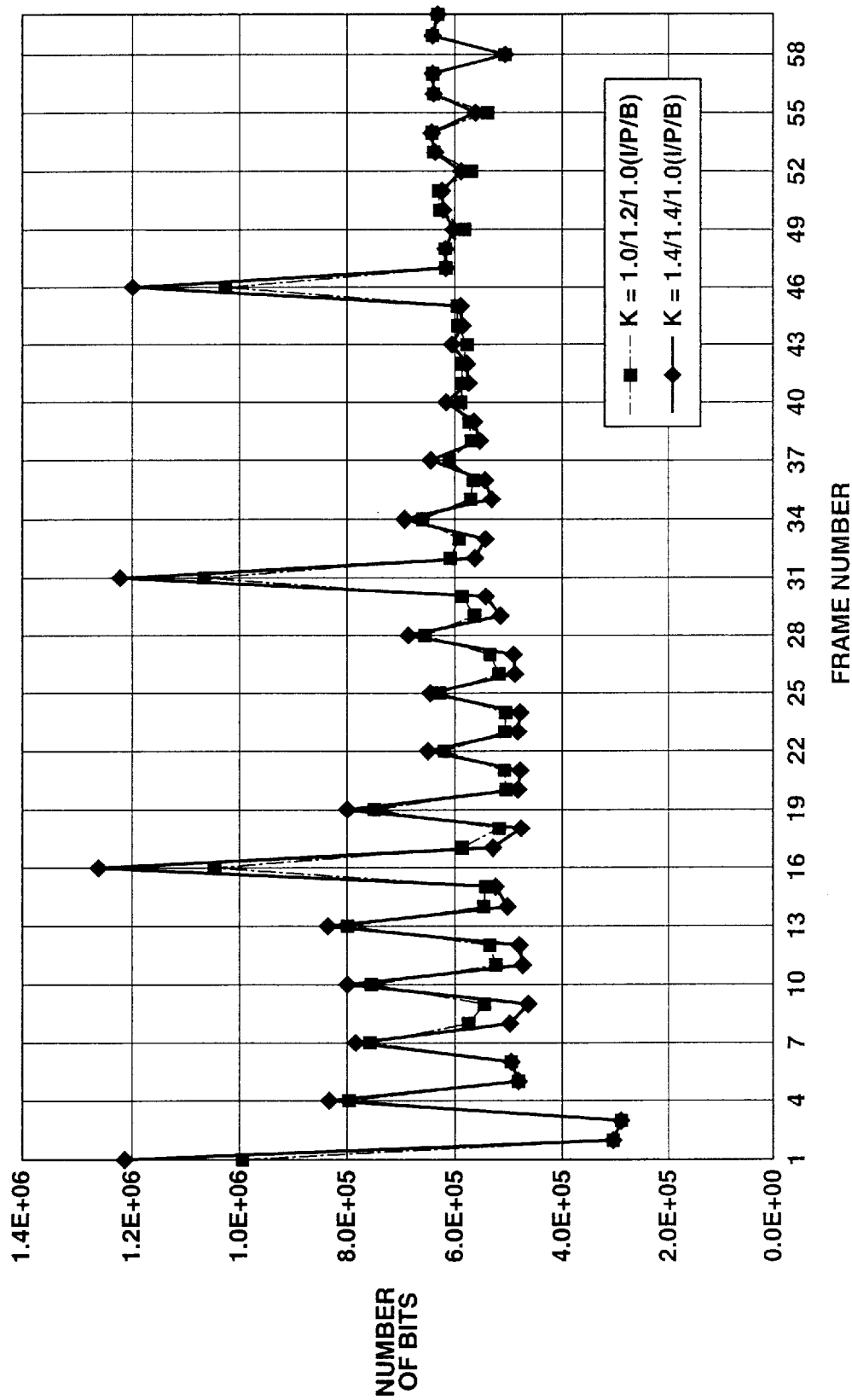
FIG. 12 shows the transition of the number of bits generated in each frame in case the value of the coefficient K is adjusted twice.

The transition of bits generated in each frame, caused by performing the adjustment of the value of the coefficient K twice, is shown in FIG. 12, in which a case where the coefficient values of I-, P- and B-pictures are 1.0, 1.2 and 1.0, respectively, and a case where these values are 1.4, 1.4 and 1.0, respectively, are shown.

Figure 13:
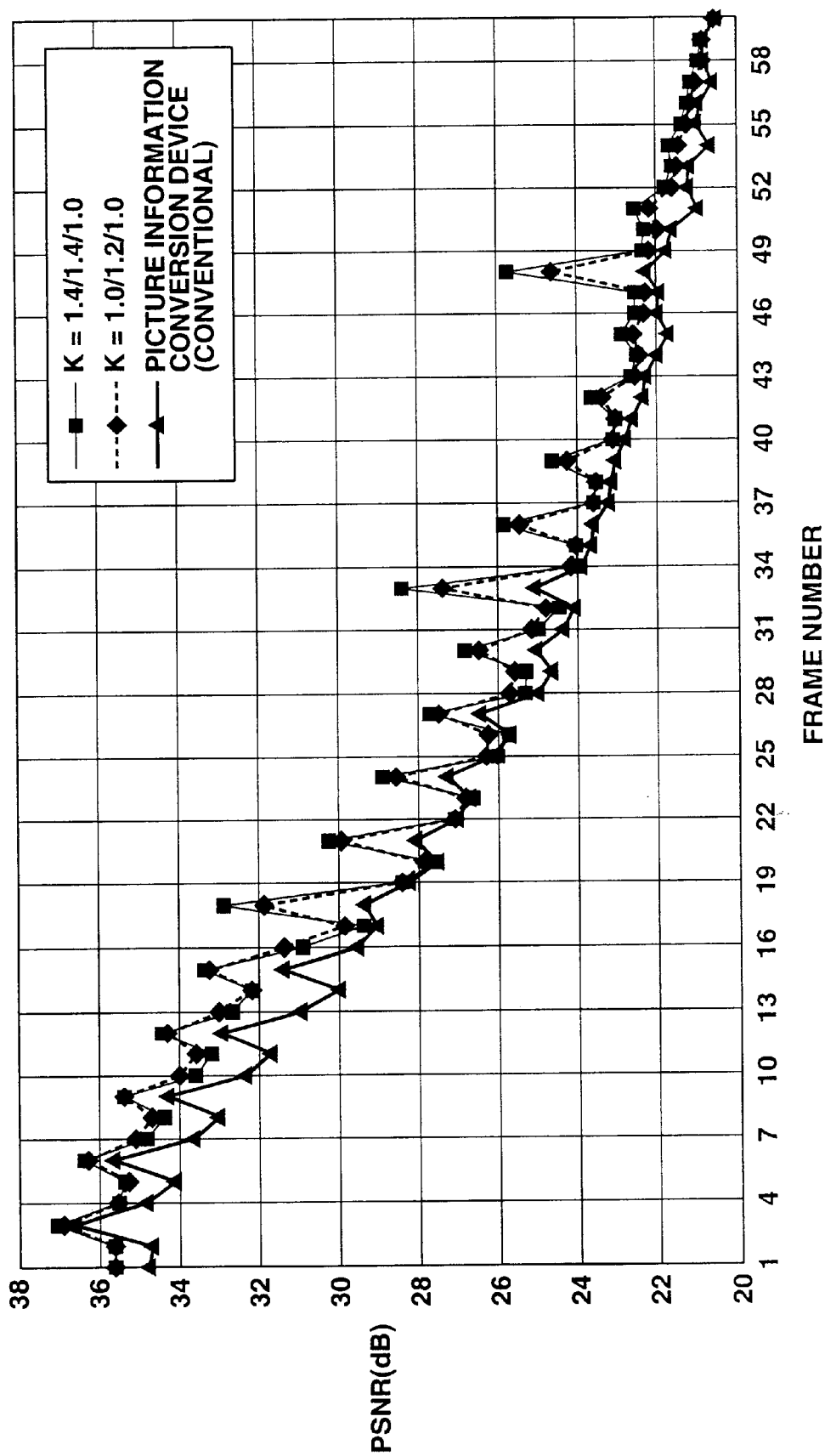
FIG. 13 shows the transition of the PNSR of each frame in the picture information conversion device of the present invention and that in the conventional picture information conversion device.

The transition of the PSNR in each frame, caused by performing the adjustment of the value of the coefficient K twice, in the picture information conversion device 1 of the present invention, and that in the conventional picture information conversion device 100, are shown in FIG. 13, in which a case where the coefficient values of I-, P- and B-pictures are 1.0, 1.2 and 1.0, respectively, and a case where these values are 1.4, 1.4 and 1.0, respectively, are shown for the picture information conversion device 1 of the present invention. In the picture information conversion device 1 of the present invention, the PSNR is improved appreciably by proper bit allocation to each frame. Moreover, in the picture information conversion device 1 of the present invention, the PSNR is lowered by lowering the complexity of each picture, while the probability of occurrence of the underflow is also lowered.

Figure 14:
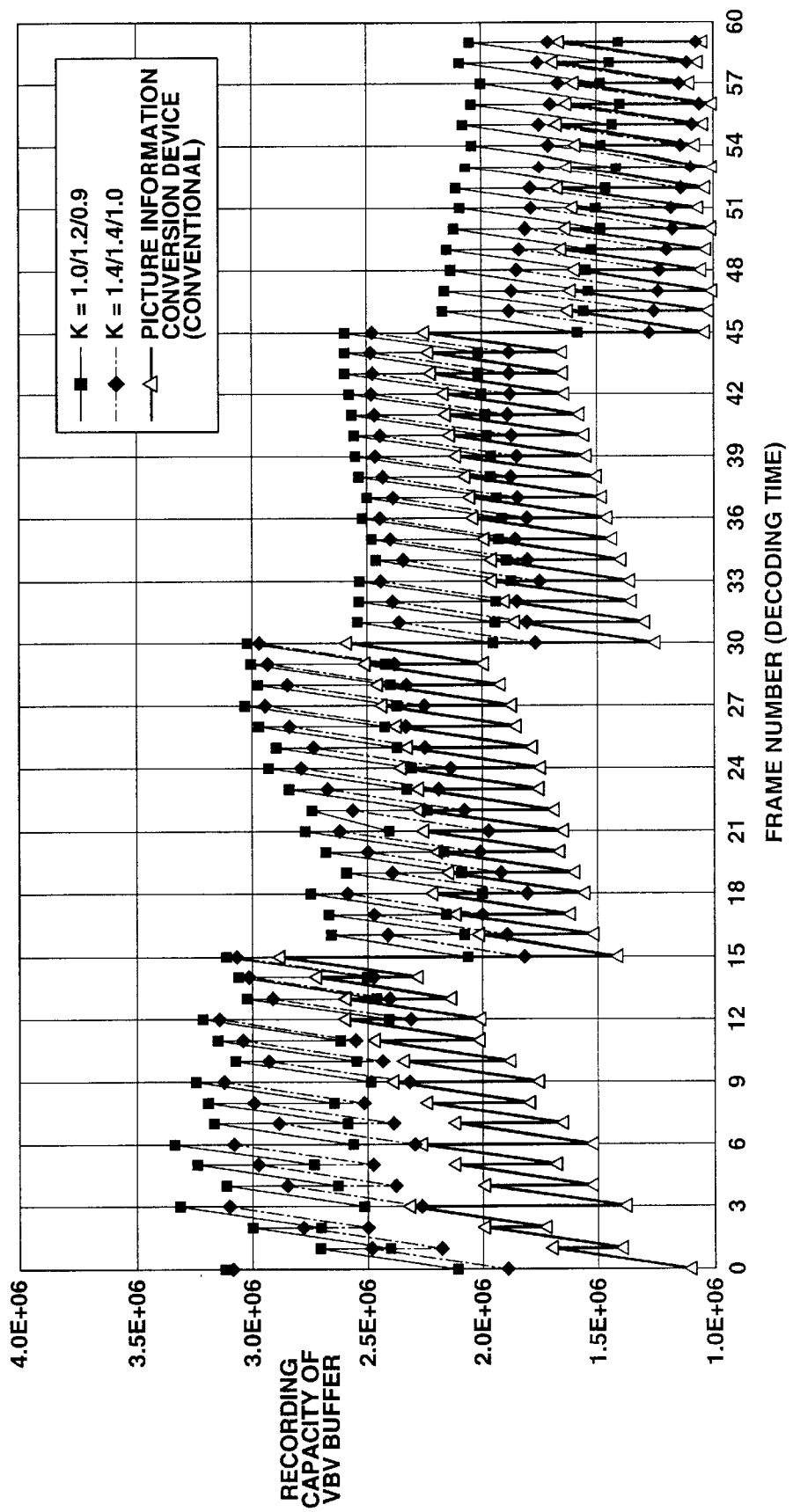
FIG. 14 shows the transition of the recording capacity of the VBV buffer with respect to the decoding time in the picture information conversion device of the present invention and that in the conventional picture information conversion device.

Moreover, the transition of the recording capacity of the VBV buffer 6 with respect to the decoding time, caused by performing the adjustment of the value of the coefficient K twice, in the picture information conversion device 1 of the present invention, and that in the conventional picture information conversion device 100, are shown in FIG. 14, in which a case where the coefficient values of I-, P- and B-pictures are 1.0, 1.2 and 1.9, respectively, and a case where these values are 1.4, 1.4 and 1.0, respectively, are shown for the picture information conversion device 1 of the present invention. The adjustment of the coefficient value K and the lowering of the complexity of the I- and P-pictures are effected in order to prevent the underflow. Also, the recording capacity of the VBV buffer 6 tends to be lowered as a result of the increased complexity of each picture. However, this tendency can be made less manifest by lowering the complexity of the I- and P-pictures.

Next, a case where extrapolation is performed under the condition shown in the experiment 1 is explained.

Figure 15:
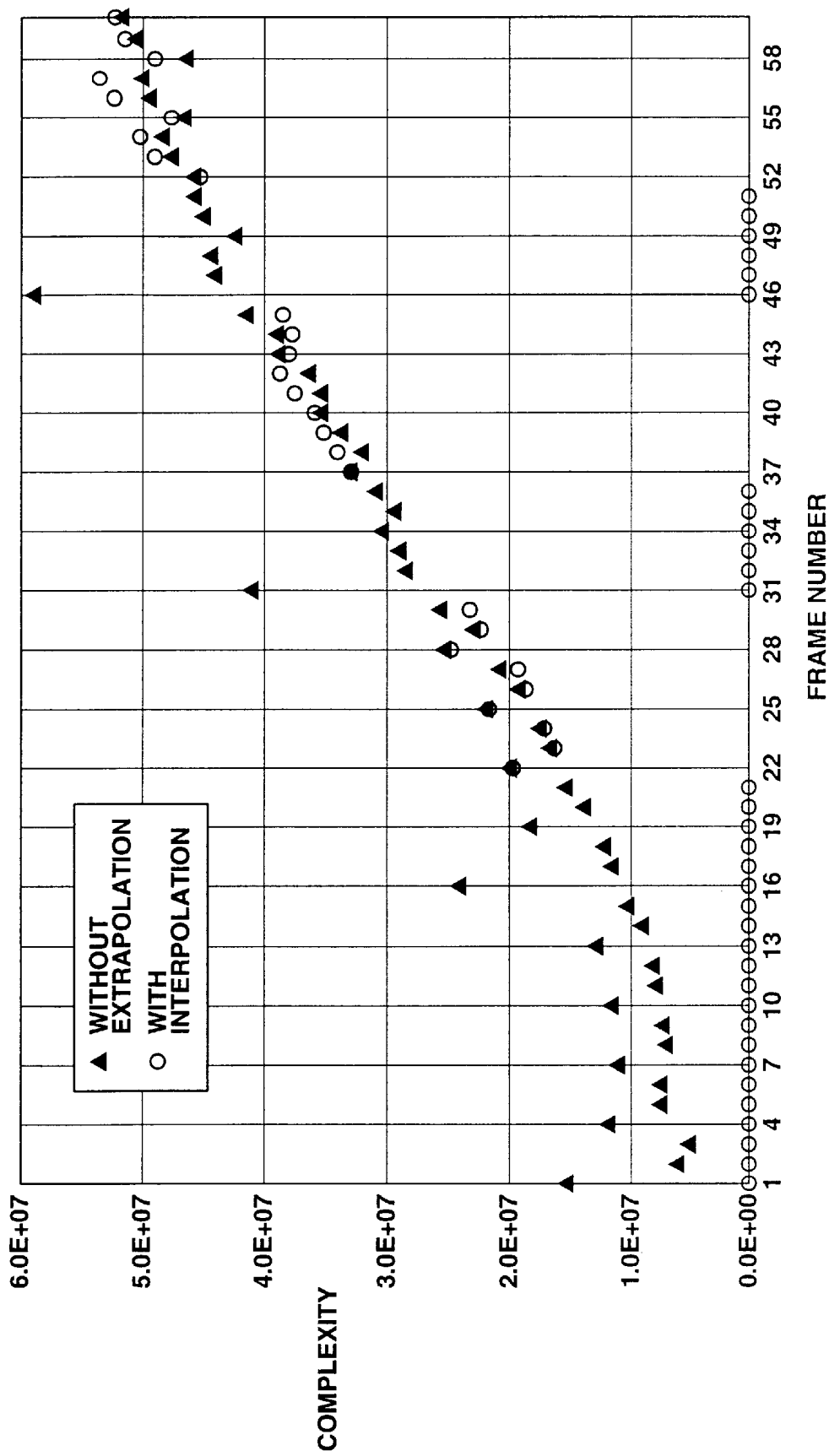
FIG. 15 shows the transition of complexity in each frame in case extrapolation is performed and that in case extrapolation is not performed.

The transition of complexity value in each frame calculated in case no extrapolation is applied and that calculated in case extrapolation is not applied, in the picture information conversion device 1 of the present invention, are shown in FIG. 15. It is noted that the complexity value calculated using the large-capacity FF buffer 2 are calculated complexity values in case no extrapolation is applied (calculated values of real complexity), whilst the complexity values calculated using the small-capacity FF buffer 2 are extrapolated values using the past and present data. To the FF buffer 2 has been input the 24 Mbps compressed picture information (bitstream) in CBR.

Referring to FIG. 15, there is no information pertinent to the previous frames for the first to 15th frames of the first GOP, so that no extrapolation is applied. In the next 16th to 21st frames of the next GOP, extrapolation is again not applied. However, the extrapolation is applied for the 22nd to 30th frames. Subsequently, similar processing is performed.

Since the overall GOP information falls short in the first GOP, no extrapolation is performed. Since the calculated complexity values are known, the extrapolated values are not used whatsoever in the first six pictures of each GOP. Referring to FIG. 15, the extrapolated value significantly approaches to the calculated complexity value (calculated value of real complexity) in case no extrapolation is applied. This renders it possible to indicate the tendency for the increasing complexity accurately.

Figure 16:
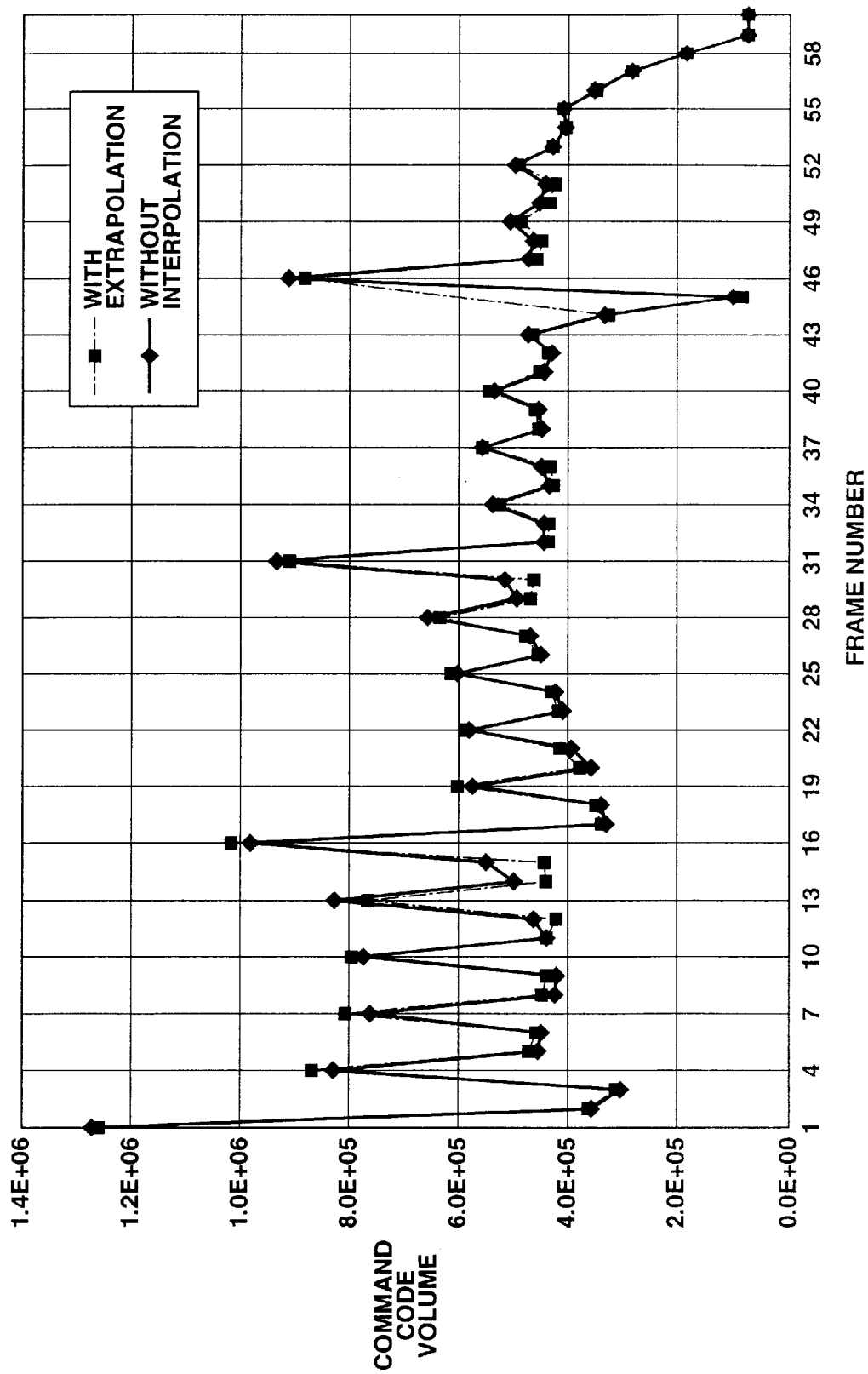
FIG. 16 shows the transition of the command code volume allocated to each frame in case extrapolation is performed and that in case extrapolation is not performed.

FIG. 16 shows the transition of the command code volume allocated to each frame in case extrapolation is applied with the use of a small capacity FF buffer 2 and that in case extrapolation is not applied with the use of a large capacity FF buffer 2.

Figure 17:
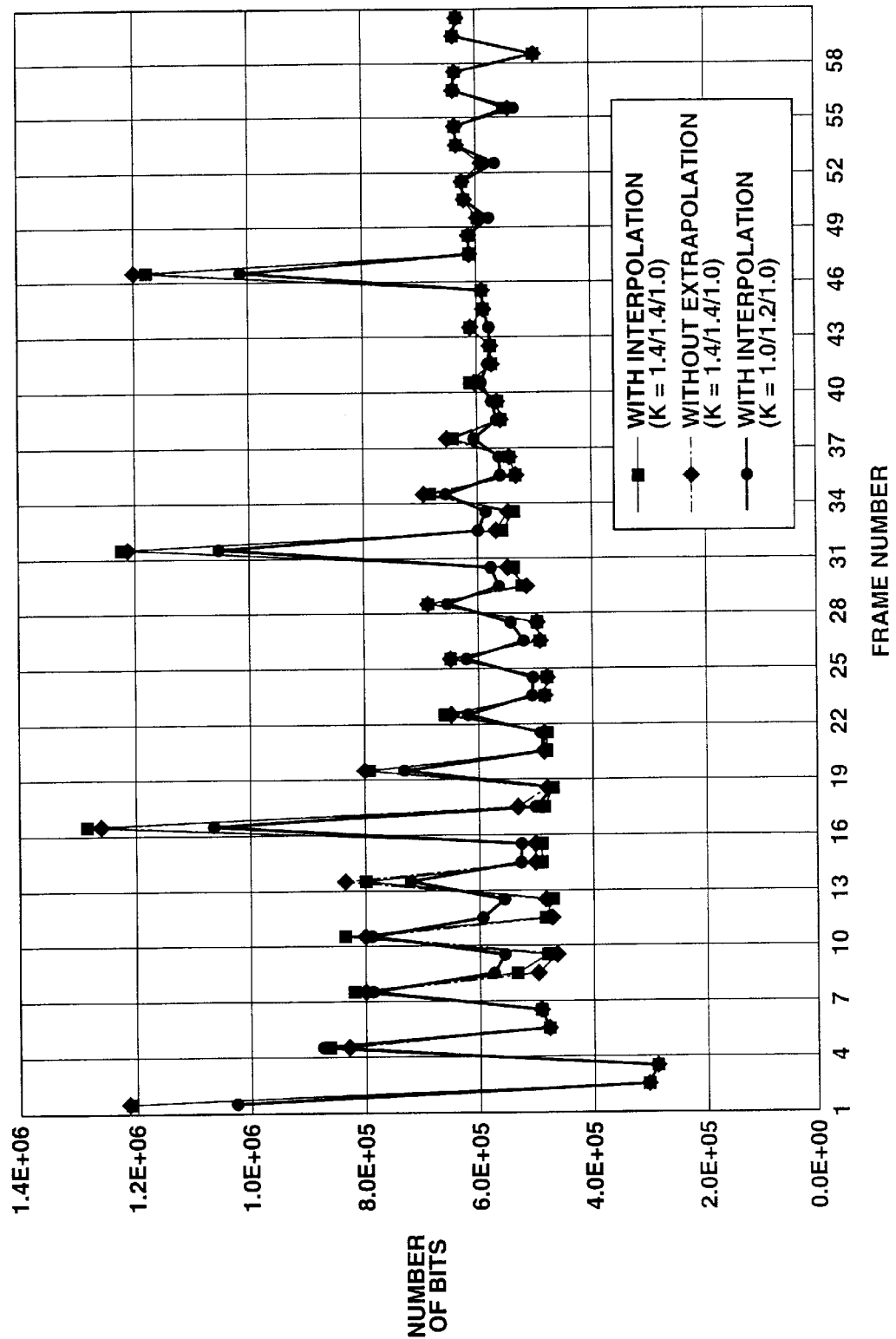
FIG. 17 shows the transition of the number of bits allocated to each frame in case extrapolation is performed and that in case extrapolation is not performed.

The transition of the number of bits generated in each frame, in case extrapolation is applied and is not applied with the value of the coefficient value remaining unchanged, and in case the extrapolation is applied with the value of the coefficient value changed, for the picture information conversion device 1 of the present invention, is shown in FIG. 17, in which cases where the coefficient values of I-, P- and B-pictures are 1.4, 1.4 and 1.0, respectively, and the extrapolation is applied and is not applied, and a case where these values are 1.0, 1.2 and 1.0, respectively, and extrapolation is applied, are shown.

Figure 18:
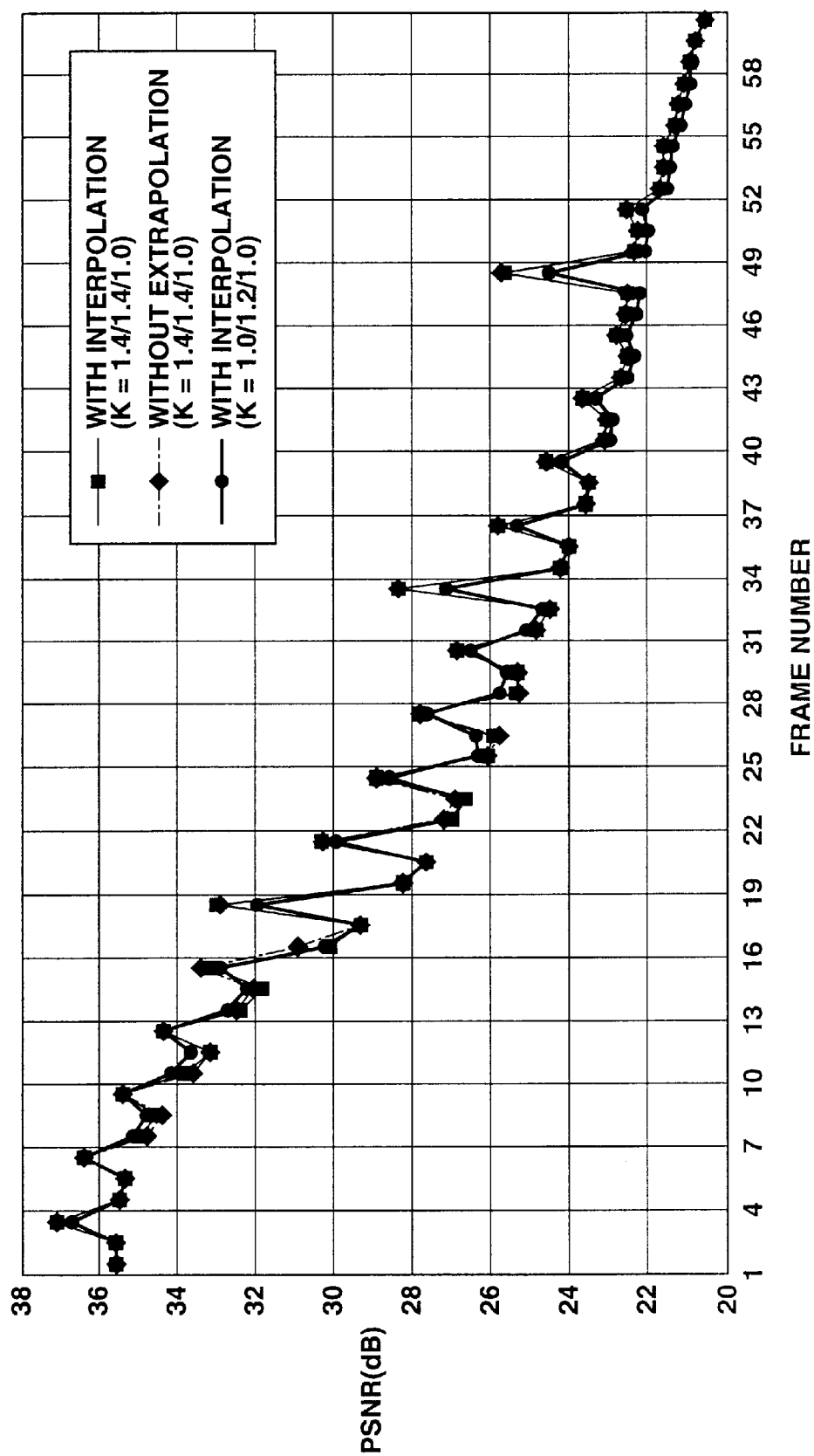
FIG. 18 shows the transition of PSNR in each frame in case extrapolation is performed and that in case extrapolation is not performed.

The transition of the PSNR in each frame, in case extrapolation is applied and is not applied with the value of the coefficient value remaining unchanged, and in case the extrapolation is applied with the value of the coefficient value changed, for the picture information conversion device 1 of the present invention, is shown in FIG. 18, in which cases where the coefficient values of I-, P- and B-pictures are 1.4, 1.4 and 1.0, respectively, and the extrapolation is applied and is not applied, and a case where these values are 1.0, 1.2 and 1.0, respectively, and extrapolation is applied, are shown. It is also seen from FIG. 18 that there is no significant difference between the FF buffer 2 of the small capacity with the use of the extrapolation and the FF buffer 2 of large capacity insofar as the PSNRs are concerned.

A case where only a small-capacity FF buffer 2 is used and a case where extrapolation is applied, under the condition of the experiment 2, are hereinafter explained.

Figure 19:
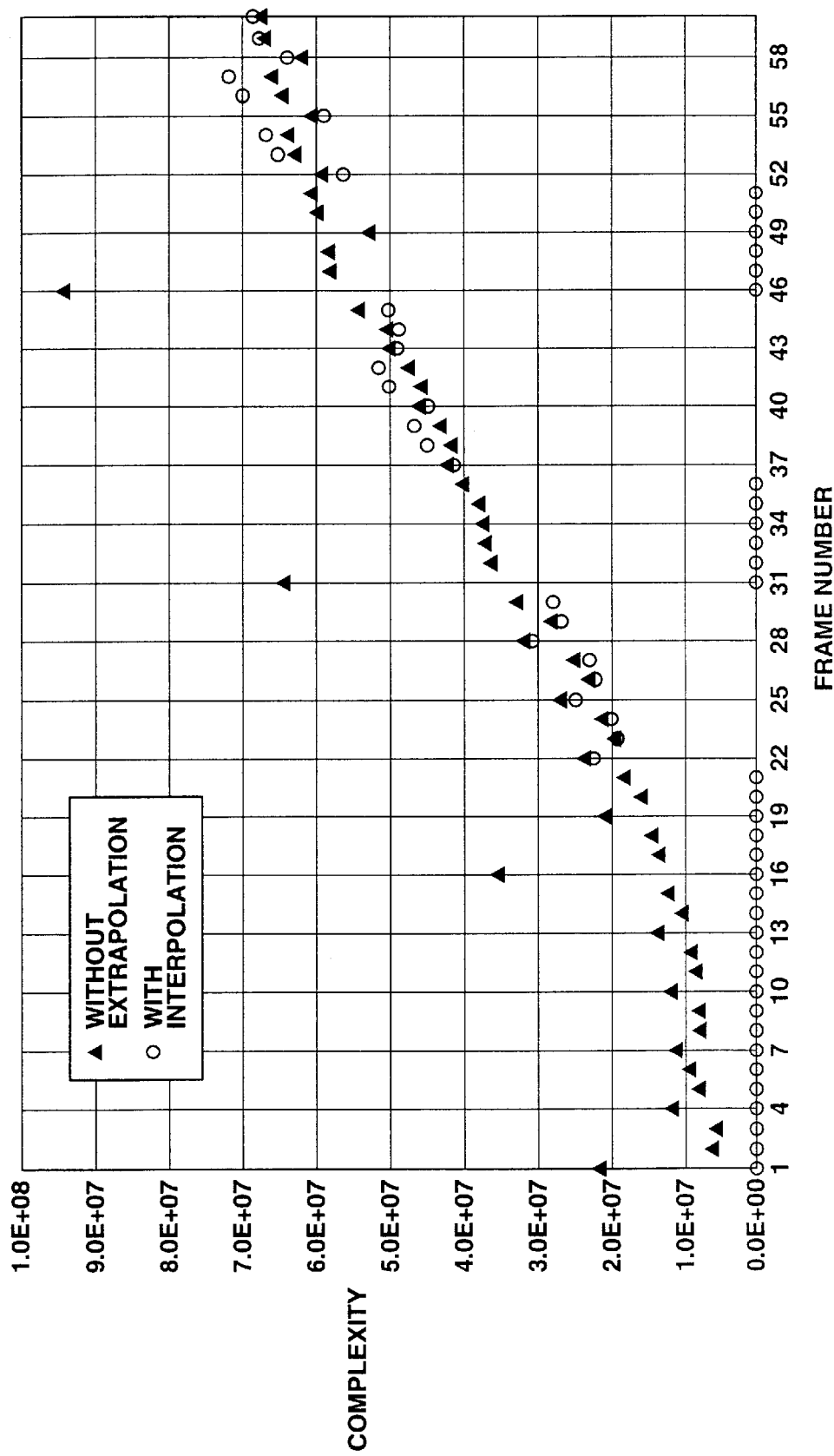
FIG. 19 shows the transition of complexity in each frame in case extrapolation is performed and that in case extrapolation is not performed.

FIG. 19 shows the transition of calculated complexity values in each frame in case the extrapolation is not applied and that in case the extrapolation is applied in the picture information conversion device 1 according to the present invention. It is noted that the calculated complexity values in case the large capacity FF buffer 2 is used is the calculated value of actual complexity, whilst the calculated complexity values in case the small capacity FF buffer 2 is used is the value extrapolated using past and current data. Also, the FF buffer 2 is fed with the compressed picture information (bitstream) of 18 Mbps in CBR.

For the first to 15th frames of the first GOP, there lacks the information pertinent to the previous respective frames, and hence the extrapolation is not performed, as shown in FIG. 19. For the next following 16th to 21st frames of the next GOP, extrapolation is not applied. Conversely, for the 22nd to the 30th frames, extrapolation is applied. Subsequently, similar processing is executed.

For the first GOP, no extrapolation is applied, since the information pertinent to the GOP is in shortage. The calculated complexity values of the extrapolated values are known and hence are not used in the first six pictures of each GOP. The extrapolated values approach calculated complexity values (actual calculated complexity values) in case no extrapolation is applied. This enables the tendency of the increasing complexity to be indicated accurately.

Figure 20:
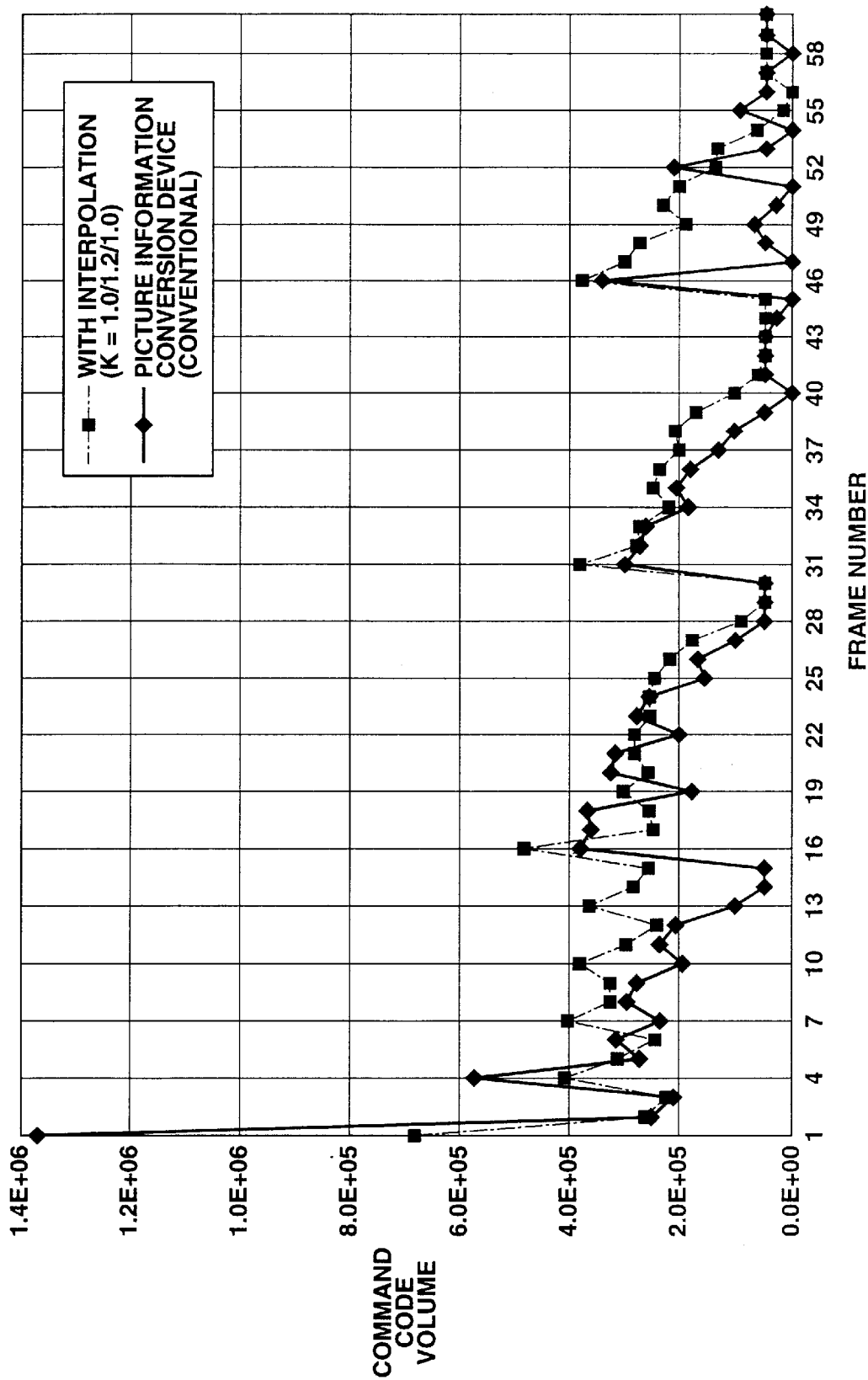
FIG. 20 shows the transition of the command code volume allocated to each frame in case extrapolation is performed and that in case extrapolation is not performed.

The transition of the command code volume in each frame in case of applying the extrapolation using the adjusted value of the coefficient K in the picture information conversion device 1 according to the present invention and in case of employing the conventional picture information conversion device 100 is shown in FIG. 20. In the picture information conversion device 1 according to the present invention, the values of the coefficients K for the I-, P- and B-pictures are 1.0, 1.2 and 1.0, respectively.

Figure 21:
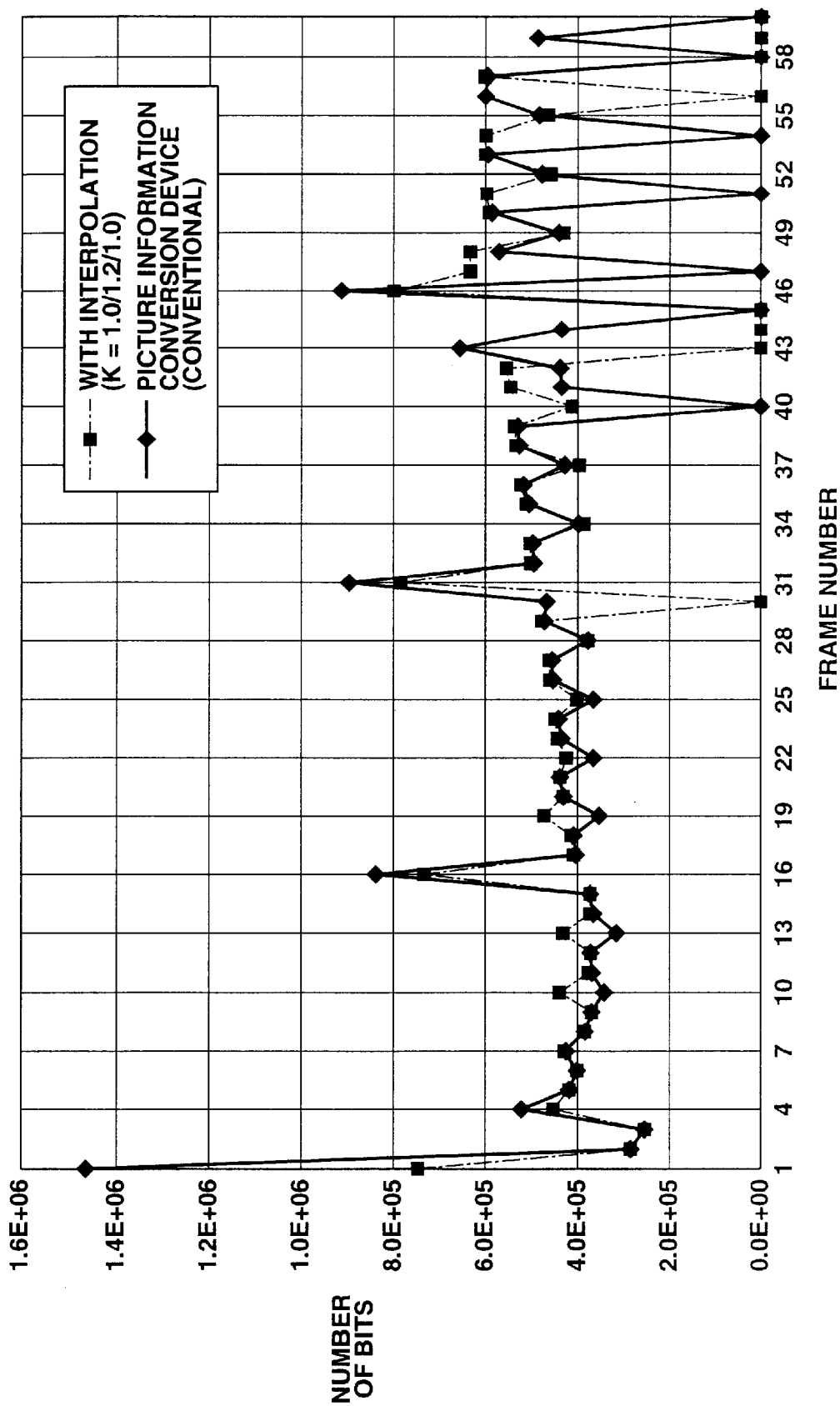
FIG. 21 shows the transition of the number of bits allocated to each frame in case extrapolation is performed and that in case extrapolation is not performed.

The transition of the number of bits generated in each frame in case of applying the extrapolation using the adjusted value of the coefficient K in the picture information conversion device 1 according to the present invention and in case of employing the conventional picture information conversion device 100 is shown in FIG. 21. In the picture information conversion device 1 according to the present invention, the values of the coefficients K for the I-, P- and B-pictures are 1.0, 1.2 and 1.0, respectively.

Figure 22:
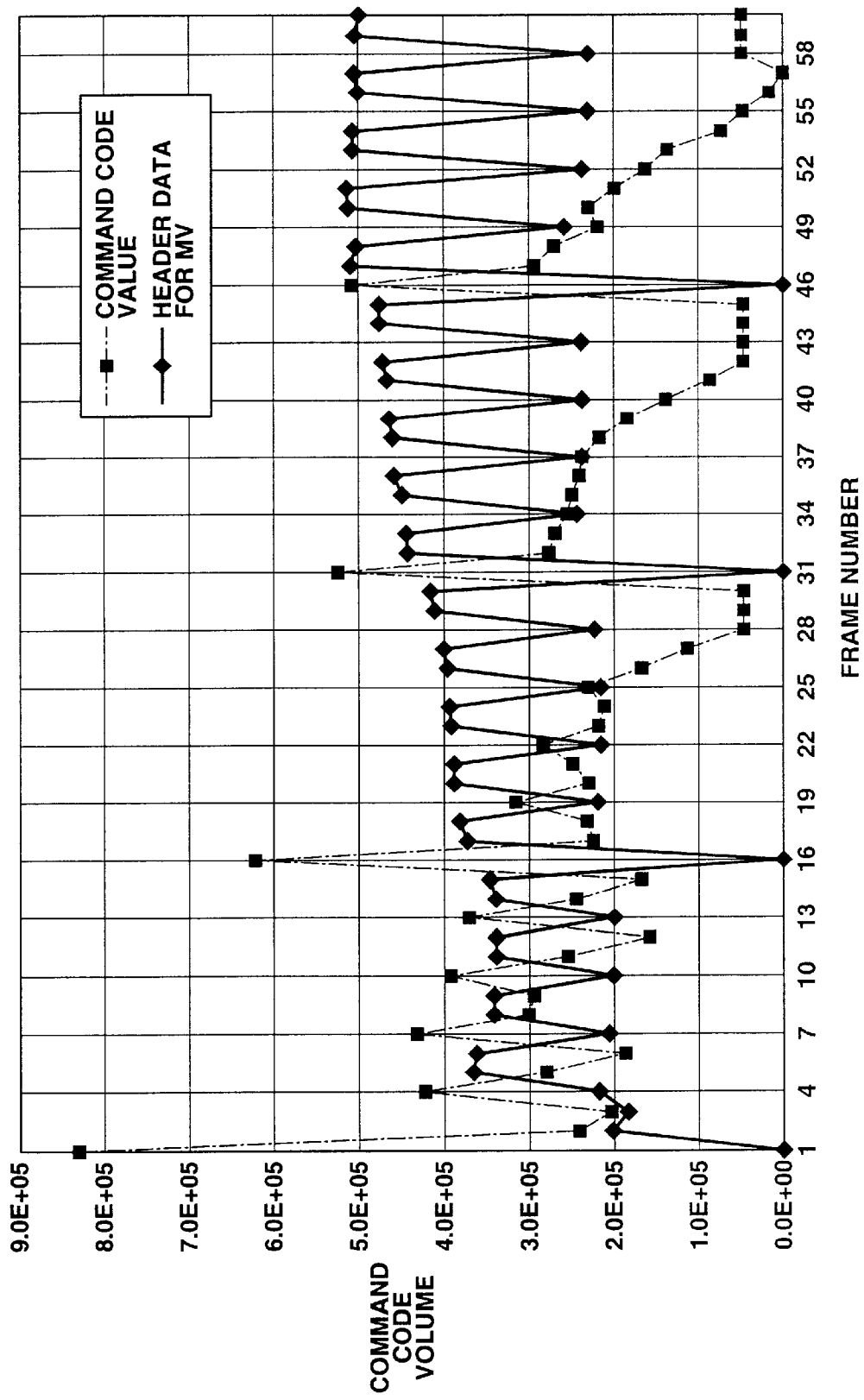
FIG. 22 shows the transition of the volume of the information of head data for MV and the command code volume in each frame.

The transition of the command code volume and the information volume of the header data for the motion vector (MV) in each frame of the picture information conversion device 1 according to the present invention is shown in FIG. 22, from which it is seen that the information volume of the header data in the totality of B-pictures excluding the first two frames of the first GOP exceeds the command code volume. The underflow incidentally occurs due to the large volume of the header data. From the second GOP tothefourth GOP, the information volume of the header data exceeds the command code volume from the mid picture on.

Figure 23:
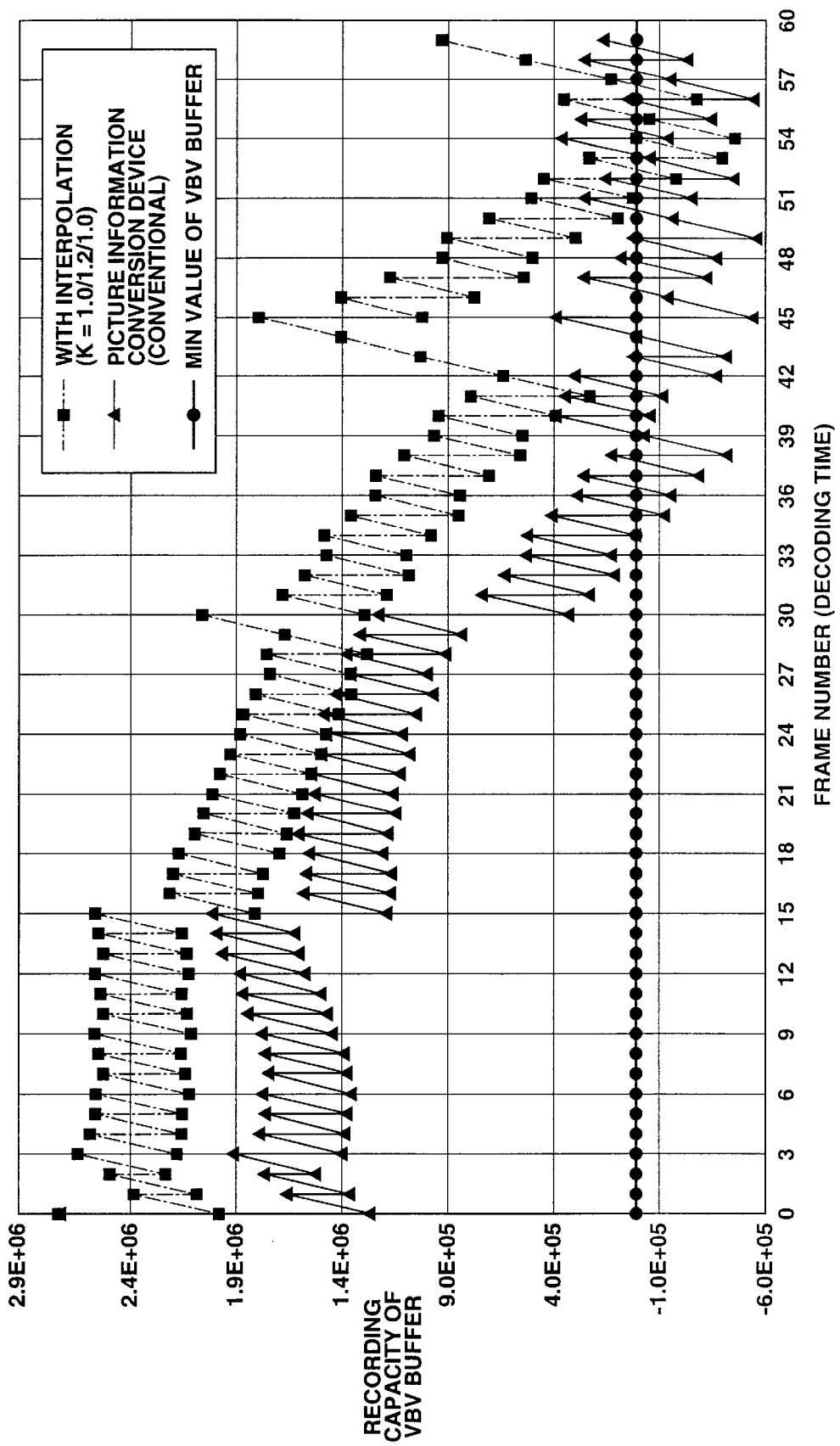
FIG. 23 shows the transition to the decoding time of the recording capacity of the VBV buffer in the picture information conversion device of the present invention and that in the conventional picture information conversion device.

The transition of the recording capacity of the VBV buffer 6 with respect to the decoding time in case of applying the extrapolation using the adjusted value of the coefficient K in the picture information conversion device 1 according to the present invention, and the transition of the recording capacity of the VBV buffer 6 with respect to the decoding time in the conventional picture information conversion device 100, are shown in FIG. 23. In the picture information conversion device 1 according to the present invention, the values of the coefficients K for the I-, P- and B-pictures are 1.0, 1.2 and 1.0, respectively, as shown in FIG. 23.

The skip function is in operation in frames 30, 43, 44 and 45 of the picture information conversion device 1 according to the present invention. On the other hand, the underflow occurs in the frame 36 in the conventional picture information conversion device 100. Although the underflow ultimately occurs in the picture information conversion device 1 of the present invention, it is delayed and relaxed significantly.

In FIG. 23, there is shown a line of the smallest value of the VBV buffer under which the underflow is produced.

Figure 24:
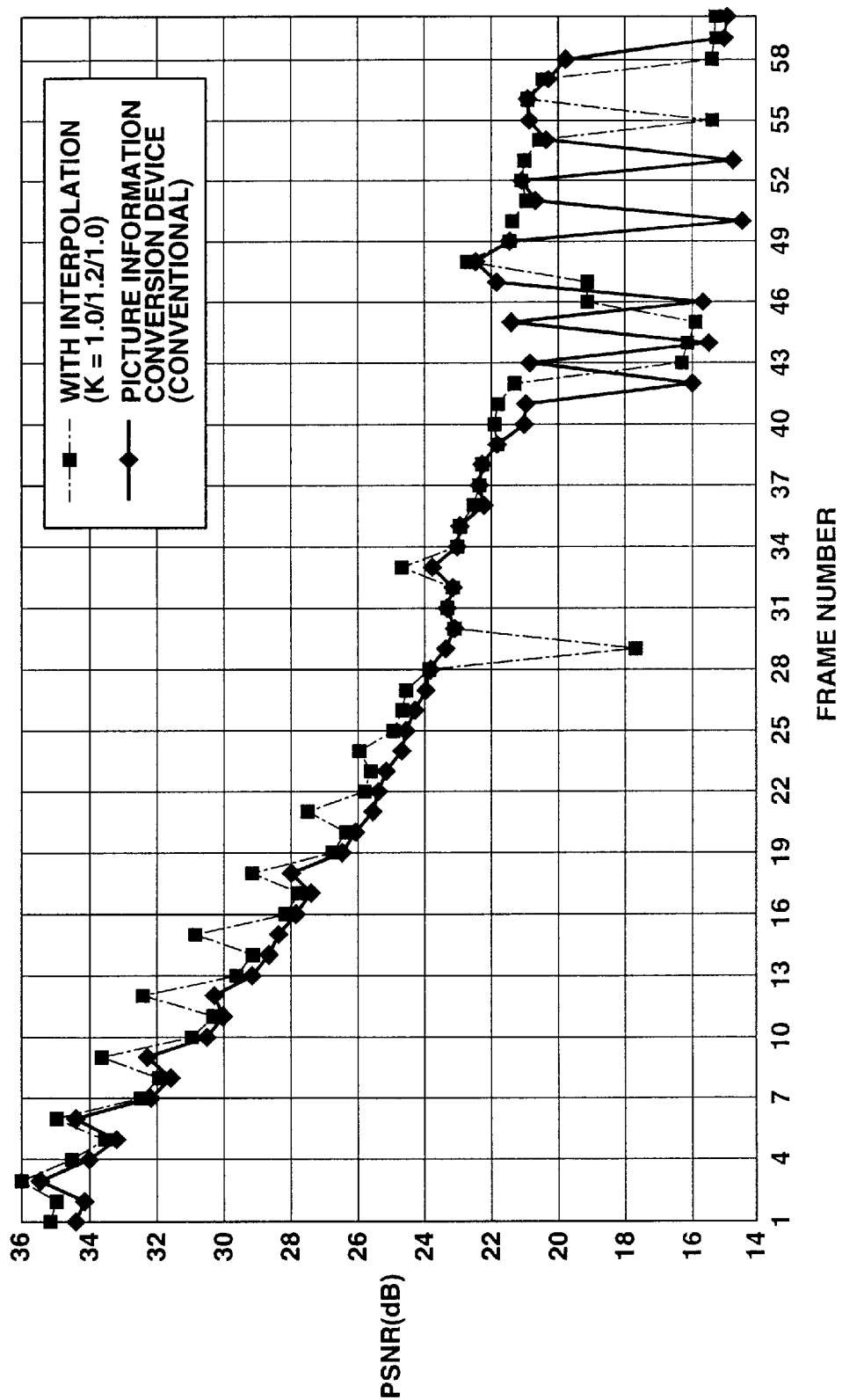
FIG. 24 shows the transition of the PSNR of each frame in case extrapolation is performed and that in case extrapolation is not performed.

The transition of the PSNR in case of applying the extrapolation using the adjusted value of the coefficient K in the picture information conversion device 1 according to the present invention, and the transition of PSNR in the conventional picture information conversion device 100, are shown in FIG. 24. In the picture information conversion device 1 according to the present invention, the values of the coefficients K for the I-, P- and B-pictures are 1.0, 1.2 and 1.0, respectively, as shown in FIG. 24. In the picture information conversion device 1 according to the present invention, the PSNR in the I- and P-pictures is improved significantly. Meanwhile, such abrupt dropout of the PSNR value is caused by skipping of each picture.

A case under the conditions of the experiment 3 is explained.

Figure 25:
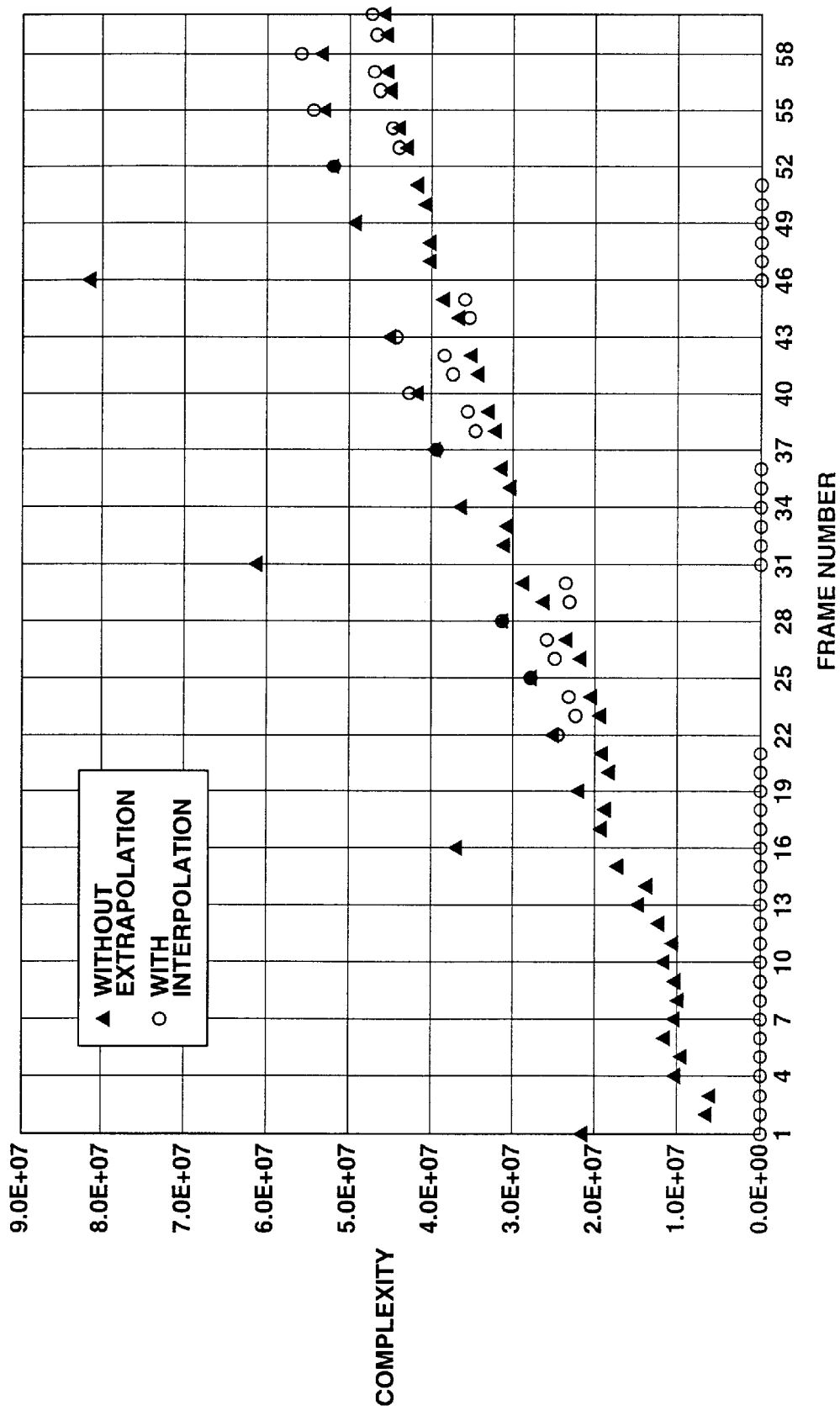
FIG. 25 shows the transition of complexity in each frame in case extrapolation is performed and that in case extrapolation is not performed.

The transition of calculated complexity values in each frame in case of not performing the extrapolation and that in case of performing the extrapolation are shown in FIG. 25. The complexity value calculated using the FF buffer 2 of an increased capacity is the complexity value calculated without extrapolation, that is the actual calculated complexity value, while the complexity value calculated using the FF buffer 2 of a small capacity is the complexity obtained on extrapolation using the past and current data. The FF buffer 2 is also fed with the compressed picture information (bitstream) in VBR.

For the first to 15th frames of the first GOP, no extrapolation is applied because there lacks the information pertinent to the past frames, as shown in FIG. 25. For the next following 16th to 21st frames of the next GOP, extrapolation is not applied. Conversely, for the 22nd to the 30th frames, extrapolation is applied. Subsequently, similar processing is executed.

For the first GOP, no extrapolation is applied, since the overall GOP information is in shortage. The calculated complexity values of the extrapolated values are recognized and hence are not used in the first six pictures of each GOP. The extrapolated values approach calculated complexity values (actual calculated complexity values) in case no extrapolation is applied. This enables the tendency of the increasing complexity to be indicated accurately.

Figure 26:
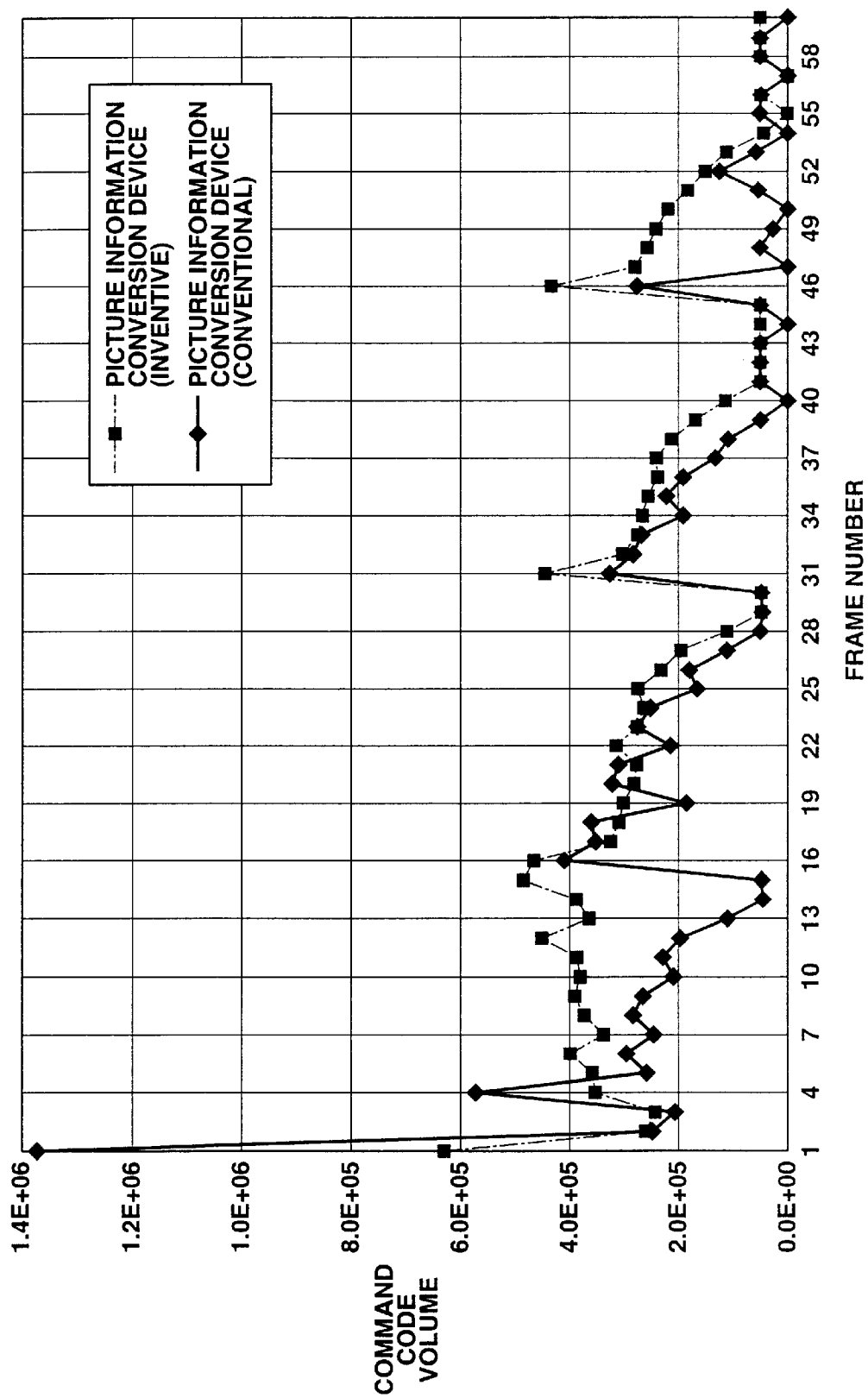
FIG. 26 shows the transition of the command code volume (number of bits) in each frame in case the picture information conversion device of the present invention is used and that in the conventional picture information conversion device is used.

The transition of the command code volume in each frame in case of using extrapolation in the picture information conversion device 1 of the present invention and that in the conventional picture information conversion device 100 are shown in FIG. 26. In the conventional picture information conversion device 100, processing of the input compressed picture information (bitstream) in VBR results in failure.

Figure 27:
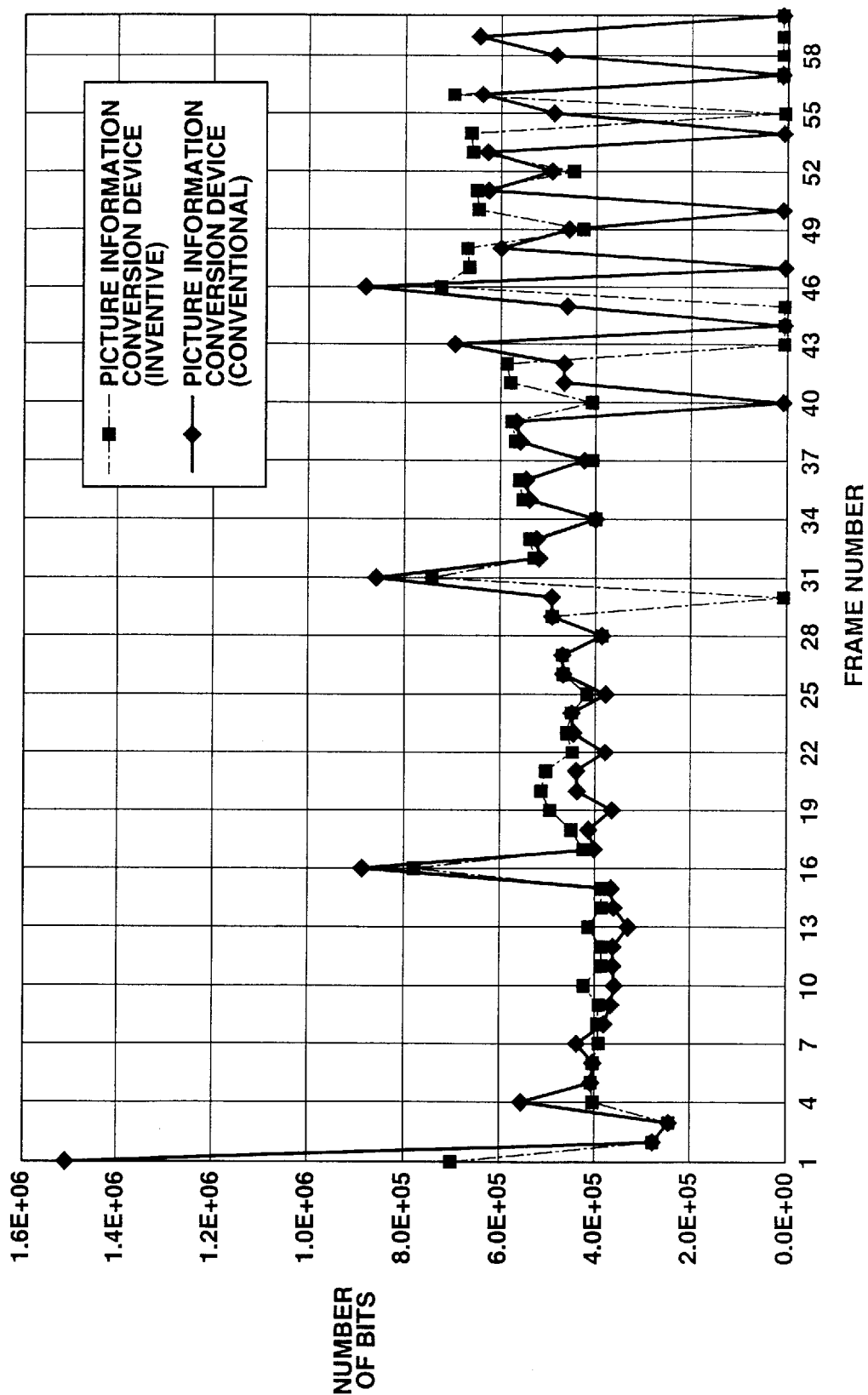
FIG. 27 shows the transition of the number of bits generated in each frame in case the picture information conversion device of the present invention is used and that in the conventional picture information conversion device is used.

The transition of the number of bits generated in each frame in case of using the extrapolation in the picture information conversion device 1 of the present invention and that in the conventional picture information conversion device 100 are shown in FIG. 27.

Figure 28:
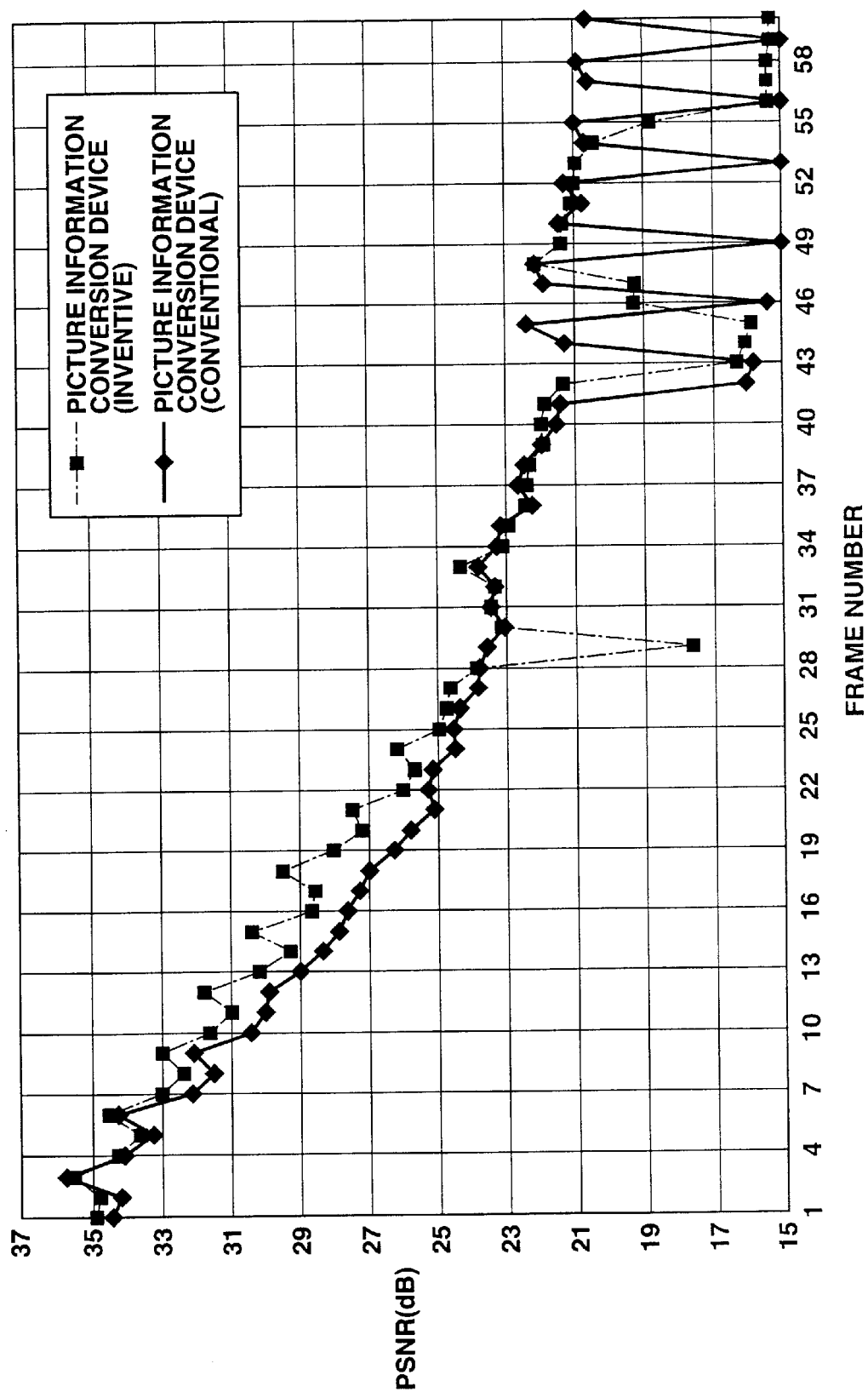
FIG. 28 shows the transition of the PSNR of each frame in the picture information conversion device of the present invention and that in the conventional picture information conversion device.

The transition of the PSNR in each frame of the picture information conversion device 1 of the present invention and that in the conventional picture information conversion device 100 are shown in FIG. 28.

Figure 29:
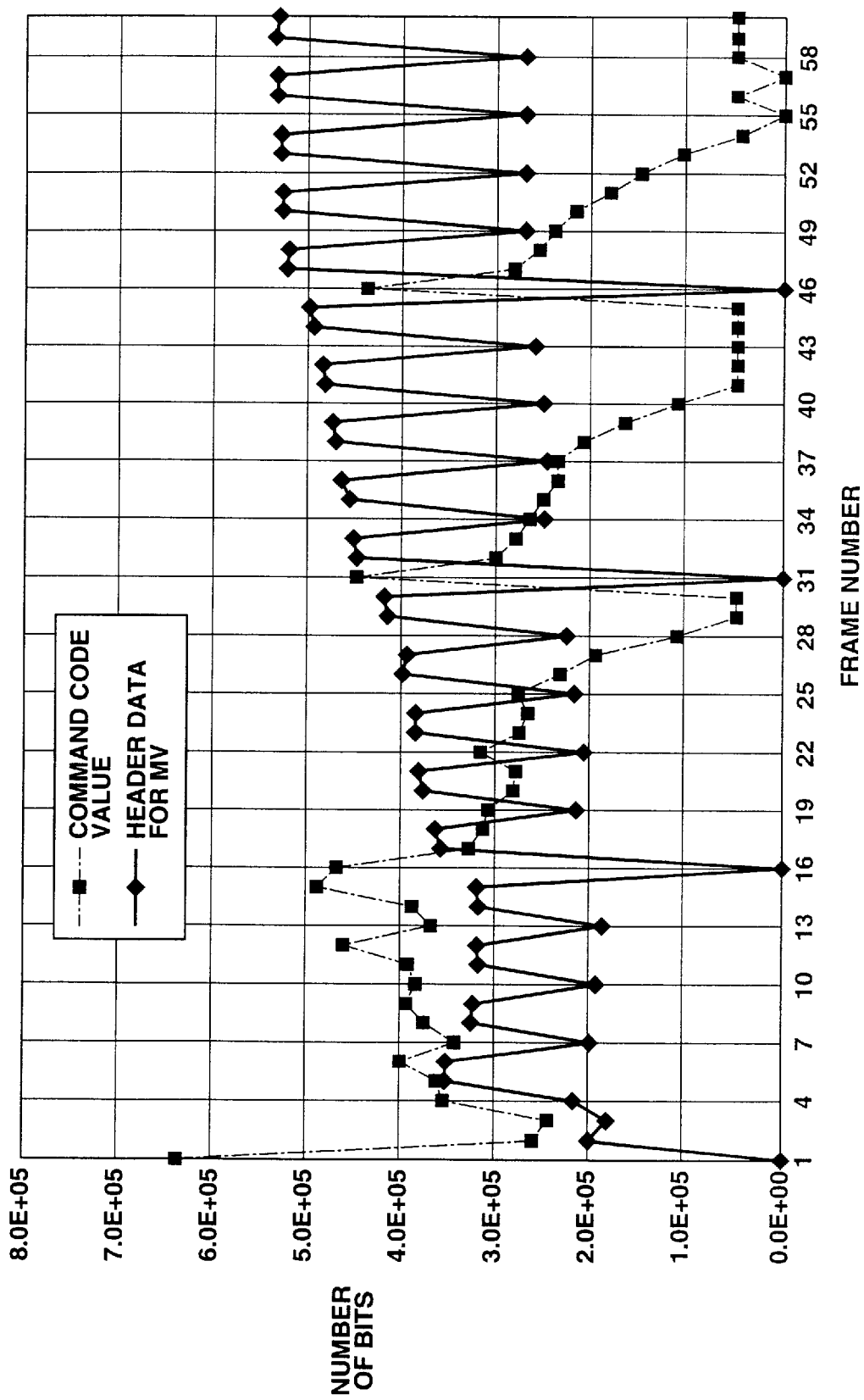
FIG. 29 shows the transition of the information volume of header data for MV and the command code volume in each frame.

The transition of the command code volume and the code volume of header data for motion vector (MV) in each frame of the picture information conversion device 1 of the present invention is shown in FIG. 29, from which it is seen that the information volume of header data in the totality of B-pictures excluding the first GOP exceeds the command code volume. From the second GOP up to the fourth GOP, the information volume of the header data exeeds the command code volume from a mid picture on.

Figure 30:
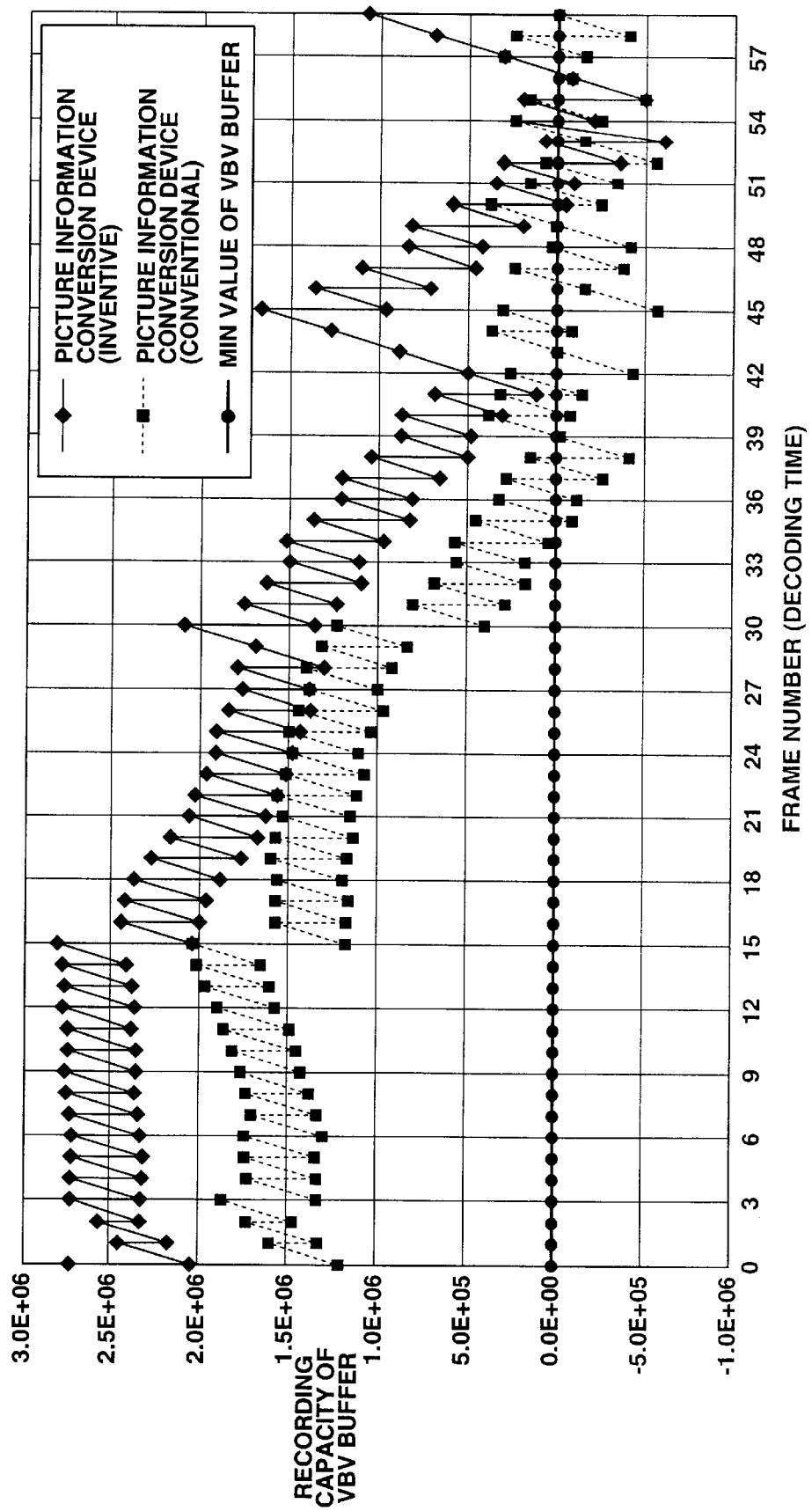
FIG. 30 shows the transition of the recording capacity of the VBV buffer with respect to the decoding time in the picture information conversion device of the present invention and that in the conventional picture information conversion device.

In the picture information conversion device 1 of the present invention, the transition of the recording capacity of the VBV buffer 6 with respect to the decoding time in case of performing the extrapolation and that in the conventional picture information conversion device 100 are shown in FIG. 30.

Since the skip function is in operation in the picture information conversion device 1 of the present invention, the underflow is started with a delay as from the frame 51, as shown in FIG. 30. In the picture information conversion device 100, underflow is started as from the frame 36.

The header data compression is hereinafter explained.

First, the information volume of header data used in e.g., a macroblock pattern, such as motion vector (MV) or the macroblock pattern, in the compressed picture information (bitstream) input to the FF buffer 2, is not that much. The reason is that the encoding device fed from outside with the compressed picture information (bitstream), generally handles a picture in which the information volume of the DCT data is larger than that of the header data at a high bitrate.

However, if the information volume of the compressed picture information (bitstream) is to be reduced further, the information volume of the header data tends to be larger than that of the DCT data, because only the information of the DCT data is further reduced as long as the information volume of the header data remains constant.

Figure 31:
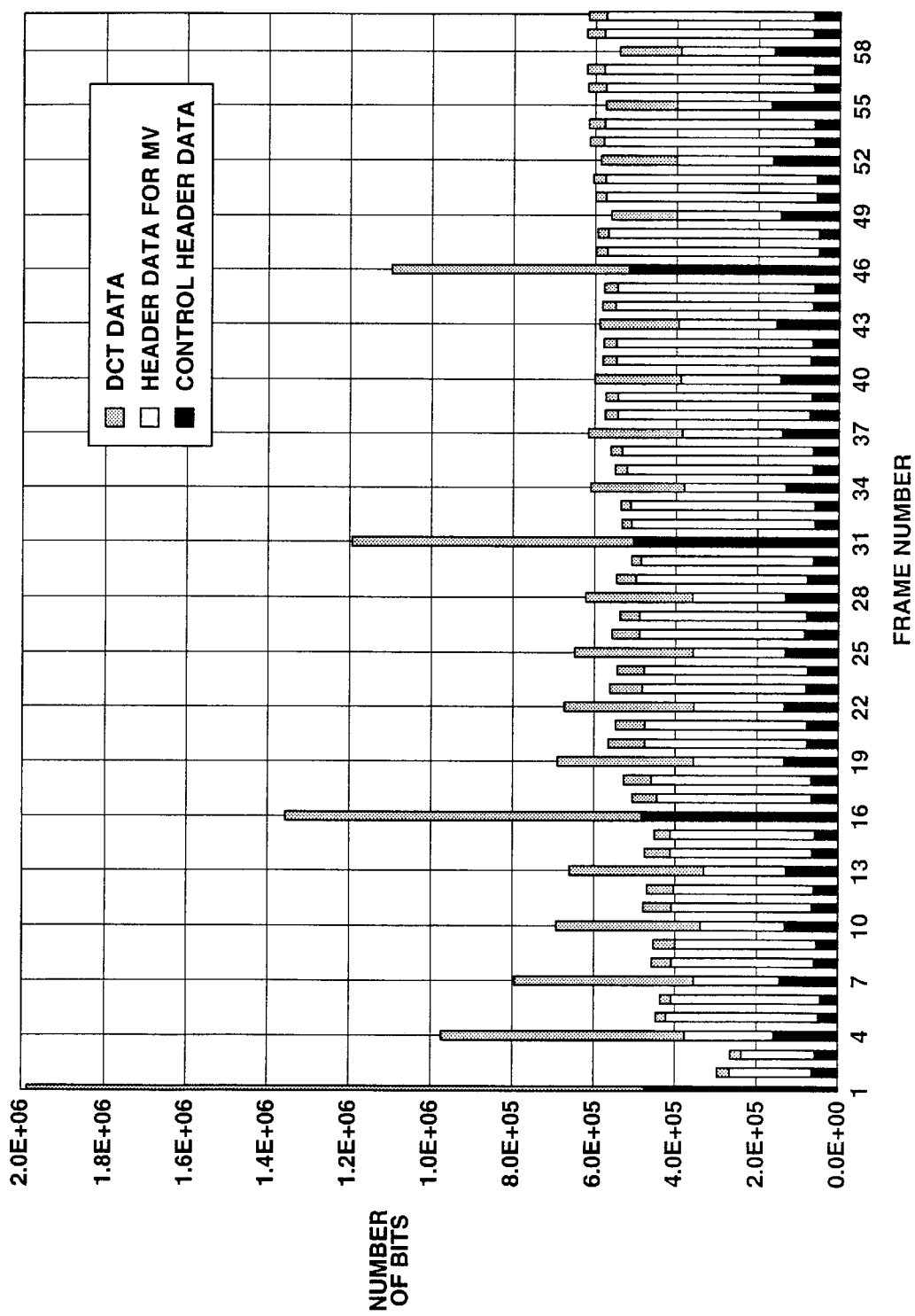
FIG. 31 shows an instance where a picture sequence sprinkler is beingencoded in a CBR of 18 Mbps.

In order to account for this phenomenon, an embodiment in which a picture sequence sprinkler is encoded at 18 Mbps at CBR is shown in FIG. 31.

FIG. 31 shows the total code volume (total number of bits) of each frame comprising the code volume (number of bits) of header data and the code volume of the DCT data (number of bits). From the fifth frame up to the 60th frame, the header data of the totality of the B-pictures exceeds 400 Kb, whilst the header data of almost all P-pictures is of the order of 400 Kb.

If the compressed picture information (bitstream) is further compressed at 12 Mbps, such that 400 Kb needs to be allocated to each picture on an average, the header data of each picture contained in the compressed picture information (bitstream) uses up the totality of the code volume (total number of bits) allocated to each picture. Since the underflow unecessarily is produced in this case, further compression is not possible. So, the header data are compressed in order to solve these problems.

Referring to FIG. 31, the information volume of the header data for the MV (motion vector) is largest of all the header data. So, the information volume of the header data for the motion vector (MV) is halved by changing the motion vector (MV) from the bidirectional motion vector (MV) to the unidirectional motion vector (MV), that is by deleting one of the two motion vectors of the bidirectional motion vector (MV). It is noted that, if the information volume of the header data is excessive, both motion vectors are deleted.

However, if an error occurs due to changing the motion vector (MV) from the bidirectional motion vector (MV) to the unidirectional motion vector (MV), and if this error is not corrected, compression of the header data leads to fatal deterioration of the picture quality. Therefore, the header data needs to be compressed meticulously to minimize the deterioation of the picture quality.

The extent of compression of the information volume of the motion vector (MV) depends on a calculated by the following equation (5):

$$\alpha = 2 \times \left(1 - \frac{t \arg et\_number\_of\_bits}{header\_data}\right) \quad (5)$$

That is, by applying the value of α to each of the three cases shown in FIG. 5, the proportion of the information volume to be actually compressed by the header data compression device 9 is known. Specifically, if a α≦0, the header data compression device 9 does not proceed to compress the header data whatsoever, whereas, if 0<α<1, the header data compression device 9 compresses the header data partially. If α≧1, the header data compression device 9 compresses the header data in its entirety.

Meanwhile, the proportion α in the macroblock is likely to be influenced by the motion vector (MV) conversion.

The results of an experiment conducted in connection with the efficiency of the compression processing on the header data are hereinafter explained.

In this experiment, the results by the picture information conversion device 1 with compression processing on the header data are compared with those by the picture information conversion device 100 not having the function of performing compression processing on the header data.

First, the experimental results under the conditions of the experiemnt 1 are explained.

In the processing in such case, the information volume of the ehader data is not that much. So, the compressed picture information (bitstream), input at a high bitrate, is not shown.

Second, the experimental results under the conditions of the experiment 2 are explained.

First, the information volume of the header data for the motion vector (MV) appreciably exceeds the command code volume, as shown in FIG. 22. So, the header data compression device 6 compresses the header data for the motion vector (MV). The totality of the bidirectional motion vector (MV) is here converted into the unidirectional motion vector (MV).

Figure 32:
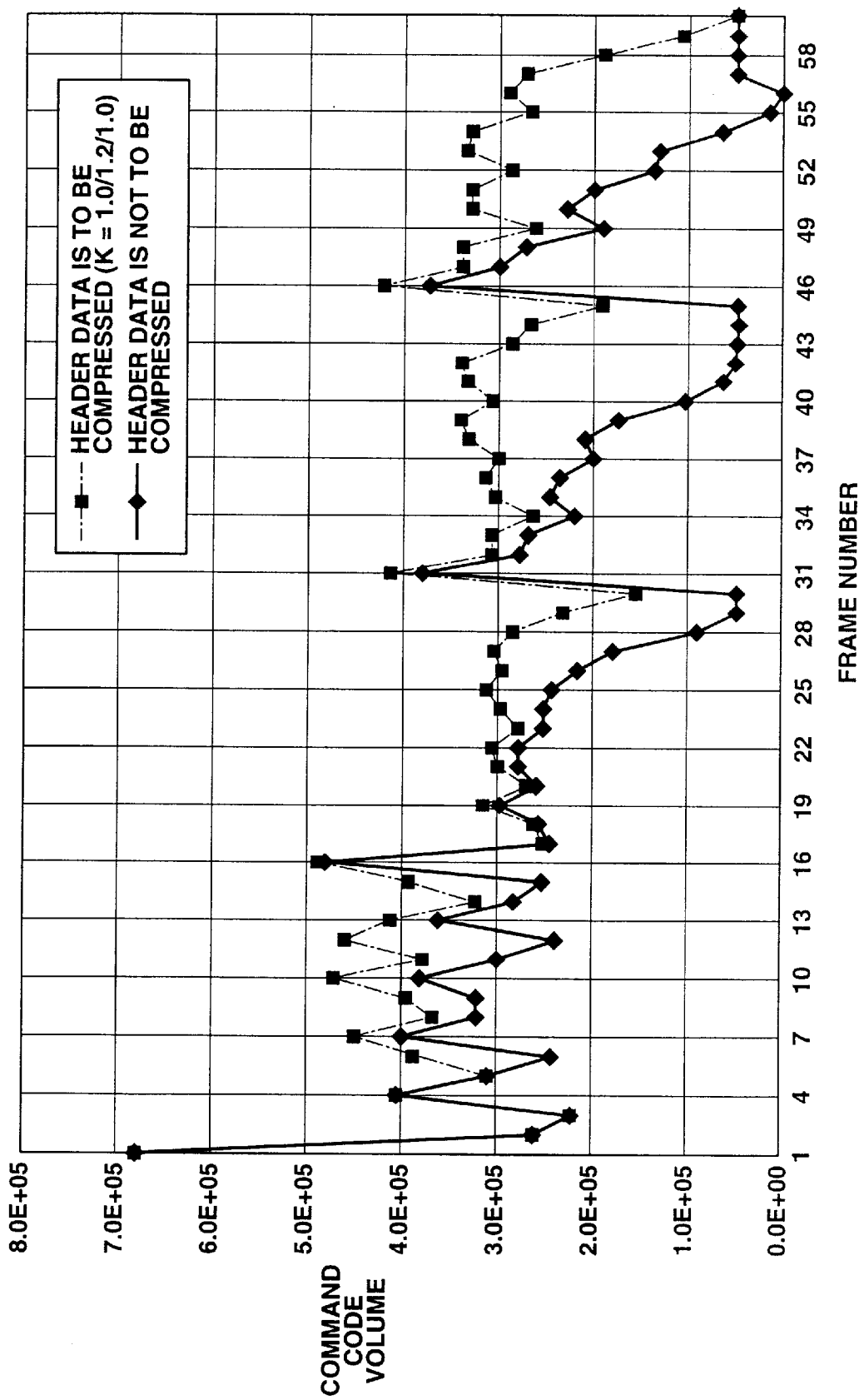
FIG. 32 shows the transition of the command code volume allocated to each frame in case the header data compression processing is performed and that in case the header data compression processing is not performed.

The transition of the command code volume allocated to each frame in case of compressing the header data using the value of the adjusted value of the coefficient K and in case of not compressing the header data, in the picture information conversion device 1 according to the present invention, is shown in FIG. 32. Here, the header data is compressed for a case where the values of the coefficients K for the I-, P- and B-pictures are 1.0, 1.2 and 1.0, respectively.

Figure 33:
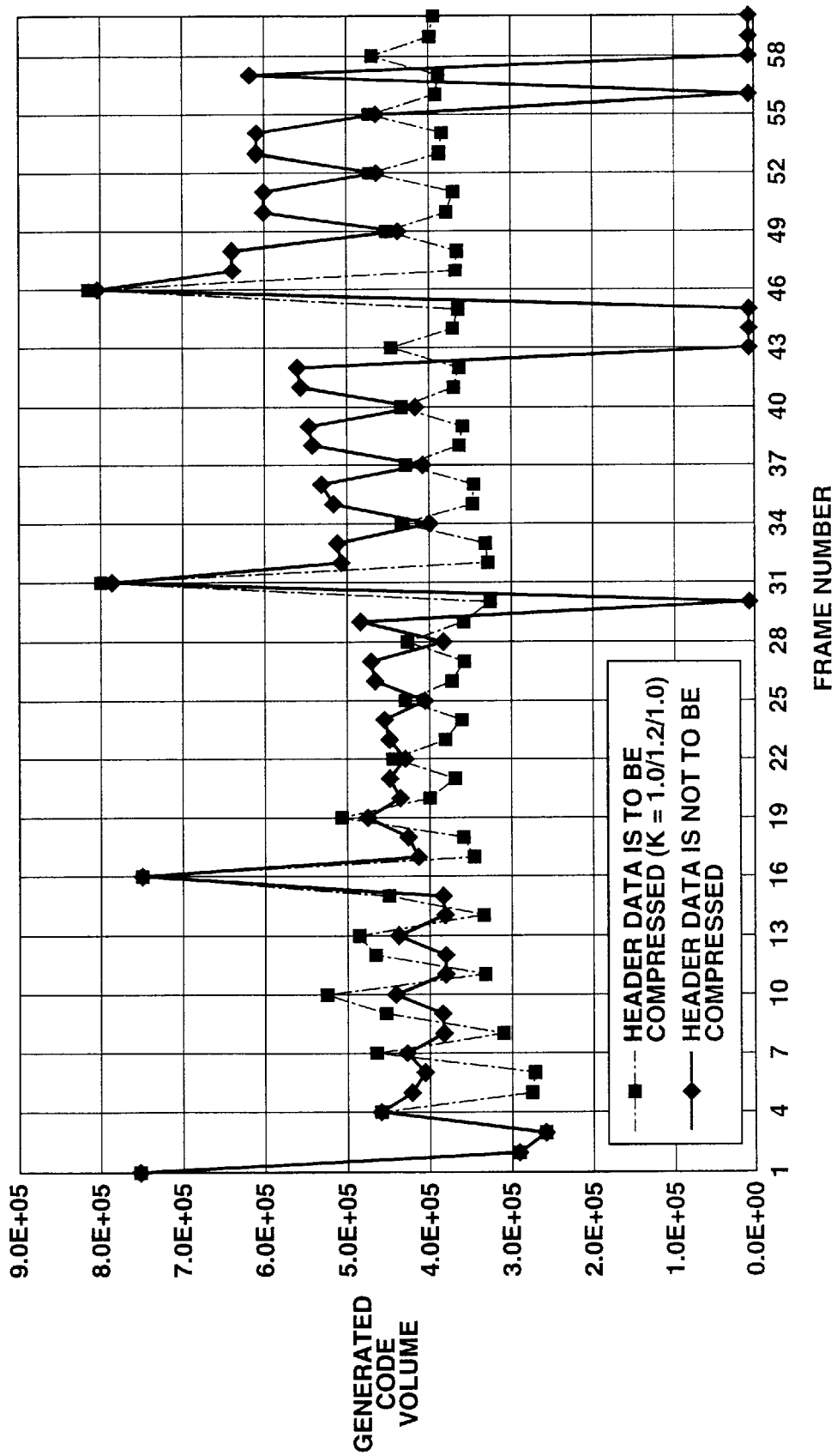
FIG. 33 shows the transition of the number of bits generated in each frame in case the header data compression processing is performed and that in case the header data compression processing is not performed.

The transition of the number of bits in each frame in case of compressing the header data using the value of the adjusted value of the coefficient K and in case of not compressing the header data in the picture information conversion device 1 according to the present invention is shown in FIG. 33. Here, the header data is compressed for a case where the values of the coefficients K for the I-, P- and B-pictures are 1.0, 1.2 and 1.0, respectively, as shown in FIG. 33. In the picture information conversion device 1 of the present invention, both the picture skip and underflow are prevented from occurrence.

Figure 34:
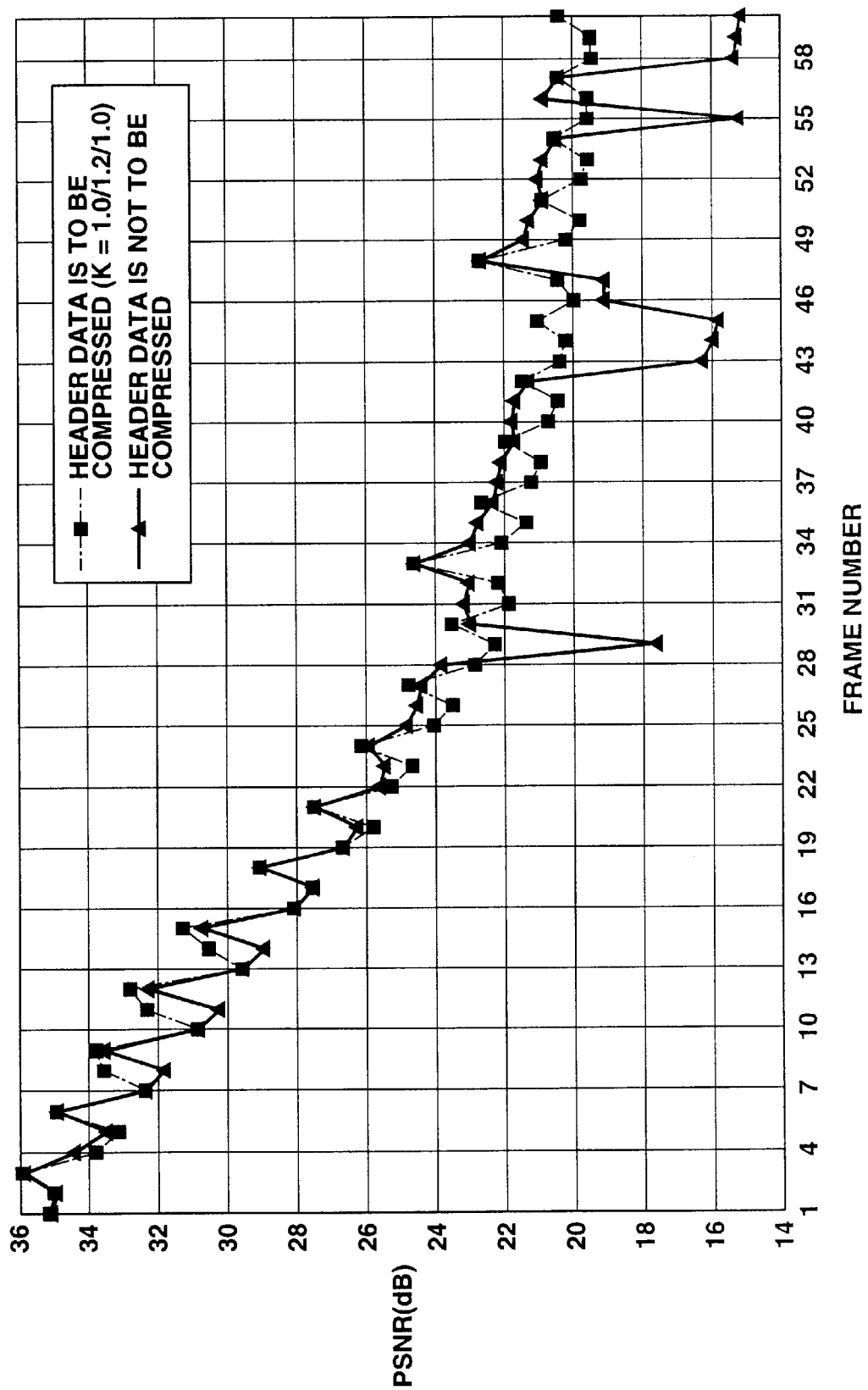
FIG. 34 shows the transition of PSNR in case the header data compression processing is performed and that in case the header data compression processing is not performed.

The transition of the PSNR in each frame in case of compressing the header data using the value of the adjusted value of the coefficient K and in case of not compressing the header data in the picture information conversion device 1 according to the present invention is shown in FIG. 34. Here, the header data is compressed for a case where the values of the coefficients K for the I-, P- and B-pictures are 1.0, 1.2 and 1.0, respectively, as shown in FIG. 34.

In the picture information conversion device 1 according to the present invention, in which the header data is compressed, more bits arte allocated to the I- and P-pictures, thereby improving the PSNR in these pictures. So, in this case, consecutive pictures are reproduced on the display, so that the subjective evaluation is highest. On the other hand, if many pictures are skipped, the subjective evaluation is worst.

Figure 35:
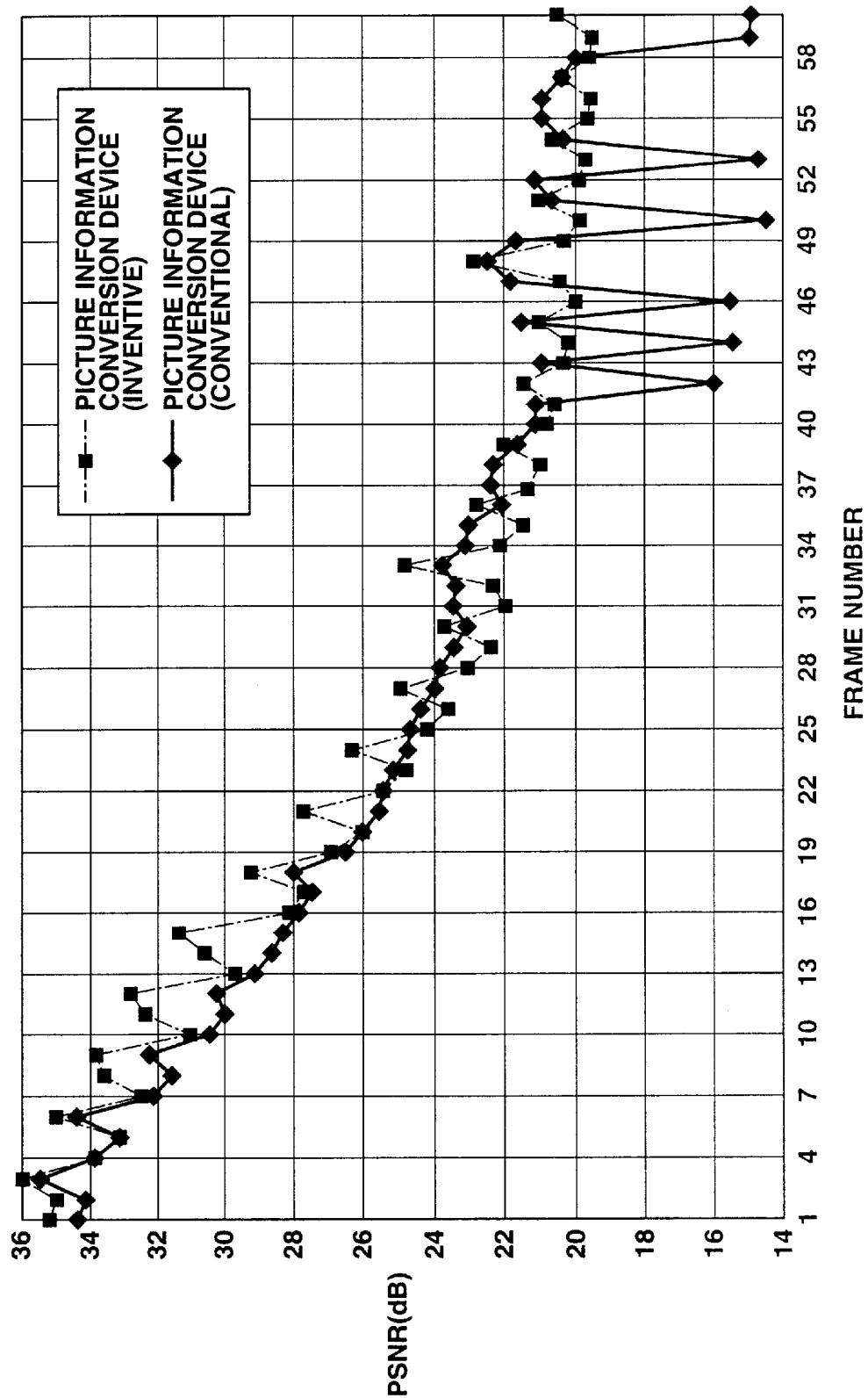
FIG. 35 shows, similarly to FIG. 34, the transition of PSNR in case the header data compression processing is performed and that in case the header data compression processing is not performed.

In the picture information conversion device 1 of the present invention, the transition of the PSNR in each frame in case header data is not compressed using the value of the adjusted coefficient value K, and that in case the header data is not compressed, are shown in FIG. 35.

In the conventional picture information conversion device 100, the totality of the skipped pictures are produced due to underflow, as shown in FIG. 35. There is produced no underflow if the compressed picture information (bitstream) is set so as to reduce the state of delay.

Figure 36:
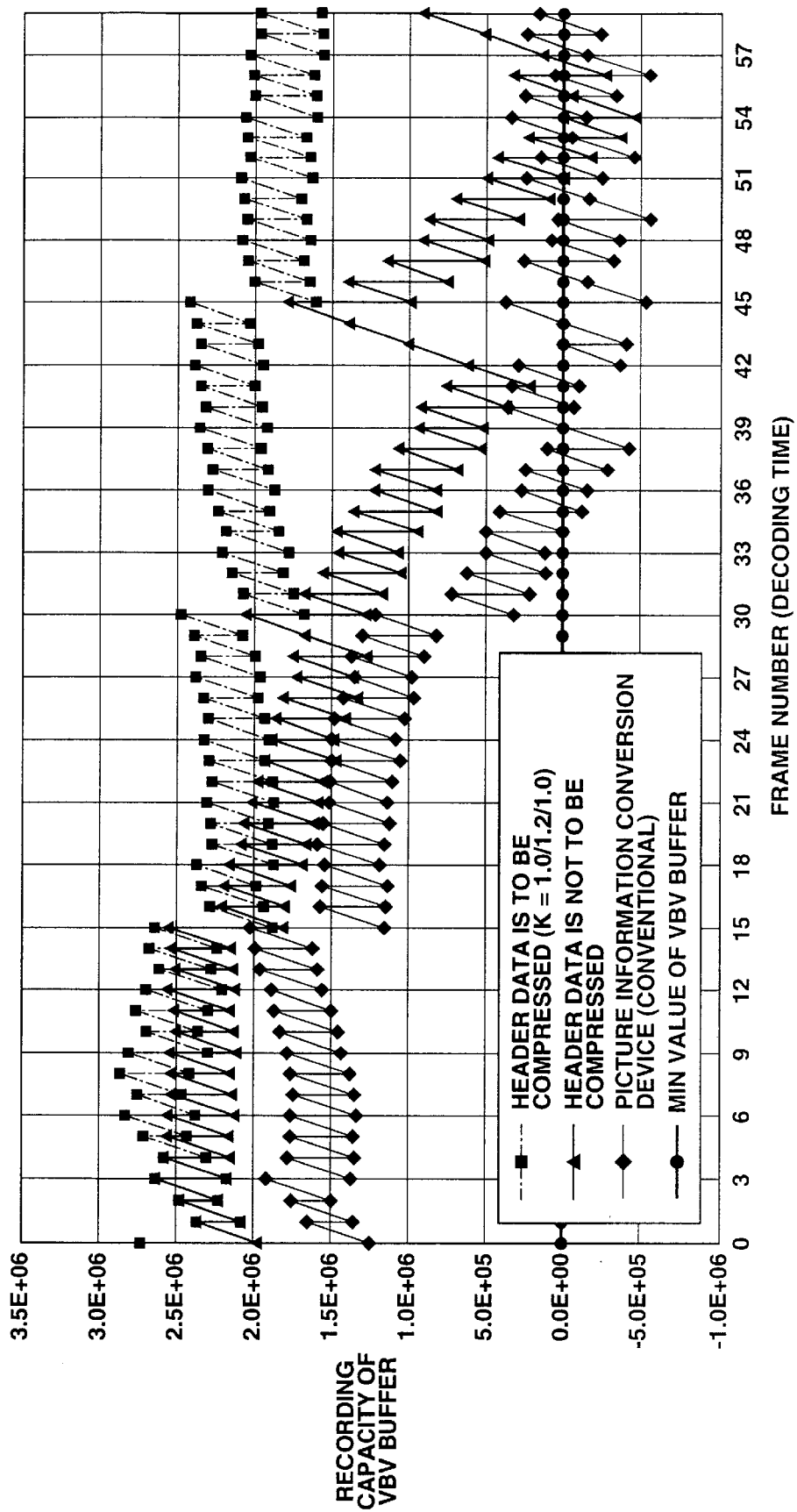
FIG. 36 shows the transition of the recording capacity of the VBV buffer with respect to the recording capacity in case the header data compression processing is performed and is not performed in the picture information conversion device of the present invention and the transition of the recording capacity of the VBV buffer with respect to the decoding time in the conventional picture information conversion device.

In the picture information conversion device 1 of the present invention, the transition of the recording capacity of the VBV buffer 6 with respect to the decoding time in case of compressing the header data using the adjusted coefficient value K and in case of not compressing the header data, and the transition of the recording capacity of the VBV buffer 6 with respect to the decoding time in the conventional picture information conversion device 100, are shown in FIG. 36.

Next, the experimental results under the conditions of the experiemnt 2 are explained.

Figure 37:
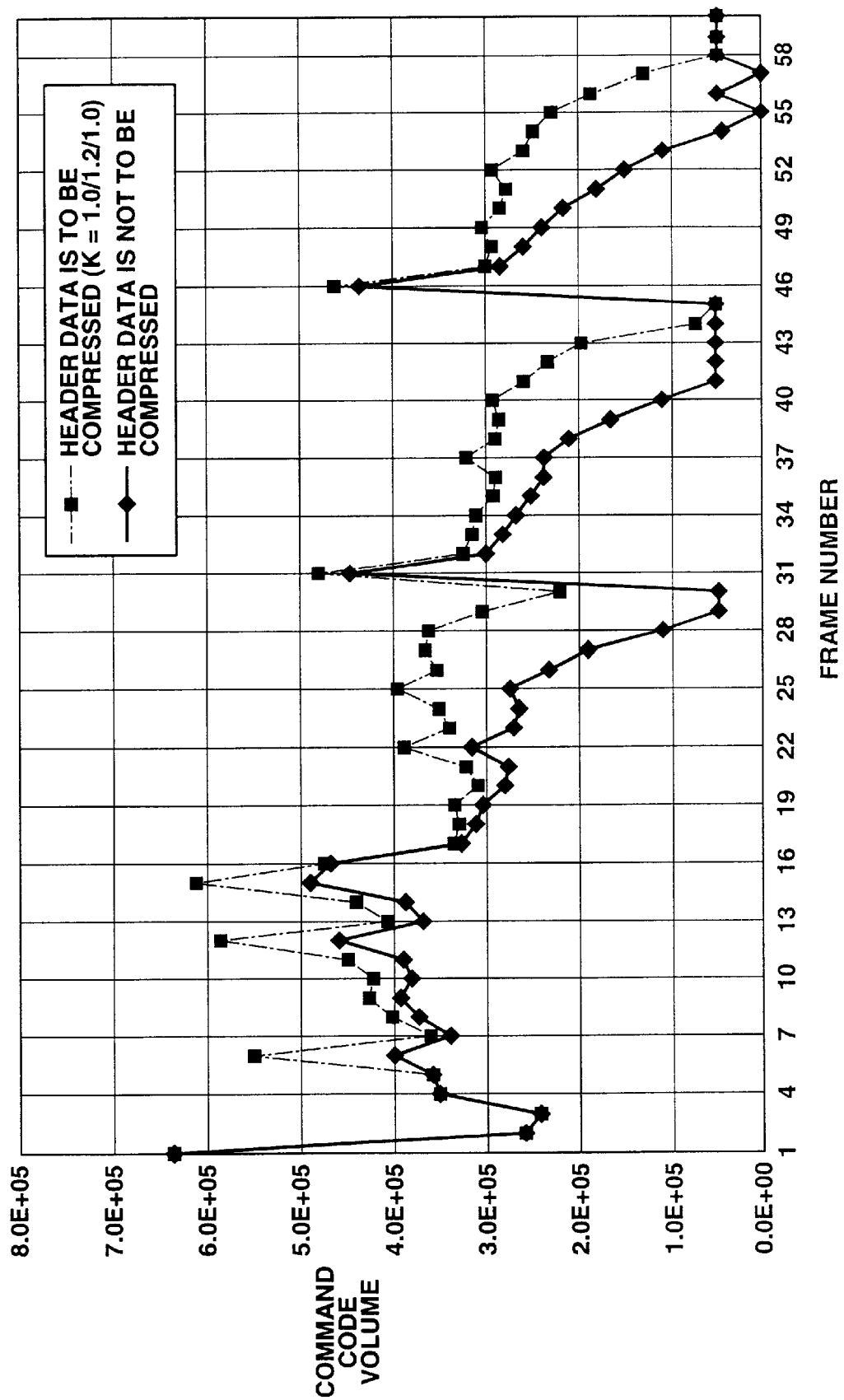
FIG. 37 shows the transition of the command code volume allocated to each frame in case head data compression operation is performed and that in case head data compression operation is performed.

The transition of the command code volume allocated to each frame in case of compressing the header data using the adjusted value of the coefficient K and in case of not compressing the header data in the picture information conversion device 1 according to the present invention is shown in FIG. 37. Here, the header data is compressed for a case where the values of the coefficients K for the I-, P- and B-pictures are 1.0, 1.2 and 1.0, respectively, as shown in FIG. 37. In the second GOP, abrupt dropout in the command code volume is prevented from occurrence in the second GOP, whilst it is postponed in the third and fourth GOPs.

Figure 38:
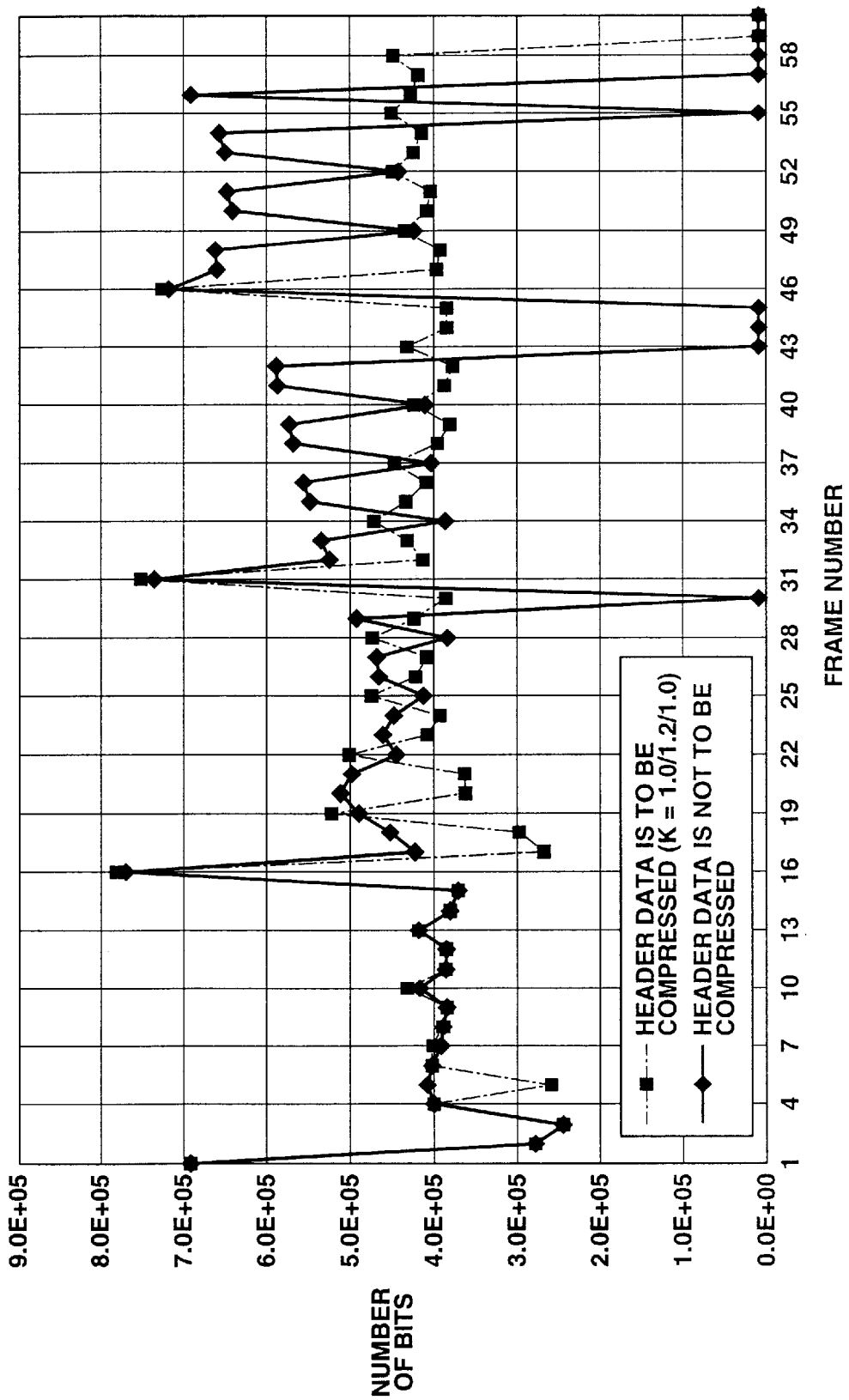
FIG. 38 shows the transition of the number of bits generated in each frame in case head data compression operation is performed and that in case head data compression operation is performed.

The transition of the number of bits generated in each frame in case of compressing the header data using the adjusted value of the coefficient K and in case of not compressing the header data is shown in FIG. 38 in the picture information conversion device 1 according to the present invention. Here, the header data is compressed for a case where the values of the coefficients K for the I-, P- and B-pictures are 1.0, 1.2 and 1.0, respectively, as shown in FIG. 38.

Thus, seven pictures are skipped by the skip function, whilst two pictures are dropped due to underflow in the picture information conversion device 1 of the present invention in which header data is not compressed. In the picture information conversion device 1 in which the skip function and header data compression are carried out, only two pictures are skipped due to absence of dropout.

Figure 39:
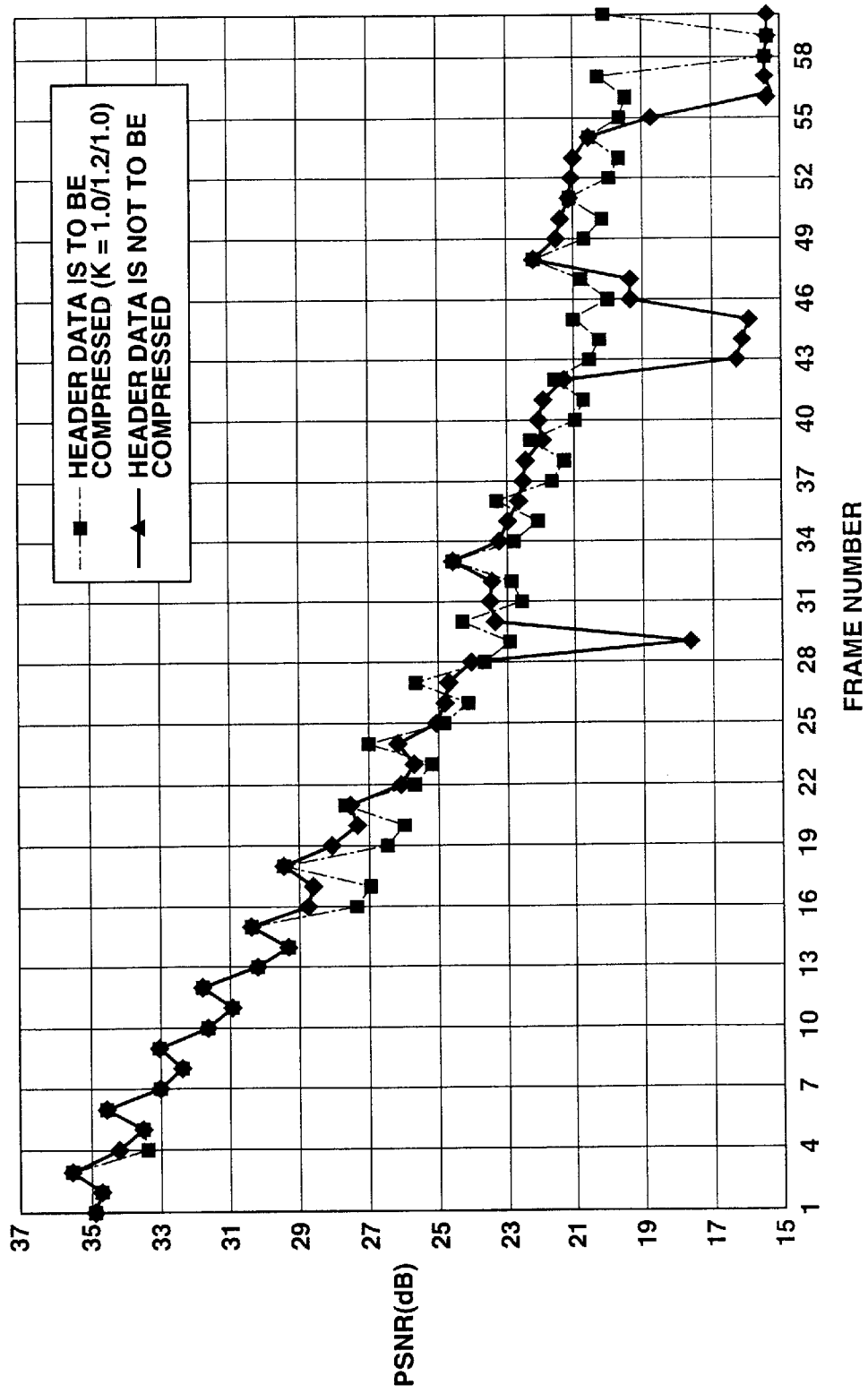
FIG. 39 shows the transition of PSNR in each frame in case head data compression operation is performed and that in case head data compression operation is performed.

In the picture information conversion device 1 of the present invention, comparison of the PSNR in each frame in case the header data are compressed using the adjusted value of the coefficient K to that in case the header data are not compressed is shown in FIG. 39, from which it is seen that the picture information conversion device 1 of the present invention is shown for a case where the values of the coefficients K for the I-, P- and B-pictures are 1.0, 1.2 and 1.0, respectively, as shown in FIG. 39.

Figure 40:
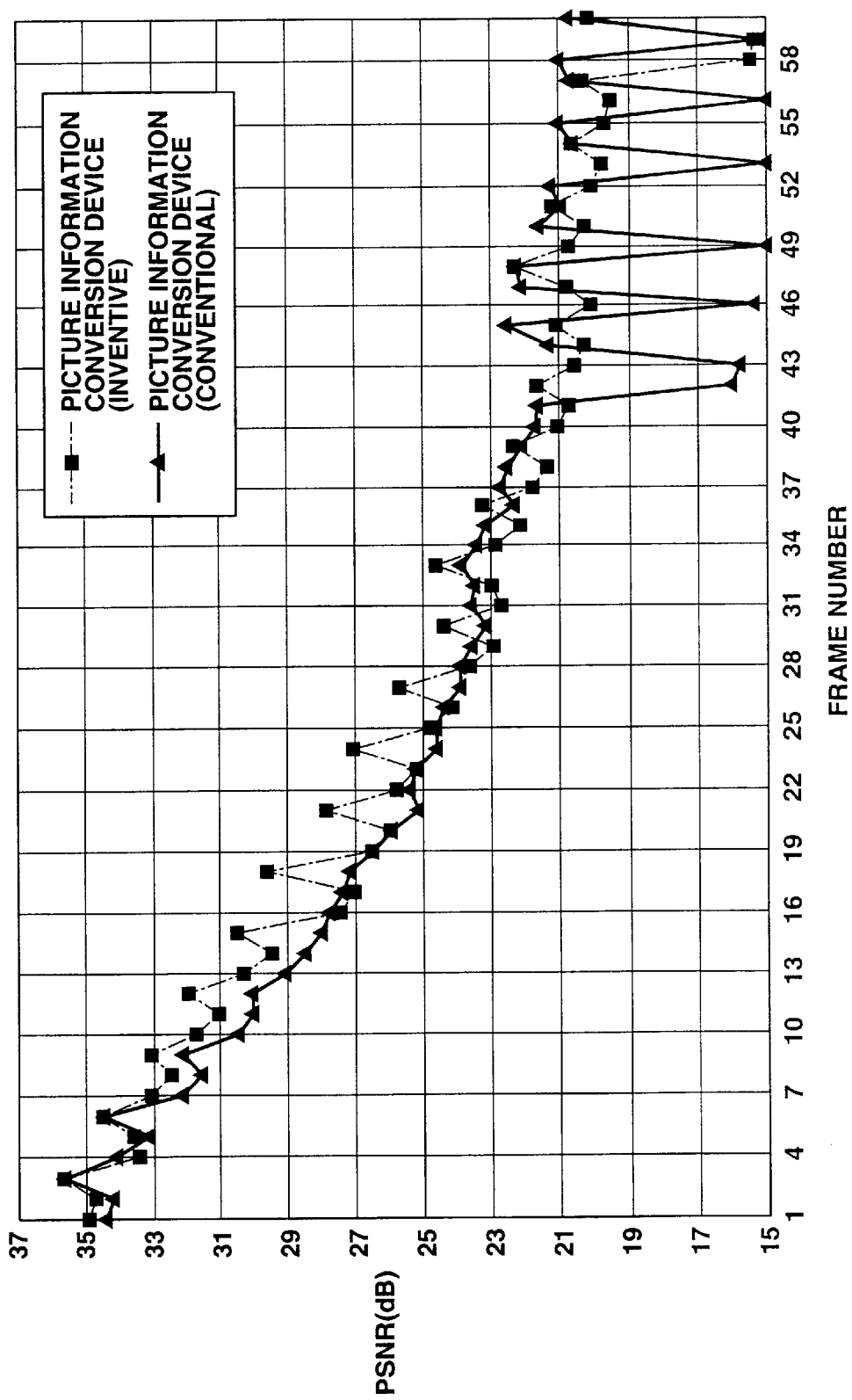
FIG. 40, similarly to FIG. 41, shows the transition of PSNR in each frame in case head data compression operation is performed and that in case head data compression operation is performed.

In addition, comparison of the recording capacity of the VBV buffer 6 in each frame in case the header data are compressed in the picture information conversion device 1 of the present invention to that in case the header data are not compressed in the conventional picture information conversion device 100 is shown in FIG. 40.

Figure 41:
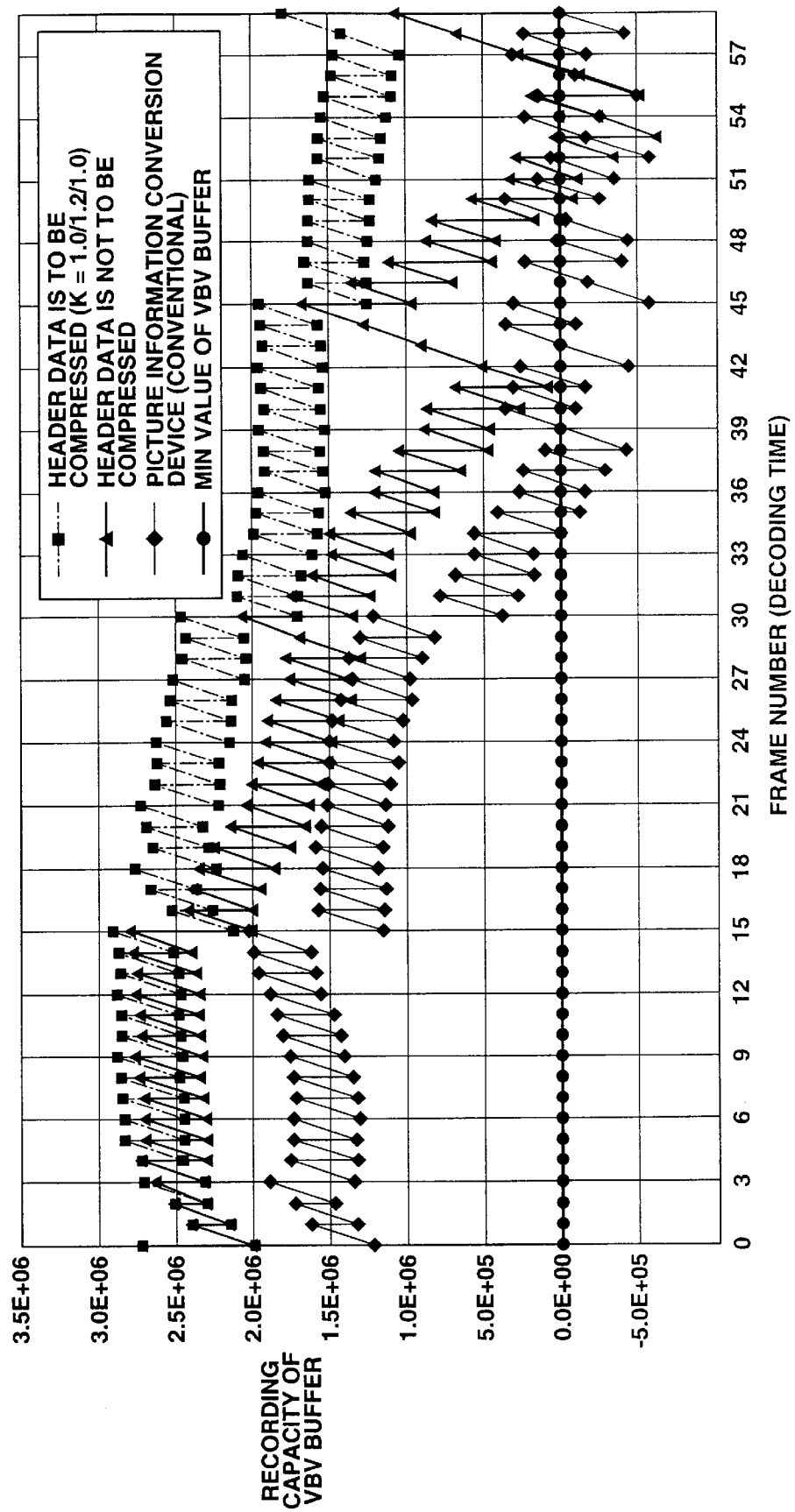
FIG. 41, similarly to FIG. 36, shows the transition of the recording capacity of the VBV buffer with respect to the recording capacity in case the header data compression processing is performed and is not performed in the picture information conversion device of the present invention and the transition of the recording capacity of the VBV buffer with respect to the decoding time in the conventional picture information conversion device.

In the picture information conversion device 1 of the present invention, the transition of the number of bits generated in each frame in case of compressing the header data using the adjusted value of the coefficient K and in case of not compressing the header data in the picture information conversion device 1 according to the present invention, and the transition of the number of bits generated in each frame of the conventional picture information conversion device 100, are shown in FIG. 41.

Next, calculation of the extended activity is explained.

First, in the picture information conversion device 1 of the present invention, the spatial activity for e.g., a macroblock j is calculated for determining the quantization scale in the TM5. However, in the picture information conversion device 1, the spatial activity cannot be calculated. The reason is that, for calculating ths spatial activity, a high calculated value is required for the spatial domain or the DCT domain, however, the majority of the macroblocks in the B- and P-pictures simply furnish a high error value (severe error) between the predicted picture and the current picture.

In the picture information conversion device 1 of the present invention, the quantization scale multiplied or not multiplied with the number of bits in the macroblock is substituted for a calculated value $act_j$ of the activity of the macroblock j. The normalized activity (normalized_$act_j$), which is the so-called normalized activity j, is given by the following equation (15):

$$\text{normalized\_act}_j = \frac{2 \times act_j + act_{avg}}{2 \times act_{avg} + act_j} \quad (15)$$

Since the $act_j$, which is a value of a variance of the original pixel accuracy, has a broad dynamic range in order to calculate the spatial activity in TM5, the dynamic range of the normalized activity (normalized_$act_j$) is (0.5, 2.0), or a range of (0.5, 2.0) such that it is 0.5 and 2.0 for the limit value of $act_j$ being 0 and infinity, respectively, as indicated by the following equation (16):

$$\text{normalized\_act}_j = \begin{cases} 0.5 & \text{if } act_j \to 0 \\ 2.0 & \text{if } act_j \to \infty \end{cases} \quad (16)$$

Figure 42:
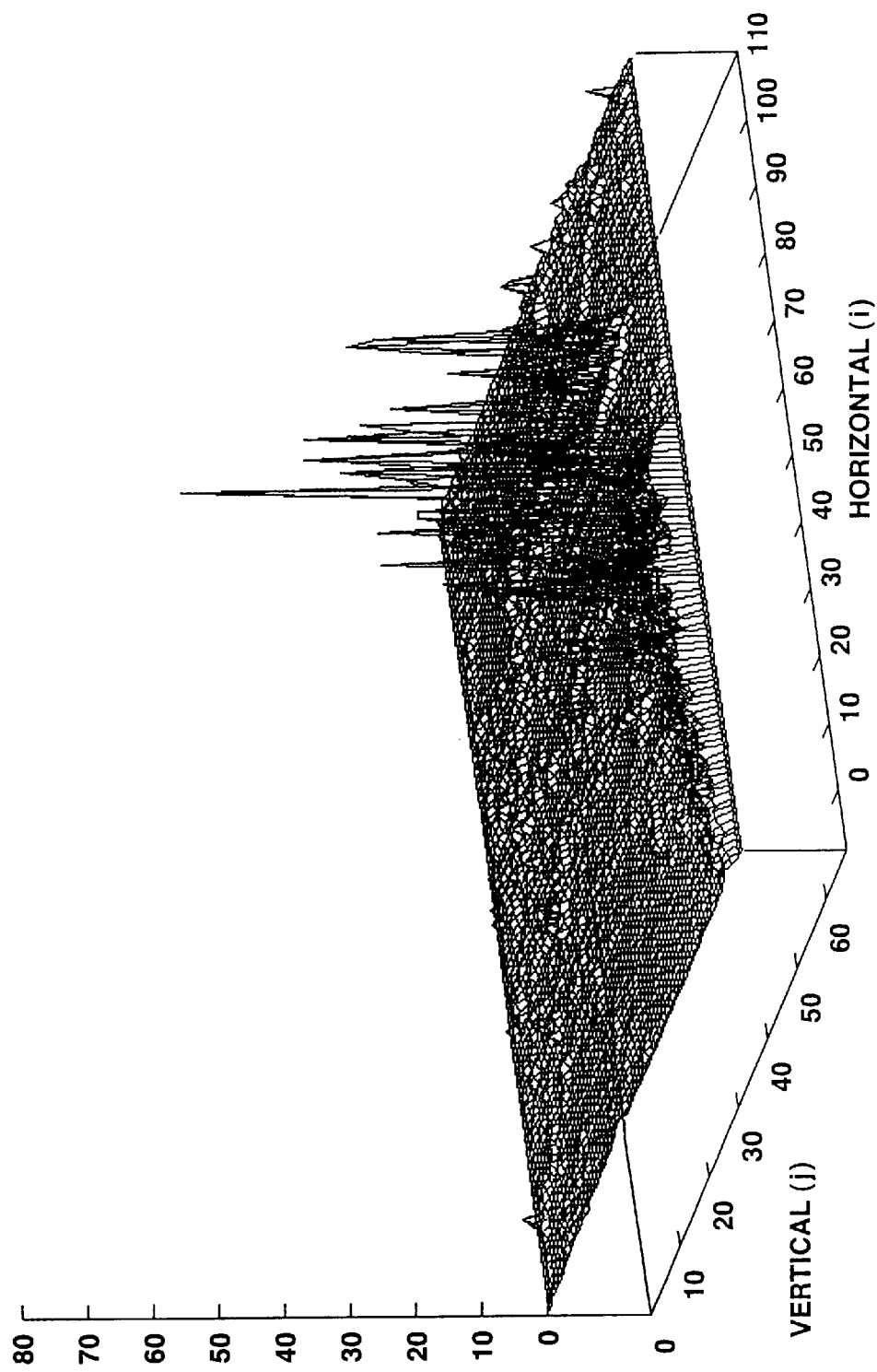
FIG. 42 shows the rate of the difference in intensity averaging the different in intensity in a macroblock at a location of (i, j) of an I-picture.

The proportion of the difference in in intensity which averages the difference in intensity in a macroblock located at (i,j) in the first I-picture of the picture sequence sprinkler is shown in FIG. 42. In the TM5, the proportion varying in a range of (0,80) is used. However, such substitution of the quantization scale cannot be used for a case of a wide dynamic range.

Figure 43:
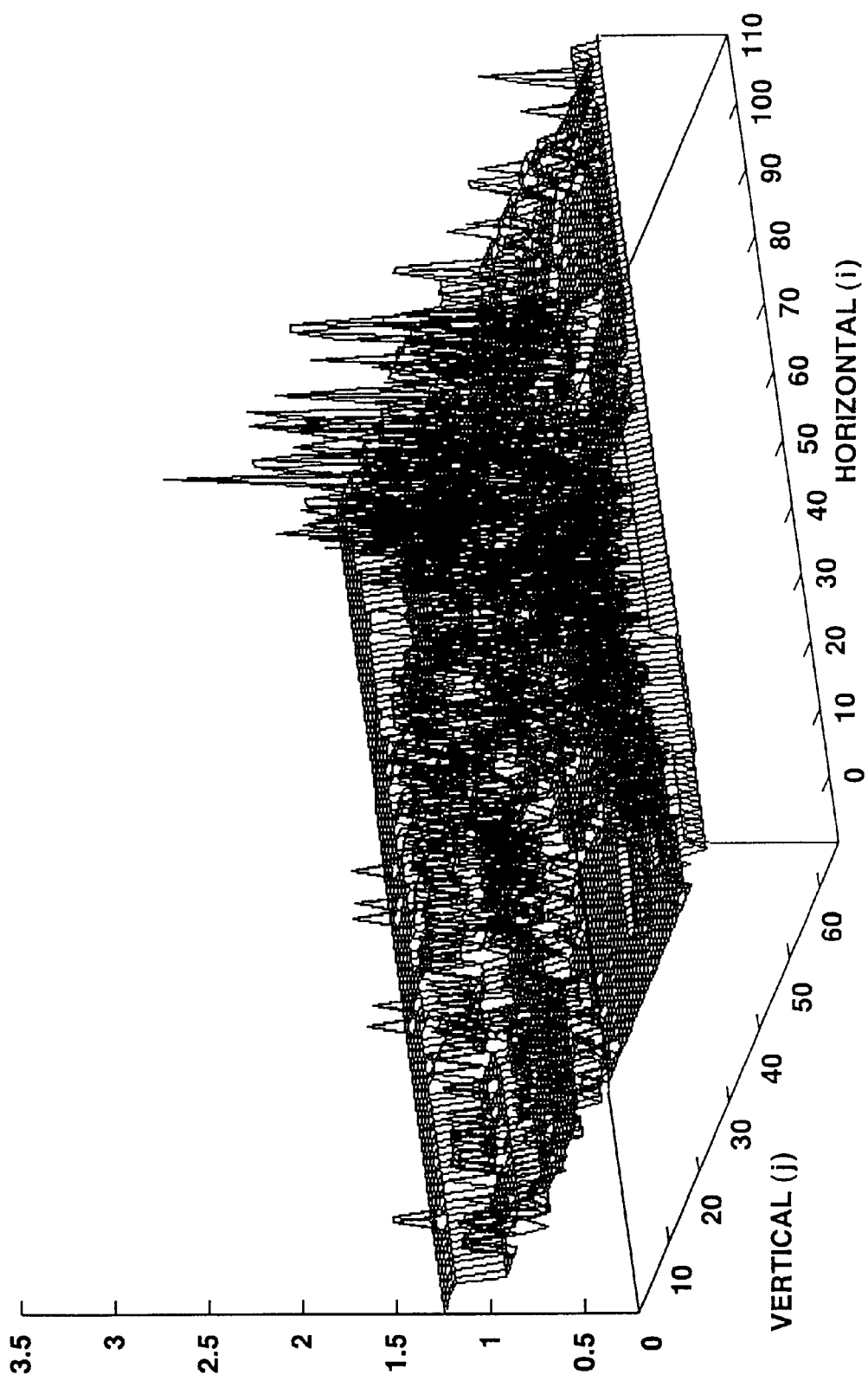
FIG. 43 shows the rate of the difference in the quantization scale for averaging the quantization scale of a macroblock at a location (i, j).

The proportion of the quantization scale for averaging the quantization scale of the macroblock located at (i,j) is shown in FIG. 43. The dynamic range for this case is (0,5,3,5). So, for enlarging the dynamic range, $act_j$ or normalized_$act_j$ needs to be extended. The extended normalized_$act_j$ is represented by the following equation(17):

$$\text{normalized\_act}_j = \frac{\beta \times act_j + act_{avg}}{\gamma \times act_{avg} + act_j} \quad (17)$$

where β and γ, which are coefficients, are represented by the following equation (3):

$$\beta = \frac{\theta_{max}\theta_{min}(act_{max} - act_{min}) + \theta_{max} - \theta_{min}}{act_{max}\theta_{max} - act_{min}\theta_{min}} \quad (3)$$

$$\gamma = \frac{act_{max} - act_{min} + act_{max}act_{min}(\theta_{max} - \theta_{min})}{act_{max}\theta_{max} - act_{min}\theta_{min}}$$

The result of an experiment, conducted in connection with the calculation activity of the extended activity as described above, is now explained. Here, the quantization scale, generated on direct encoding, is used to calculate the activity.

Figure 44:
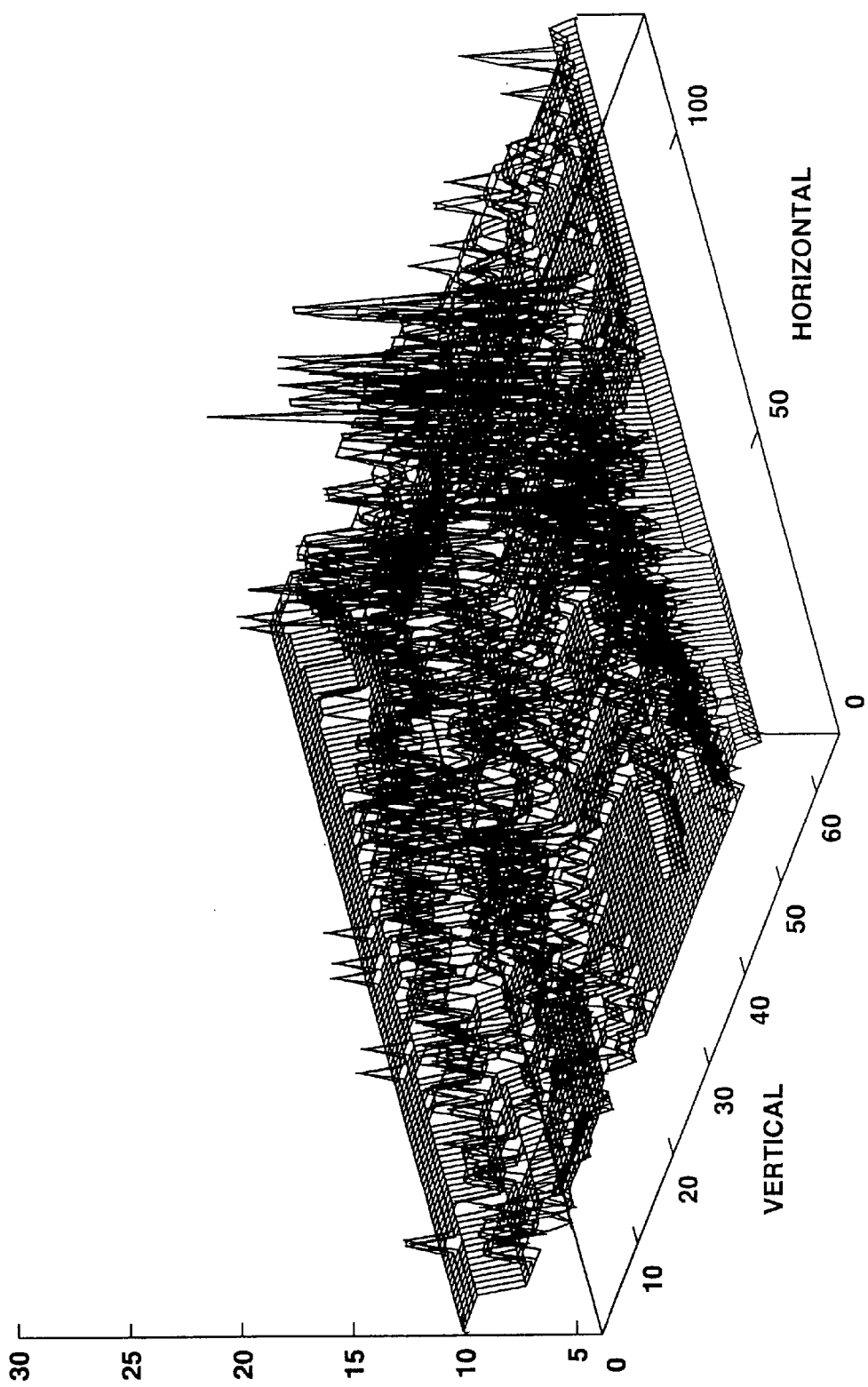
FIG. 44 shows the quantization scale of an I-picture generated in an input picture compression information (bitstream).

The quantization scale of an I-picture, generated in the input 18 Mbps compressed picture information (bitstream), is shown in FIG. 44.

Figure 45:
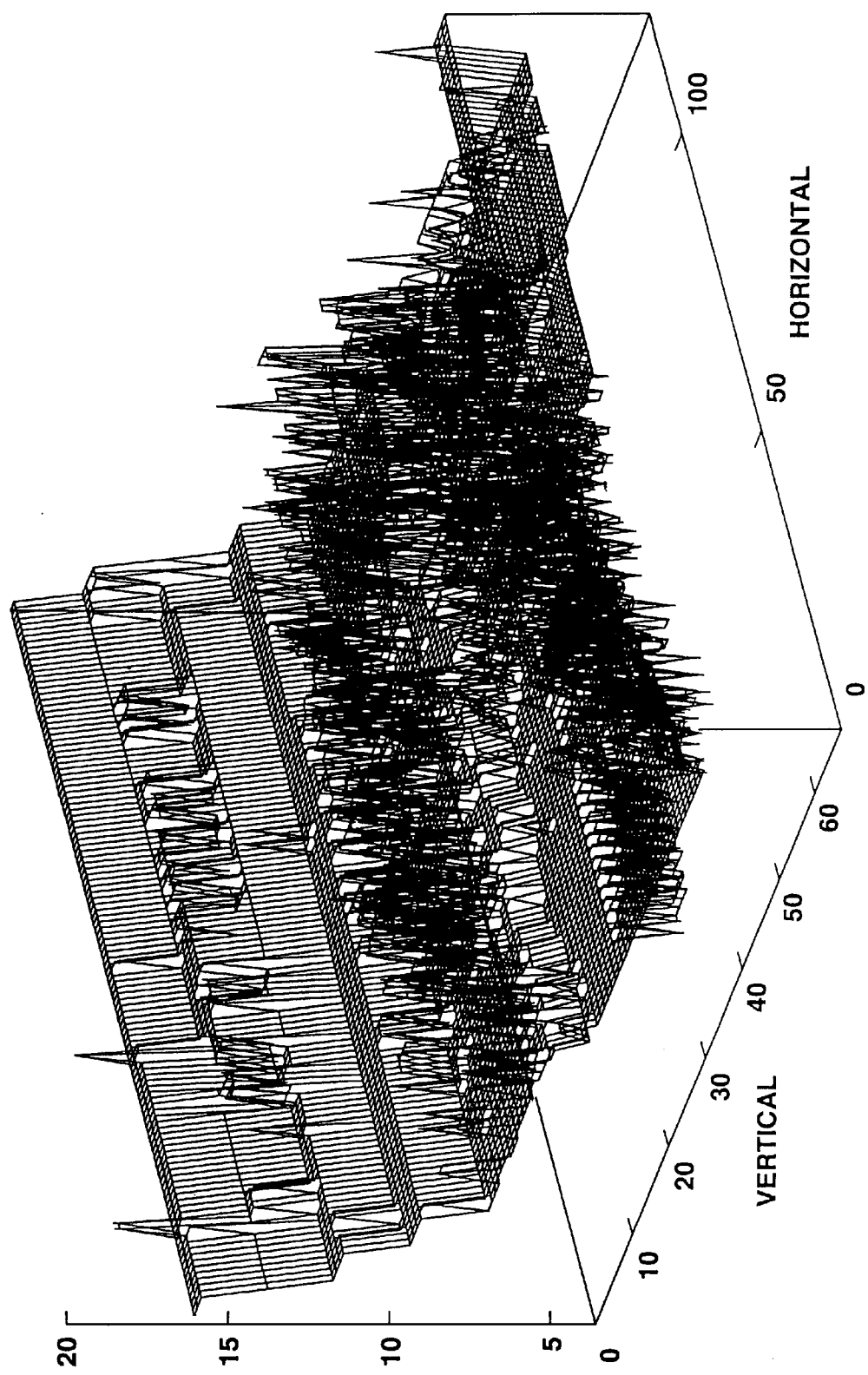
FIG. 45 shows a quantization scale generated by the picture information conversion device according to the present invention.
Figure 46:
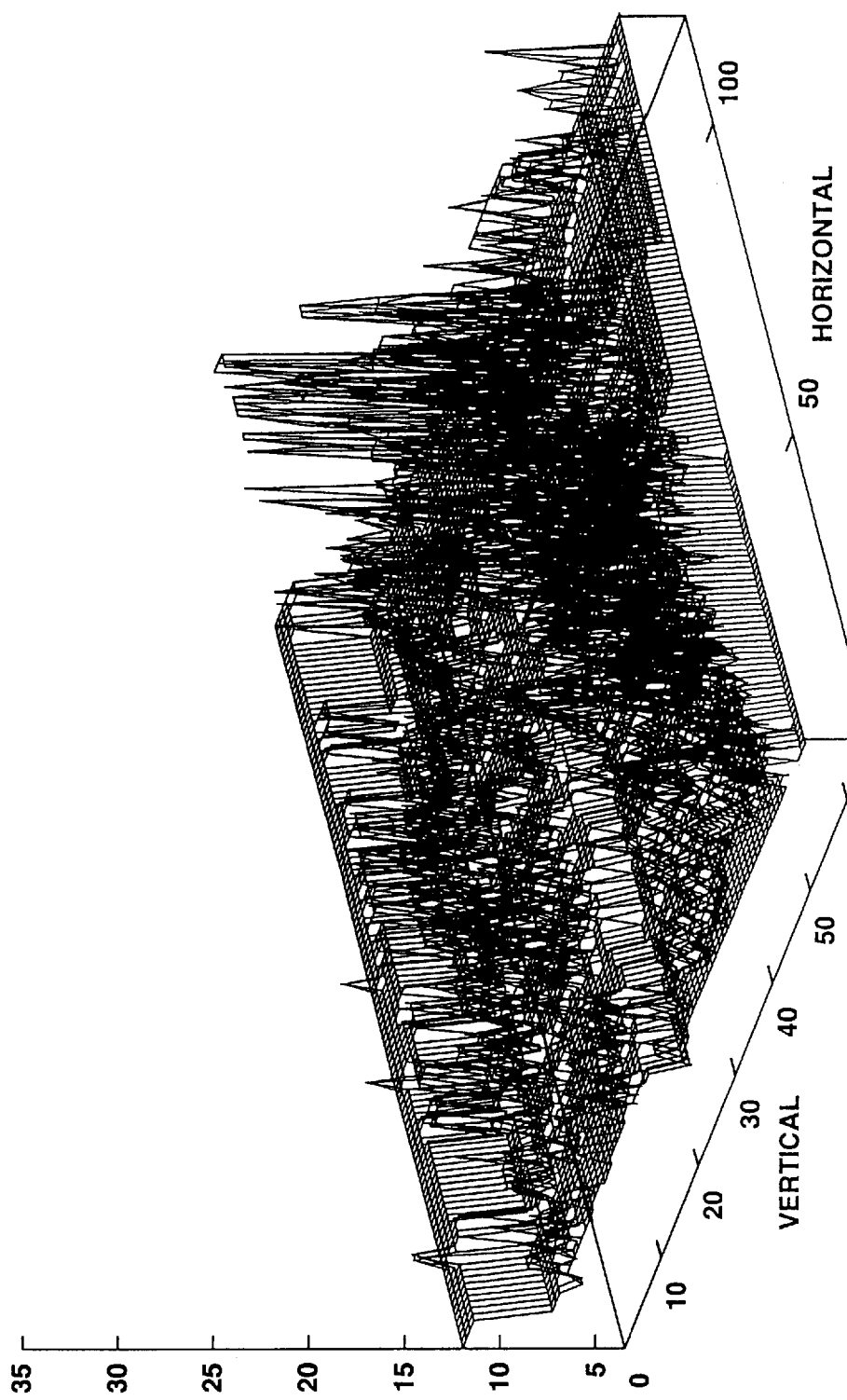
FIG. 46, similarly to FIG. 45, shows a quantization scale generated by the picture information conversion device according to the present invention.

The quantization scale generated by the picture information conversion device 1 not employing the calculation of the extended activity, is shown in FIG. 45, from which it is seen that the dynamic range is narrow and is of a shape totally different from that shown in FIG. 44.

The quantization scale generated by the picture information conversion device 1 employing the calculation of the extended activity, is shown in FIG. 45, from which it is seen that the dynamic range is of a shape analogous to that shown in FIG. 44. The dynamic range also is extended in case of employing the calculation of theextended activity as comapred to the case of not employing the calculation of the extended activity.

The transition of PSNR of each frame in case of employing extended activity and non-extended normal activity in the picture information conversion device 1 of the present invention and that in case of employing the conventional picture information conversion device 100 are shown in FIG. 47.

Referring to FIG. 47, the PSNR in case of using the extended activity is not improved over that in case of not using the extended activity. The reason is that the quantization scale in the active region is lower in the picture information conversion device 1 not employing the calculation of the extended activity than in the picture information conversion device 1 employing the calculation of the extended activity. Here, the subjective evaluation obtained is better in the latter case than in the former case. The reason is that the active region and the non-active region are quantized more roughly and more finely, respectively, in the latter case than in the former case. Meanwhile, the subjective evaluation by the human being is more sensitive in the non-active region than in the active region.

The picture demonstrated on the actual display in the frame numbers 0, 20, 40 and 59 employing the picture sequence sprinkler is shown in FIG. 48. Specifically, FIGS. 48A, 48B and 48C represent pictures of the frame numbers 20, 40 and 59, respectively. It may be seen from FIG. 48 that, as the frame numbers are increased from 0 through 20 and 49 to 59, the noise is increased from the lower left to the upper right.

Figure 49:
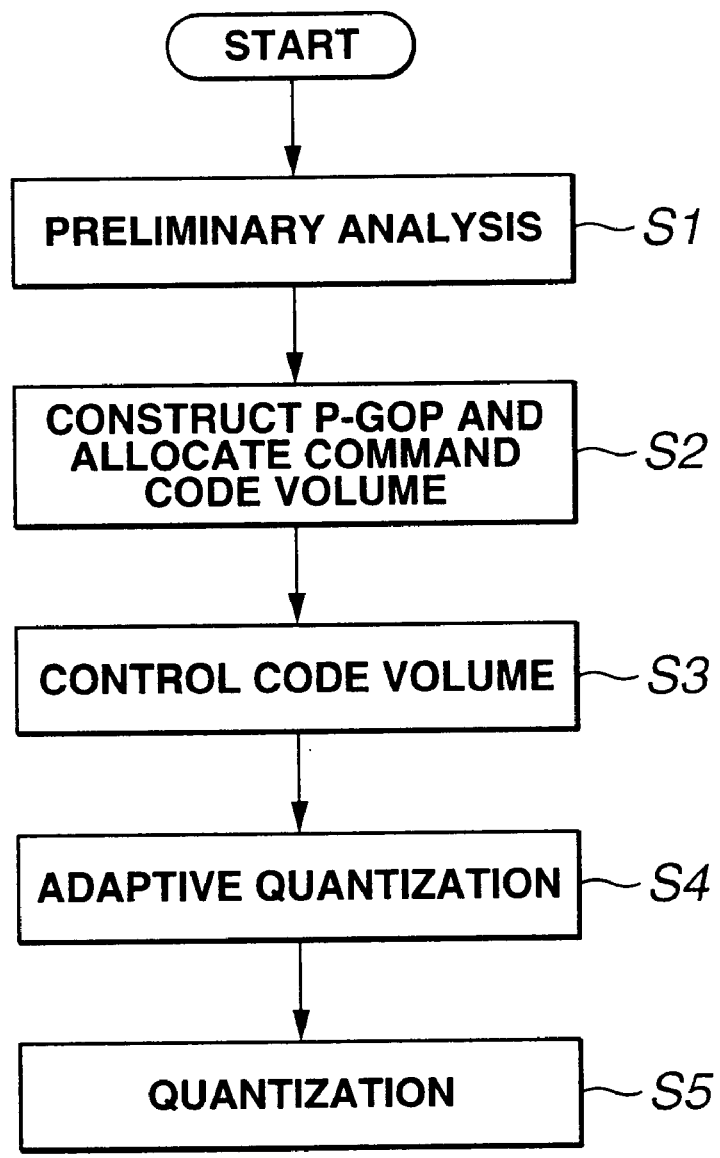
FIG. 49 is a flowchart for illustrating the processing pertinent to the code volume control in the picture information compression device according to the present invention.

The processing pertinent to the code volume control is explained in accordance with the flowchart shown in FIG. 49.

First, preliminary analysis for constructing a p-GOP as later explained and allocation of the command code volume to each frame of the p-GOP are performed at step S1 of FIG. 49.

Specifically, the FF buffer 2 furnishes the compressed picture information (bitstream), already stored, to the VBV buffer 6, after which it starts to store a portion of the newly input compressed picture information (bitstream). The FF buffer 2 finishes the storage of the compressed picture information (bitstream) in case one of the following two conditions is met:

As one of the conditions, if the FF buffer 2 is filled with the compressed picture information (bitstream) comprising pictures of consecutive N frames, in turn comprising only one I-picture or not comprising I-pictures whatsoever, the FF buffer 2 terminates the storage of the compressed picture information (bitstream). If, as the other condition, the the FF buffer 2 is not filled completely with pictures, but is ready for being filled with the next I-picture, the FF buffer 2 terminates the storage of the compressed picture information (bitstream).

Subsequently, the compressed picture information (bitstream), thus stored in the FF buffer 2, is routed to the VBV buffer 6.

The compressed information analysis device 3 then extracts the information necessary for each processing, as later explained, from the compressed picture information (bitstream) input to the FF buffer 2, to send the analysis result information, as this extracted information, to the information buffer 4.

Based on the analysis result information, extracted from the compressed picture information (bitstream) input to the FF buffer 2, the compressed information analysis device 3 calculates acts, using the equation shown in Table 1. The compressed information analysis device 3 then calculates the coefficients $\beta$ and $\gamma$, based on the calculated values of $act_{max}$, $act_{min}$, $act_{avg}$, $\theta_{max}$ and $\theta_{min}$ and on the following equation (3):

$$\beta = \frac{\theta_{max}\theta_{min}(act_{max} - act_{min}) + \theta_{max} - \theta_{min}}{act_{max}\theta_{max} - act_{min}\theta_{min}} \quad (3)$$

$$\gamma = \frac{act_{max} - act_{min} + act_{max}act_{min}(\theta_{max} - \theta_{min})}{act_{max}\theta_{max} - act_{min}\theta_{min}}$$

The compressed information analysis device 3 sends these calculated values of the coefficients $\beta$ and $\gamma$, along with the above-mentioned analysis result information.

The information portion of the information buffer 4 then stores the analysis result information furnished from the compressed information analysis device 3. If filled sufficiently with the analysis result information, the information portion of the information buffer 4 automatically deletes the analysis result information stored therein, beginning from the eldest information, that is from the information stored for the longest time.

The information portion of the information buffer 4 has recorded therein, as the p-GOP constituting information, from the outset, the information pertinent to the constitution of the picture type of plural sorts of the GOPs recognized by the picture information conversion device 1 and the information pertinent to the constitution of the picture type of the GOP of the input compressed picture information (bitstream) input so far to the FF buffer 2. During the time of processing respective pictures of the p-GOP, the information portion of the information buffer 4 continualy updates the p-GOP constituting information, such as the picture encoding type information, in association with the input compressed picture information (bitstream), so that the constitution of the picture type of the p-GOP will be identical with or approximate to constitution of the picture type of the p-GOP of the compressed picture information (bitstream) currently input to the FF buffer 2.

Therefore, the information buffer 4 continually sends to the bit allocation device 5 the p-GOP constituting information which is based on the constitution of the picture type of the p-GOP of the compressed picture information (bitstream) currently input to the FF buffer 2.

Then, at step S2, the p-GOP constitution and allocation of the command code volume to the respective frames of the p-GOP are made.

Specifically, the bit allocation device 5 is fed from the information buffer 4 with the p-GOP constituting information which is continually updated in meeting with the compressed picture information (bitstream) currently input to the FF buffer 2. Based on this p-GOP constituting information, thus supplied, the bit allocation device 5 constructs a p-GOP which is in meeting with the compressed picture information (bitstream) currently input to the FF buffer 2. Based on the so-constructed p-GOP and on the complexity values of the respective pictures of the p-GOP, calculated using the p-GOP constituting information, the bit allocation device 5 calculates the command code volume allocated to the respective pictures of the p-GOP to allocate the calculated command code volume to the respective pictures of t the p-GOP.

That is, the bit allocation device 5 calculates the command code volume allocated to the respective I-, P- and B-pictures of the p-GOP, using the following equations (6) and (18) to (21), to allocate the calculated command code volume to the respective pictures of the p-GOP:

$$R_o = \frac{output\_bit\_rate}{frame\_rate} \times L_{pgop} \quad (18)$$

$$T \arg et\_bit(I) = \frac{X(I)}{X(I) + \sum_{i\in\Omega} X(Pi) + \sum_{i\in\Omega} X(Bi)} \times R \quad (19)$$

$$T \arg et\_bit(B_m) = \frac{X(B_m)}{X(I) + \sum_{i\in\Omega} X(Pi) + \sum_{i\in\Omega} X(Bi)} \times R \quad (20)$$

$$T \arg et\_bit(P_k) = \frac{X(P_k)}{X(I) + \sum_{i\in\Omega} X(Pi) + \sum_{i\in\Omega} X(Bi)} \times R \quad (21)$$

where $\Omega$ is a set of the number of residual pictures, R as found from the equation (6) denotes the nuber of residual bots allocated to the currently processed p-GOP, and $\ominus$ is a set of pictures processed in the p-GOP.

If, however, extrapolation is required, the bit allocation device 5 extrapolates, based on the p-GOP constituting information sent from the information buffer 4 and on the N frames of the compressed picture information (bitstream) stored in the FF buffer 2, residual pictures of the GOP, predicted to be residual pictures, comprising the N frames, to construct the p-GOP corresponding to the compressed picture information (bitstream) currently input to the FF buffer 2. Based on the so-constructed p-GOP, and on the calculated values of the complexity of the respective pictures of the p-GOP, comprising the residual pictures, as calculated using the p-GOP constituting information, the bit allocation device 5 calculates the command code volume allocated to the respective pictures of the p-GOP, to allocate the so-calculated command code volume to the respective pictures of the p-GOP.

The bit allocation device 5 then allocates the so-calculated command code volume allocation information to the header data compression device 9 and to the code volume control device 10.

The header data compression device 9 compresses the header data supplied from the variable length decoder 7, based on the command code volume allocation information supplied from the bit allocation device 5, in such a manner that, if the command code volume to the respective pictures of the p-GOP is smaller than the number of bits for the header data for the respective pictures, the header data compression device 9 proceeds to compress the header data furnished from the variable length decoder 7. The header data compression device 9 then routes the compressed header data to the variable length coder 13. If conversely the command code volume to the respective pictures of the p-GOP is larger than the number of bits fort the header data for the respective pictures, the header data compression device 9 sends the header data to the variable length coder 13 without compressing the header data furnished from the variable length decoder 7.

At step S3, the code volume control device 10 generates the reference quantization scale (reference_q_scale), based on the command code volume allocation information sent from the bit allocation device 5 and on the information on the code volume of the low bitrate compressed picture information (bitstream) output by and sent from the VBV buffer 14. The code volume control device 10 routes the so-generated reference quantization scale to the adaptive quantizer 11.

The information pertinent to the code volume of the low bitrate compressed picture information (bitstream) output to outside by the VBV buffer 14 means the information of the TM5 recorded, using a feedback mechanism adapted for controlling the code volume by the VBV buffer 14 as a virtual buffer.

If the VBV buffer 14 is filled to its full recording capacity, the storage capacity virtual_bufferj* of the VBV buffer 14 as the virtual buffer is given by the equation (22):

$$\text{virtual\_buffer}_j^* = \text{virtual\_buffer}_0^* + \text{generated\_bit} - \frac{j-1}{\text{number\_of\_MB}} \times t \arg et\_\text{bit} \quad (22)$$

provided that * is the picture encoding type of the I-, P- or B-picture andj corresponds to the macroblockj (Macroblock j number_of_bits_in_MBj).

It is noted that the capacity of the virtual buffer virtual_buffer0 is given by the equation (23):

$$\text{virtual\_buffer}_0^* = \frac{\text{average\_q\_scalexreaction}}{31} \quad (23)$$

The reference quantization scale reference_q_scale$_j$, a reference value of the qu: parameter (q-scale parameter), is represented by the following equation (24):

$$\text{reference\_q\_scale}_j = \frac{\text{virtual\_buffer}_j \times 31}{\text{reaction\_parameter}} \quad (24)$$

where reactio_parameter is represented by the following equation (25):

$$\text{reaction\_parameter} = 2 \times \frac{\text{output\_bit\_rate}}{\text{frame\_rate}} \quad (25)$$

Then, at step S4, adaptive quantization is performed in order to calculate the adaptable quantization scale. Specifically, the adaptive quantizer 11 calculates the normalized activity (normalized_act$_j$), based on the values of $\beta$, $\gamma$, act$_j$ and act$_{avg}$ as calculated by the compressed information analysis device 3, and on the following equation (26):

$$\text{normalized\_act}_j = \frac{\beta \times act_j + act_{avg}}{\gamma \times act_{avg} + act_j} \quad (26)$$

The adaptive quantizer 11 calculates the mquant in the macroblock j mquant$_j$ (Macroblock QUANT: macroblock quantization characteristic value), based on the reference quantization scale reference_q_scale$_j$ supplied from the code volume control device 10, calculated normalized activity (normalized_act$_j$) and on the following equation (27):

$$\text{mquant} = \text{reference\_q\_scale}_j \times \text{normalized\_act}_j \quad (27)$$

Finally, based on the mquant mquantj and on the following equation (28):

$$q\_\text{scale} = f(\text{mquant}_j) \quad (28)$$

where f( ) is the extension function in TM5.

The adaptive quantizer 11 furnishes the generated quantization scale to the quantization device 12. By furnishing the quantization scale to the quantizer 12, the adaptive quantizer 11 controls the quantization width of the matrix for quantization used in the quantizer 12.

Then, at step S5, the quantizer 12 quantizes the DCT coefficients, furnished from the dequantizer, based on the quantization scale furnished from the adaptive quantizer 11, so that the output bitrte will be constant (CBR). The quantizer sends the quantized DCT coefficients to the variable length coder 13.

As mentioned above, if, in the above-described picture information conversion device 1 according to the present invention, the compressed picture information (bitstream) with a variable information volume or with a non-recognized information volume is input, underflow and/or overflow may be prevented from occurring to suppress deterioration in the picture quality by optimum compression processing on the cpiv such as by allocating a proper command code volume to the respective pictures of the compressed picture information (bitstream).

Although the above-described picture information conversion device 1 is fed with the compressed picture information (bitstream) under MPEG-2, it may also be fed with the compressed picture information (bitstream) obtained e.g., by MPEG-1 or H.263, if the compressed picture information (bitstream) has been encoded by orthogonal transform and motion compensation.

What is claimed is:

1. A picture information conversion device which is fed with the first compressed picture information of CBR (constant bitrate) or VBR (variable bitrate) as a first bitrate and which outputs the second compressed picture information at CBR as a second bitrate, said first compressed picture information being picture signals compression-coded in terms of a GOP (group of pictures) made up of at least one picture, as a unit, said picture information conversion device comprising:

first storage means for storing N frames of the input first compressed picture information;

compressed picture information analysis means for analyzing the structure of the picture type of the GOP of the first compressed picture information input to said first storage means;

second storage means for storing the analysis result information as the result of analysis by said compressed picture information analysis means, supplied by said compressed picture information analysis means;

pseudo GOP generating means for generating a pseudo GOP, based on said N frames stored in said first storage means and on said analysis result information stored in said second storage means, said pseudo GOP predicting the picture type of the entire GOP including said N frames of said first compressed picture information;

code volume allocation means for allocating a pre-set code volume to each picture of the pseudo GOP generated by said pseudo GOP generating means so that the output second compressed picture information will be at said second bitrate;

wherein said code volume allocation means allocates a smaller code volume and a larger code volume to leading side pictures and to trailing side pictures of said pseudo GOP generated by said pseudo GOP generating means, respectively.

2. The picture information conversion device according to claim 1 wherein said first storage means stores five or six frames of an input GOP of said first compressed picture information.

3. The picture information conversion device according to claim 1 wherein said pseudo GOP includes only one frame of an I-picture (intra-coded picture) in one GOP.

4. The picture information conversion device according to claim 1 wherein the number of pictures making up said pseudo GOP is variable.

5. A picture information conversion method in which the first compressed picture information of CBR (constant bitrate) or VBR (variable bitrate) as a first bitrate is input and in which the second compressed picture information at CBR as a second bitrate is output, said first compressed picture information being picture signals compression-coded in terms of a GOP (group of pictures) made up of at least one picture, as a unit, said picture information conversion method comprising the steps of:

storing N frames of the input first compressed picture information;

analyzing the structure of the picture type of the GOP of the first compressed picture information;

storing the analysis result information as the result of analysis;

generating a pseudo GOP, based on said N frames stored and on said analysis result information stored, said pseudo GOP predicting the picture type of the entire GOP including said N frames of said first compressed picture information; and allocating a pre-set code volume to each picture of the pseudo GOP generated so that the output second compressed picture information will be at said second bitrate;

wherein a smaller code volume and a larger code volume are allocated to leading side pictures and to trailing side pictures of the generated pseudo GOP, respectively.

6. The picture information conversion method according to claim 5 wherein five or six frames of an input GOP of said first compressed picture information are stored.

7. The picture information conversion method according to claim 5 wherein said pseudo GOP includes only one frame of an I-picture (intra-coded picture) in one GOP.

8. The picture information conversion method according to claim 5 wherein the number of pictures making up said pseudo GOP is variable.

* * * * *